United States Patent
Riffle et al.

(10) Patent No.: US 11,525,034 B2
(45) Date of Patent: Dec. 13, 2022

(54) SULFONATED POLY(ARYLENE ETHER) MEMBRANES WITH HIGH MONOVALENT SALT REJECTION EVEN IN THE PRESENCE OF MIXED SALT FEEDS THAT CONTAIN MULTIVALENT SALTS

(71) Applicants: Board of Regents, The University of Texas System, Austin, TX (US); Virginia Tech Intellectual Properties, Inc., Blacksburg, VA (US)

(72) Inventors: Judy S. Riffle, Blacksburg, VA (US); Ozma R. Lane, Blacksburg, VA (US); Amin Daryaei, Blacksburg, VA (US); Shreya Roy-Choudhury, Blacksburg, VA (US); Benny D. Freeman, Austin, TX (US); Eui Soung Jang, Austin, TX (US); Gurtej S. Narang, Blacksburg, VA (US); John J. Lesko, Blacksburg, VA (US); Trevor Schumacher, Blacksburg, VA (US)

(73) Assignees: Board of Regents, The University of Texas System, Austin, TX (US); Virginia Tech Intellectual Properties, Inc., Blacksburg, VA (US)

( * ) Notice: Subject to any disclaimer, the term of this patent is extended or adjusted under 35 U.S.C. 154(b) by 225 days.

(21) Appl. No.: 16/945,457

(22) Filed: Jul. 31, 2020

(65) Prior Publication Data
US 2020/0362107 A1 Nov. 19, 2020

Related U.S. Application Data

(63) Continuation of application No. PCT/US2019/017396, filed on Feb. 9, 2019.

(60) Provisional application No. 62/628,347, filed on Feb. 9, 2018, provisional application No. 62/628,349, filed on Feb. 9, 2018.

(51) Int. Cl.
| | |
|---|---|
| *B01D 67/00* | (2006.01) |
| *B01D 69/02* | (2006.01) |
| *B01D 71/82* | (2006.01) |
| *C02F 101/12* | (2006.01) |
| *C08G 65/40* | (2006.01) |
| *C08G 65/48* | (2006.01) |
| *B01D 61/02* | (2006.01) |
| *C02F 1/44* | (2006.01) |

(52) U.S. Cl.
CPC ......... *C08G 65/485* (2013.01); *B01D 61/025* (2013.01); *B01D 67/0006* (2013.01); *B01D 69/02* (2013.01); *B01D 71/82* (2013.01); *C02F 1/441* (2013.01); *C08G 65/4025* (2013.01); *C08G 65/4056* (2013.01); *B01D 2323/30* (2013.01); *B01D 2323/34* (2013.01); *B01D 2325/14* (2013.01); *B01D 2325/20* (2013.01); *C02F 2101/12* (2013.01); *C02F 2303/04* (2013.01)

(58) Field of Classification Search
CPC ........................ B01D 71/68; B01D 2323/30; B01D 2325/14; B01D 61/025; C02F 1/441
See application file for complete search history.

(56) References Cited

U.S. PATENT DOCUMENTS

| | | | |
|---|---|---|---|
| 3,709,841 | A | 1/1973 | Quentin |
| 4,273,903 | A | 6/1981 | Rose |
| 4,414,368 | A | 11/1983 | Coplan et al. |
| 7,736,539 | B2 | 6/2010 | Colquhoun et al. |
| 8,028,842 | B2 | 10/2011 | McGrath et al. |
| 8,378,003 | B2 | 2/2013 | Manish et al. |
| 9,199,205 | B2 | 12/2015 | Weber et al. |
| 2007/0163951 | A1 | 7/2007 | McGrath et al. |
| 2008/0171252 | A1 | 7/2008 | Hirano et al. |
| 2009/0099331 | A1 | 4/2009 | Salanitri et al. |
| 2009/0233146 | A1 | 9/2009 | Lee et al. |
| 2010/0168346 | A1 | 7/2010 | Lee et al. |

FOREIGN PATENT DOCUMENTS

| | | |
|---|---|---|
| CN | 1703443 A | 11/2005 |
| CN | 104411388 A | 3/2015 |
| EP | 0029633 A2 | 6/1981 |
| EP | 0041780 A1 | 12/1981 |

(Continued)

OTHER PUBLICATIONS

McKay, Scott E., et al. "Synthesis of a new sulfonated monomer for poly (aryl ether) s." Heteroatom Chemistry: An International Journal of Main Group Elements 16.7 (2005): 553-556. (Year: 2005).*
Partial European Search Report dated Oct. 18, 2021 in related European Patent Office application No. 19750604.1, 15 pages.
Paul, et. al., "Synthesis And Crosslinking Of Partially Disulfonated Poly(Arylene Ether Sulfone) Random Copolymers As Candidates For Chlorine Resistant Reverse Osmosis Membranes", Polymer, Elsevier Science Publishers B.V,GB, vol. 49, No. 9, Apr. 29, 2008 (Apr. 29, 2008), pp. 2243-2252, XP022618178, ISSN: 0032-3861, DOI: 10.1016/J.POLYMER.2008.02.039.

(Continued)

*Primary Examiner* — Bradley R Spies
(74) *Attorney, Agent, or Firm* — Kilpatrick Townsend & Stockton LLP

(57) ABSTRACT

Described herein are water desalination membranes and methods of desalinating water. Sulfonated poly(arylene ether) polymers are also disclosed, including those comprising one or more sulfonate groups at various points along the polymer chain. The polymers may be used as at least a portion of a water desalination membrane. The polymers described herein are useful for preventing transport of aqueous ionic species (e.g., $Na^+$ and $Cl^-$) across a membrane made from the polymers while allowing water to pass. Chlorine-stable polymers are described, as well as polymers exhibiting good performance for rejecting monovalent cations in the presence of polyvalent cations.

21 Claims, 33 Drawing Sheets

(56) References Cited

FOREIGN PATENT DOCUMENTS

| EP | 0932213 A1 | 7/1999 |
| EP | 2048182 A1 | 4/2009 |
| WO | 03028139 A2 | 4/2003 |
| WO | 2017-029967 A1 | 2/2017 |
| WO | 2017-220363 A1 | 12/2017 |
| WO | 2019/157377 A1 | 8/2019 |

OTHER PUBLICATIONS

Sundell, et. al., "Cross-Linking Disulfonated Poly(arylene ether sulfone) Telechelic Oligomers. 1. Synthesis, Characterization, and Membrane Preparation", Industrial & Engineering Chemistry Research, vol. 53, No. 7, Feb. 19, 2014 (Feb. 19, 2014), pp. 2583-2593, XP055147953,ISSN: 0888-5885, DOI: 10.1021/ie404006s.

Smitha, B. et al., Synthesis and Characterization of Sulfonated PEEK Membranes for Fuel Cell Application. Journal of Polymer Materials, Dec. 31, 2004, pp. 99-106.

Park, J. et al., Synthesis and Self-assembly of Partially Sulfonated Poly(arylene ether sulfone)s and Their Role in Formation of Cu2S Nanowires. RSC Adv., Jun. 10, 2015, vol. 5, pp. 53611-53617, DOI: 10.1039/c5ra05563f.

Daryaei et al. "Structure-property relationships of crosslinked disulfonated poly(arylene ether sulfone) membranes for desalination of water", Polymer, 2017, 132, pp. 286-293.

First Written Opinion dated Feb. 7, 2022 in Singapore Application No. 11202007541V, 12 pages.

Corrected First Written Opinion dated Feb. 16, 2022 in Singapore Application No. 11202007541V, 12 pages.

First Examination Report dated Feb. 18, 2022 in India application No. 202017035877, 6 pages.

Extended European Search Report dated Mar. 16, 2022 in EPO application No. 19750604.1, 15 pages.

Parise, et. al. "Reverse Osmosis, Chlorine-Resistant Polysulfone Reverse Osmosis Membrane and Module", First Annual Ultrapure Water Conference and Exposition, Philadelphia, PA, Apr. 13-15, 1987., all pgs.

International Search Report and Written Opinion dated Jun. 3, 2019 in related application No. PCT/US2019/017349, all pgs.

Application No. CN201980023709.4 , Office Action, dated May 13, 2022, 46 pages.

* cited by examiner

SULFONATED POLY(ARYLENE ETHER) MEMBRANES WITH HIGH MONOVALENT SALT REJECTION EVEN IN THE PRESENCE OF MIXED SALT FEEDS THAT CONTAIN MULTIVALENT SALTS

CROSS-REFERENCE TO RELATED APPLICATIONS

This application is a continuation of PCT/US2019/017396, filed on Feb. 9, 2019, which application claims the priority of U.S. Provisional Application Nos. 62/628,347 and 62/628,349, both filed on Feb. 9, 2018, the disclosures of which are hereby incorporated by reference in their entireties for all purposes. PCT/US2019/017349, filed Feb. 8, 2019, is hereby incorporated by reference in its entirety for all purposes.

BACKGROUND

Clean water is critical to the safety, security and survivability of mankind. Nearly 41% of the Earth's population lives in water-stressed areas, and water scarcity will be exacerbated by an increasing population. According to the U.S. Geological Survey, ~96.5% of the Earth's water is located in seas and oceans with the remaining in surface and ground water, mostly frozen in glaciers and ice caps. Approximately 96% of the total water is saline, and only ~0.8% is considered to be accessible fresh water. Thus, saltwater desalination is important for tackling the problem of water scarcity. Thermal desalination methods are not energetically efficient because they rely on an energy-intensive phase change and require a large quantity of fuel to vaporize the water. Membrane based desalination processes are more economical and energetically efficient than thermal methods for seawater desalination and for other related water purification applications. Anionic sulfonated poly(arylene ether) membranes for water desalination have been shown to have high water permeability and good rejection of monovalent salts (e.g., NaCl), but prior membranes made from such materials are typically not very good at rejecting monovalent ions (e.g., $Na^+$ $Cl^-$) in the presence of polyvalent cations (e.g., $Ca^{2+}$, $Mg^{2+}$, etc.). Given that polyvalent salts are found in virtually all saline water and surface water sources, further development is needed.

SUMMARY OF THE INVENTION

The present invention relates generally to methods and systems for desalinating water and compositions useful for desalinating water. More particularly, embodiments of the present invention provide sulfonated poly(arylene ether) polymers, methods of making such polymers, and methods and systems for using such polymers in desalination of water.

In one aspect, linear sulfonated poly(arylene ether)s are provided. Linear sulfonated polymers may be copolymers, such as polymers comprising two or more different monomer units. The polymers may be polymerized via chemical reaction between monomers. Linear sulfonated copolymers of this aspect may be formed from presulfonated monomers, meaning that one or more substituents of the monomers may be a sulfonate group (e.g., $-SO_3^-$, $SO_3Na$, $SO_3K$, etc.). In some cases, presulfonated and unsulfonated monomers are polymerized to form a copolymer. In other cases, unsulfonated monomers are polymerized to form a copolymer, then sulfonate groups are added in a post-sulfonation reaction.

In a specific embodiment, a copolymer may comprise the structure:

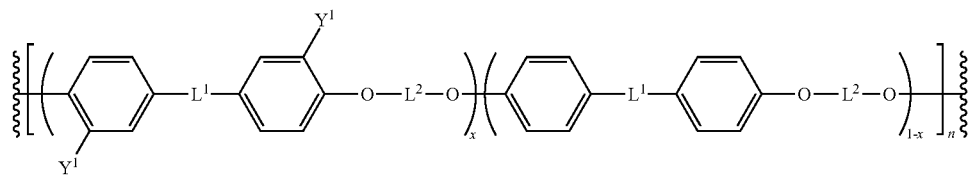

where each $L^1$ is independently

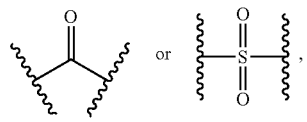

each $L^2$ is independently

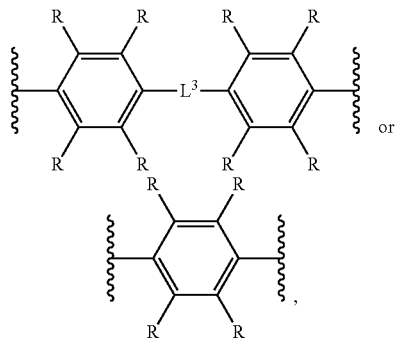

each $L^3$ is independently a single bond, $CH_3$, or

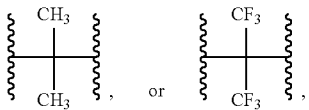

$CF_3$, one $Y^1$ is $SO_3Z$ and the other Y is H, Z is a counterion (e.g., a metal ion), and each R is independently H, F, or $CH_3$. Values for x may be from 0 to 1, and values for n may be any suitable number for a polymer, such as from 2 to 100,000, for example.

In another specific embodiment, a copolymer may comprise the structure:

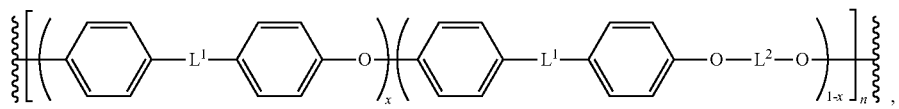

where each $L^1$ is independently

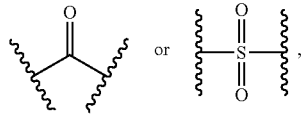

each $L^2$ is independently

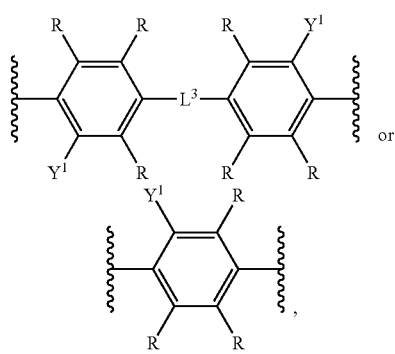

each $L^3$ is independently a single bond,

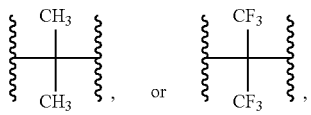

$Y^1$ is $SO_3Z$ or H, Z is a counterion (e.g., a metal ion), and each R is independently H, F, or $CH_3$. Values for x may be from 0 to 1, and values for n may be any suitable number for a polymer, such as from 2 to 100,000, for example.

In some embodiments, a terminating group on one or both ends of a polymer may be included and the molecular weights may be controlled by adjusting the stoichiometries among the monomers and terminating agents by state of the art methods for synthesizing step-growth copolymers. The terminating groups may include or comprise an alkenyl group, a styrenic group, a fluorinated styrenic group, a carbonyl group, a carboxylate ester, an amino group, a phenol group, or other crosslinkable groups, which may be useful for permitting crosslinking between polymer chains, such as when exposed to a crosslinking agent. Optionally, a copolymer may comprise or further comprise one or more terminating groups A, each terminating group A independently selected from

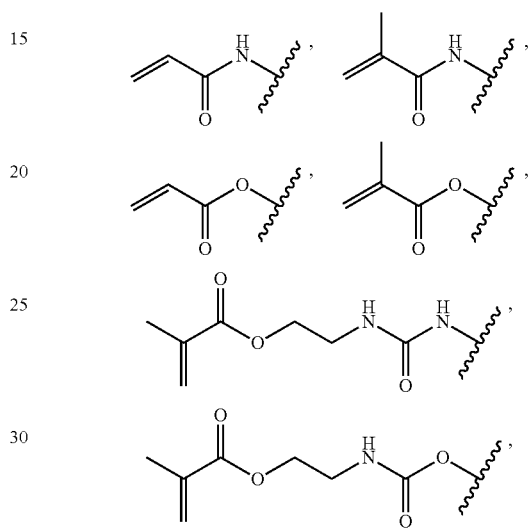

tetrafluorostyrene, an aminophenol or a phenol. By subjecting a copolymer, or a blend of the copolymers with different molecular weights, containing one or more crosslinkable groups to a crosslinking agent, such as heat, light, a free radical initiator, an epoxy reagent, etc., a crosslinked network may be formed of any of the copolymers described herein. Low molecular weight crosslinkable monomers may also be added to these copolymers to make crosslinked networks from such mixtures.

An example crosslinkable oligomeric macromonomer of this aspect may have the structure:

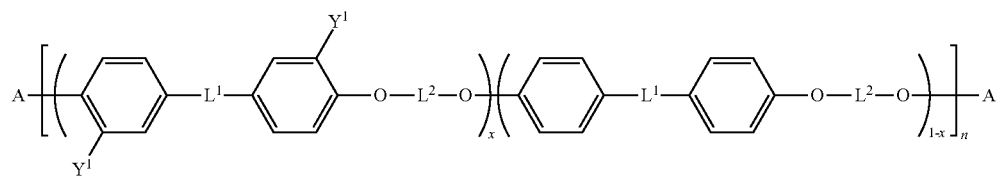

where each $L^1$ is independently

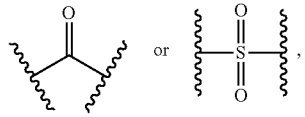

each L² is independently

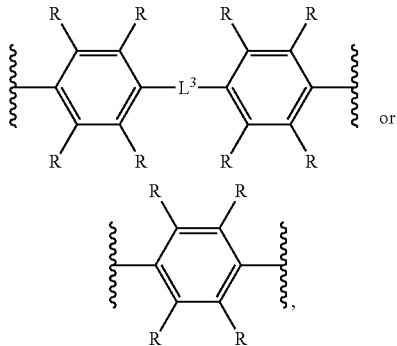

each L³ is independently a single bond,

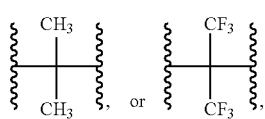

each Y¹ is independently H or SO₃Z, Z is a counterion (e.g., Na⁺ or K⁺), each R independently H, F, or CH₃, each A is independently,

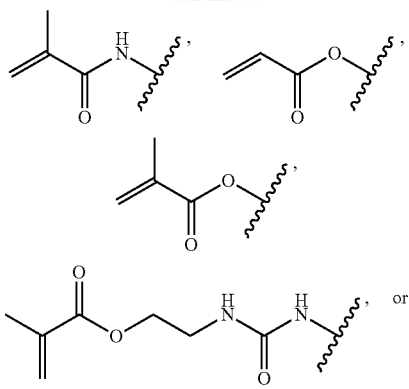

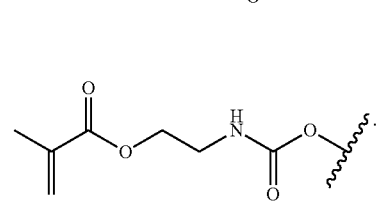

Another crosslinkable oligomeric macromonomer prepared by post-sulfonation may have the following structure:

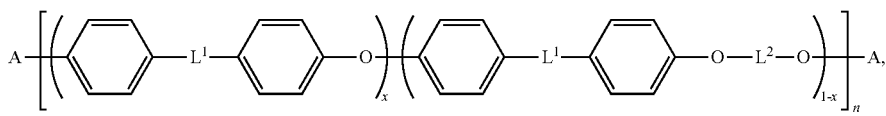

where each L¹ is independently

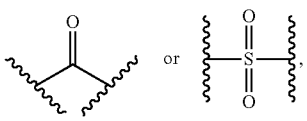

or each L² is independently

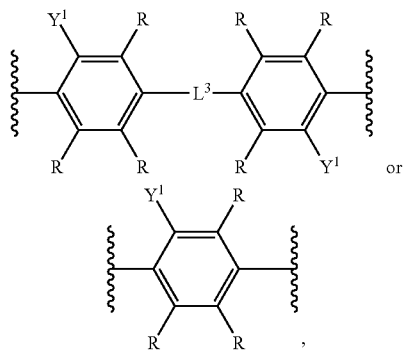

each L³ is independently a single bond,

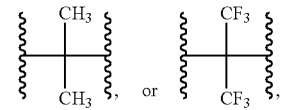

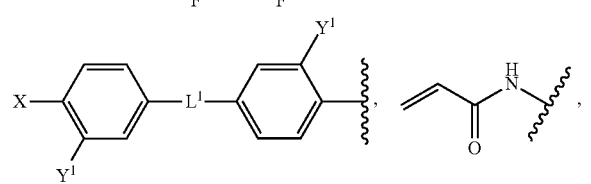

each $Y^1$ is independently H or $SO_3Z$, Z is a counterion (e.g., $Na^+$ or $K^+$), each R is independently H, F, or $CH_3$, and each A is independently,

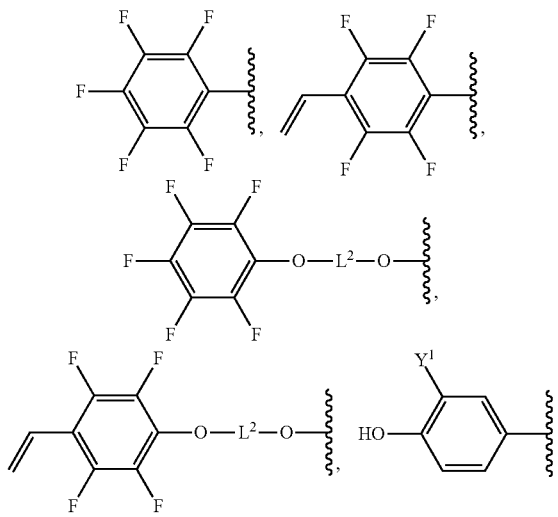

where Y is $SO_3Z$ or H,

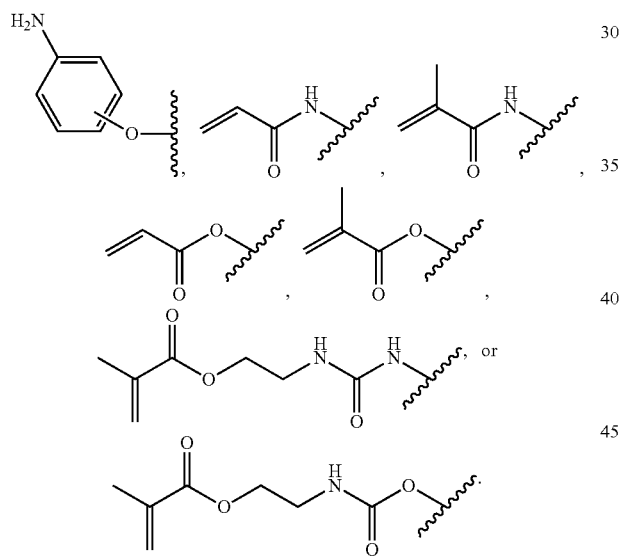

Functional oligomeric macromonomers of the above aspects may optionally e crosslinked, such as after exposure to a crosslinking agent. Optionally, blends of functional oligomeric macromonomers with different crosslinkable terminating agents or with different molecular weights may be crosslinked together, or low molecular weight monomers or crosslinking agents may be added to the mixture.

Copolymers described herein may have any suitable molecular weight or length. The copolymers described herein are generally random copolymers in which a fractional amount (x or 1-x) of a sulfonate containing structural unit ranges from about 5% to about 95%, which may optionally be referred to herein as the degree of sulfonation. Example fractional amounts of sulfonate containing structural units may include from 5% to 10%, from 10% to 15%, from 15% to 20%, from 20% to 25%, from 25% to 30%, from 30% to 35%, from 35% to 40%, from 40% to 45%, from 45% to 50%, from 50% to 55%, from 55% to 60%, from 60% to 65%, from 65% to 70%, from 70% to 75%, from 75% to 80%, from 80% to 85%, from 85% to 90%, or from 90% to 95%. It will be appreciated that the copolymer molecular weight or length and/or the fractional amounts of sulfonate containing structural units in a copolymer may dictate the copolymer's properties, which may in turn impact the suitability of the polymer for use in different applications. For example, the amount of sulfonation may correlate with the ion exchange capacity (IEC) of the copolymer. Optionally, the IEC may be expressed in units of milliequivalents per gram of dry polymer. Example IEC values for the copolymers described herein may range from about 0.1 to about 5, such as from 0.1 to 0.5, from 0.5 to 1, from 1 to 2, from 2 to 3, from 3 to 4, or from 4 to 5.

In another aspect, synthetic methods are described herein. In some embodiments, methods of making copolymers are described. An example method of making a copolymer comprises reacting $HO-L^2-OH$ with

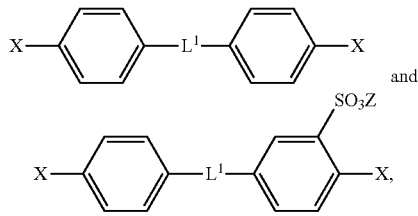

optionally together with an aminophenol to endcap the copolymer and control the molecular weight, to generate a copolymer, where each $L^1$ is independently

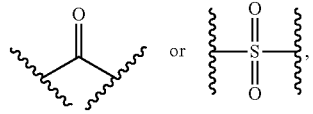

$L^2$ is

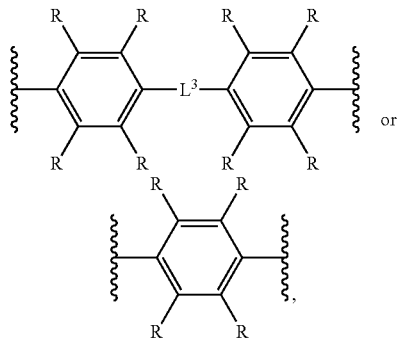

$L^3$ is a single bond,

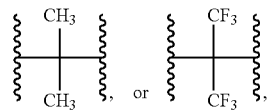

each R is independently H, F, or CH₃, and X is a halogen. Optionally, a method of this aspect further comprises exposing the copolymer terminated with either a phenol or with an aromatic amine derived from reaction with an aminophenol to a crosslinking agent. Optionally, a method of this aspect further comprises reacting a copolymer having phenol endgroups with

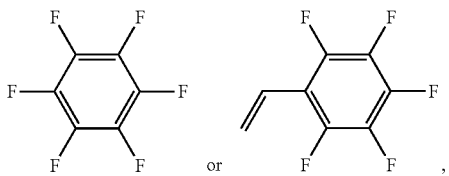

or reacting a copolymer with phenol or aminophenol endgroups with an acryloyl halide (e.g., acryloyl chloride), a methacryloyl halide (e.g., methacryloyl chloride), isocyanatoethyl acrylate or isocyanatoethyl methacrylate to generate an end-functionalized copolymer. Optionally, the end-functionalized copolymer may be crosslinked by exposure to a crosslinking agent, such as heat, light, a free radical initiator, or an epoxy reagent.

Another method of making a copolymer comprises reacting HO-L²-OH with

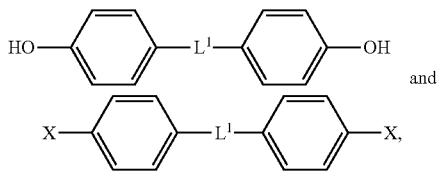

optionally together with an aminophenol, to generate a copolymer, where each L¹ is independently

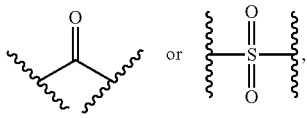

L² is

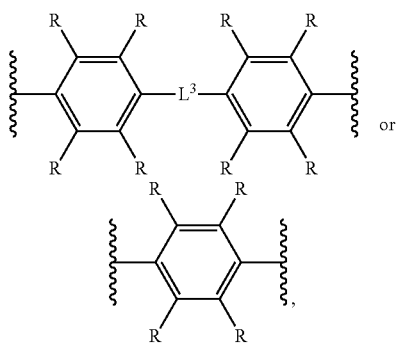

L³ is a single bond,

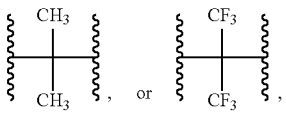

each R is independently H, F, or CH₃, and X is a halogen. The stoichiometry can be offset to generate controlled molecular weight macromonomers with phenol endgroups by state of the art methods for step-growth polymers, or aminophenol can be added in calculated amounts to generate controlled molecular weight copolymers with aromatic amine endgroups. Then those phenol or aromatic amine terminated macromonomers can be post-sulfonated to generate approximately one SO₃Z group on each ring of L², where Z is a counterion. Optionally, methods of this aspect further comprise reacting the phenol terminated copolymer or a sulfonated copolymer with

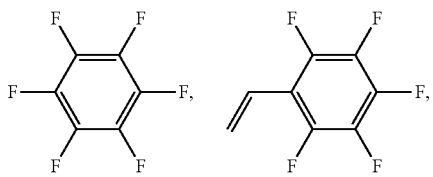

or a phenol or aminophenol terminated copolymer or sulfonated copolymer with an acryloyl halide, a methacryloyl halide, isocyanatoethyl acrylate, or isocyanatoethyl methacrylate to generate an end-functionalized copolymer or end-functionalized sulfonated copolymer. Optionally, methods of this aspect further comprise reacting the end-functionalized copolymer with a sulfonating reagent such as sulfuric acid to post-sulfonate the end-functionalized copolymer and generate an end-functionalized sulfonated copolymer. Optionally, methods of this aspect may include a crosslinking step, such as a step comprising initiating a crosslinking reaction by subjecting the end-functional phenol, aromatic amine from aminophenol, fluorostyrene, fluoroinated aromatic, acrylate, acrylamide, methacrylate, methacrylamide, or urea or urethane acrylate or methacrylate terminated copolymer to a crosslinking agent, such as heat, light, a free radical initiator or an epoxy reagent.

It will be appreciated that each of the aforementioned groups or structures in this summary section may be unsubstituted or substituted, meaning that any hydrogen atom may be replaced by another group as described below.

In another aspect, water desalination membranes are described. An example desalination membrane may comprise any one or more of the copolymers described herein. Various different properties may be established in the desalination membrane by selection of suitable copolymers. For example, it may be desirable to employ copolymers with crosslinkable endgroups to permit crosslinking in the membrane, such as to provide or increase mechanical robustness in the membrane. Linear sulfonated poly(arylene ether sulfone)s are known to be relatively stable toward aqueous chlorine compounds commonly used as disinfectants in water treatment systems. To retain chlorine stability in the crosslinked networks, it may be desirable to employ copolymers with terminal groups or crosslinking agents that are also stable toward chlorine, e.g., fluorinated endgroups for crosslinking. Advantageously, membranes comprising the polymers and copolymers described herein may be useful for desalinating water including mixed valence salts (e.g., monovalent salts, such as those comprising $Na^+$ and $K^+$ with appropriate counterions, and polyvalent salts, such as those comprising $Ca^{2+}$, $Mg^{2+}$ with appropriate counterions, and any other ionic species). Prior sulfonated desalination membranes may exhibit poor performance for rejecting monovalent ions when divalent cations are present in a feed, but membranes comprising the polymers and copolymers described herein exhibit high rejection of monovalent ions despite the presence of divalent or polyvalent cations in a feed. For example, the water desalination membranes described herein may exhibit a rejection of aqueous monovalent ions of over 90% in the presence of polyvalent cations. Optionally, the rejection may be greater than or about 90%, greater than or about 91%, greater than or about 92%, greater than or about 93%, greater than or about 94%, greater than or about 95%, greater than or about 96%, greater than or about 97%, greater than or about 98%, greater than or about 99%, greater than or about 99.5%, or greater than or about 99.9%.

In another aspect, methods of desalinating water utilizing the sulfonated poly(arylene ether) membranes of this invention are also described herein, such as with water including mixed salts and combinations of salts with mixed valencies.

A method of this aspect comprises exposing a first side of a sulfonated poly(arylene ether) water desalination membrane to an aqueous salt solution, the aqueous salt solution comprising a mixture of monovalent ions and polyvalent cations, wherein the water desalination membrane comprises a water desalination membrane that can reject at least 90% of the monovalent salts even in the presence of multivalent salts; pressurizing the aqueous salt solution to drive a reverse osmosis process wherein water from the aqueous salt solution passes from the first side of the water desalination membrane through to a second side of the water desalination membrane and wherein at least 90% of the monovalent ions are rejected from passing through the water desalination membrane in the presence of the polyvalent cations. Optionally, a concentration of the polyvalent cations is from 1 part per million to 5000 parts per million. For example, a concentration of the polyvalent cations may be at least or about 100 parts per million, at least or about 500 parts per million, at least or about 1000 parts per million, at least or about 1500 parts per million or at least or about 2000 parts per million. Optionally, a concentration of the monovalent cations is from 500 parts per million to 50,000 parts per million. For example, a concentration of the monovalent ions may be at least or about 1000 parts per million, at least or about 5000 parts per million, at least or about 10,000 parts per million, at least or about 15,000 parts per million, or at least or about 20,000 parts per million. Optionally, the water is saline water or seawater.

As noted above, the polymers and copolymers described herein may be stable in the presence of chlorine and chlorine compounds due to the excellent chemical stabilities of sulfonated and unsulfonated poly(arylene ether)s. Optionally, the aqueous salt solution includes a halide-based sterilization agent and the water desalination membrane remains substantially unoxidized by the halide-based sterilization agent.

These and other embodiments of the invention along with many of its advantages and features are described in more detail in conjunction with the text below and attached figures.

The membranes are epoxy-crosslinked networks where the precursor oligomer molecular weights were 5000 g/mole (mBX-5) or 10,000 g/mole (mBX-10). X refers to the percentage of the repeat units that were sulfonated×$10^{-1}$. The oligomers were prepared from a pre-monosulfonated dihalide monomer reacted with dichlorodiphenylsulfone and biphenol.

Figure 14:
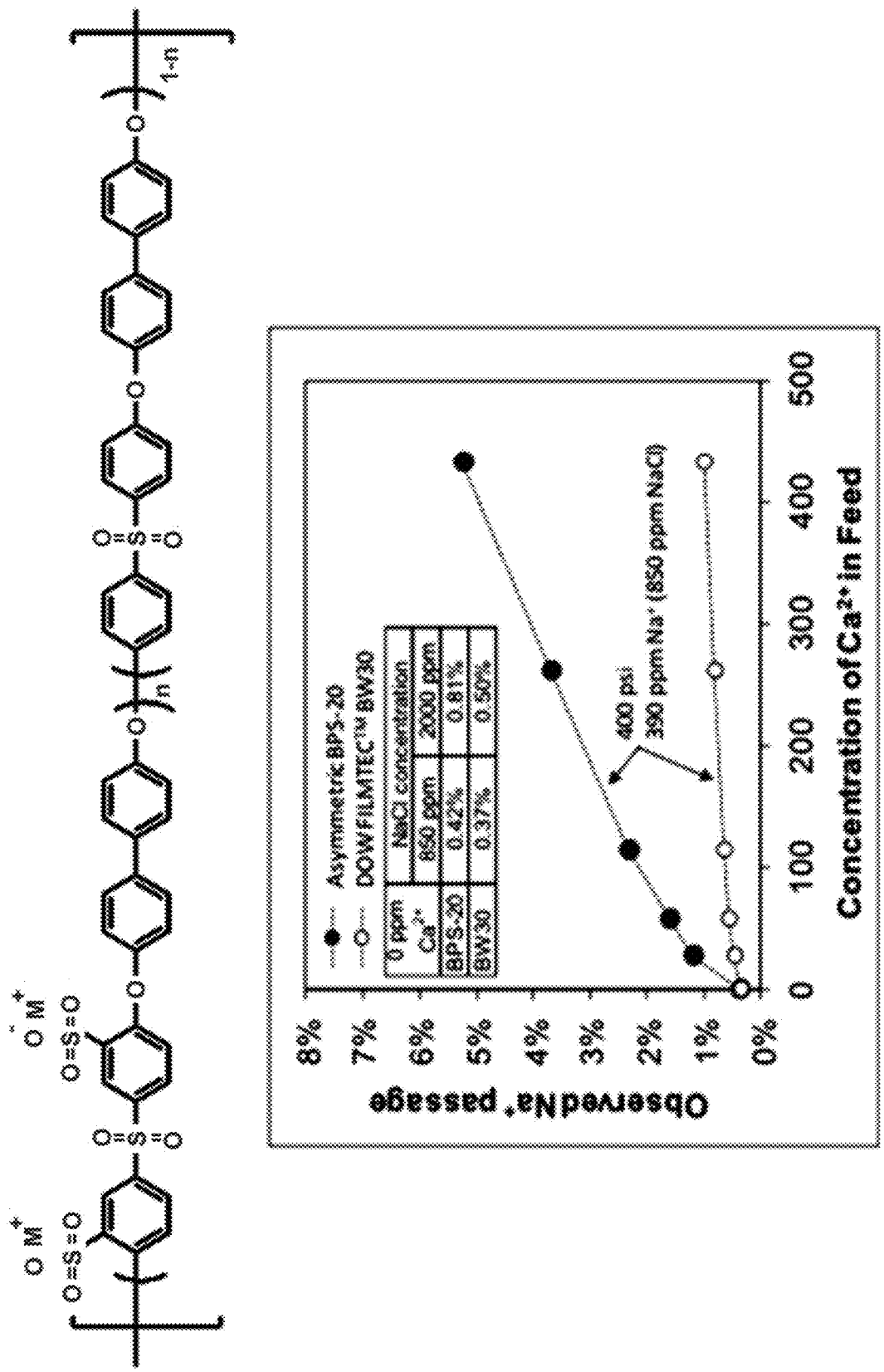
Figure 15:
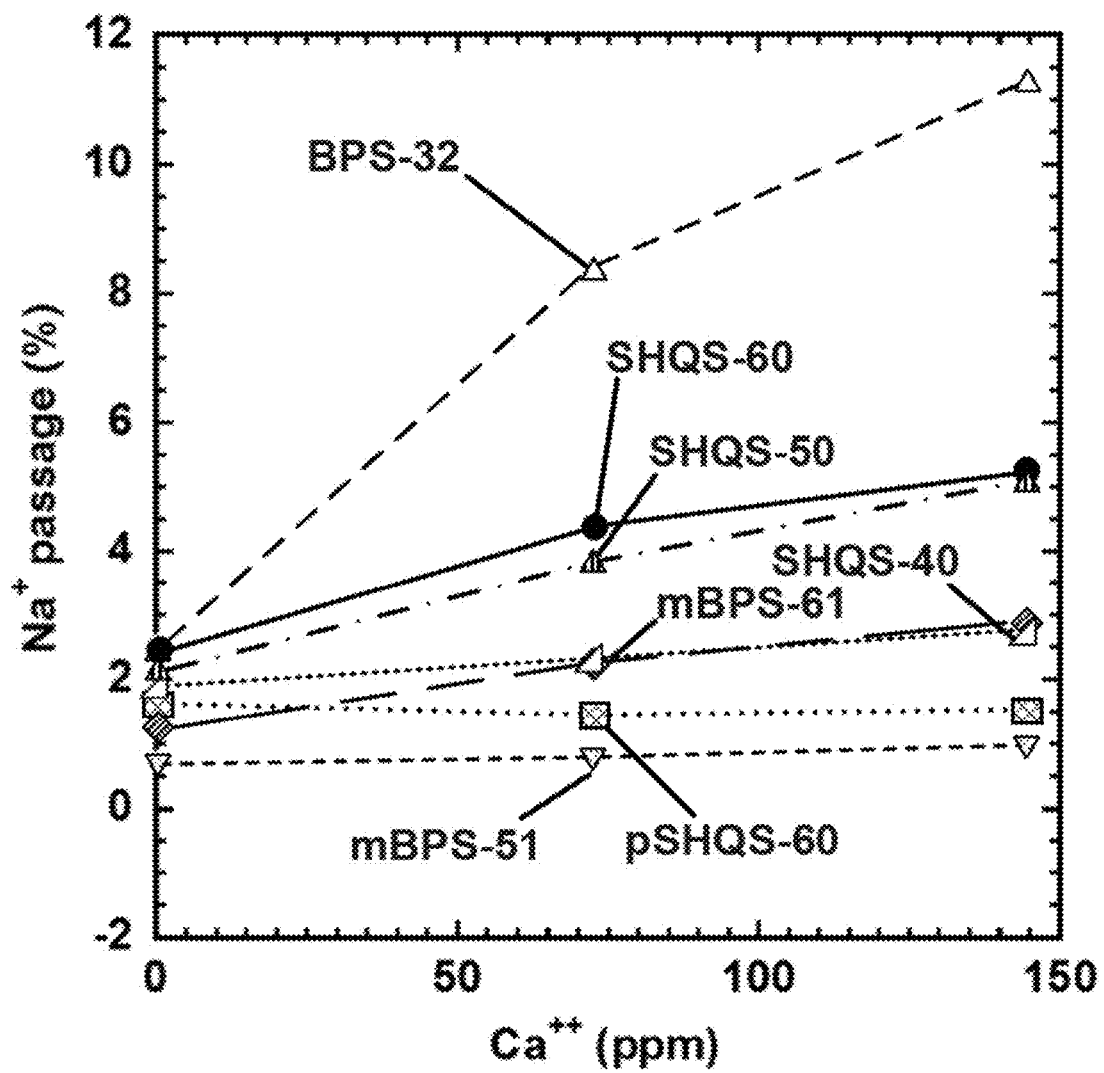

FIG. 14 and FIG. 15 provide data showing sodium ion passage as a function of calcium ion feed concentration for different membranes. Table 2, below, and the following structures can be used in reference to these figures.

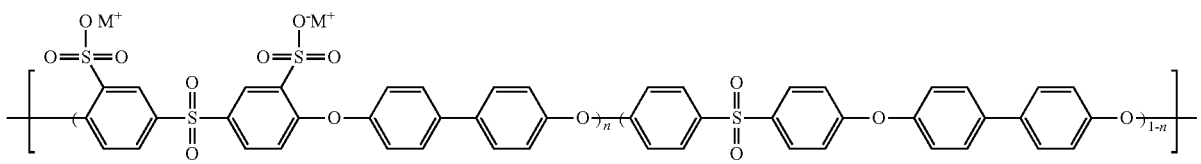

BPS-32

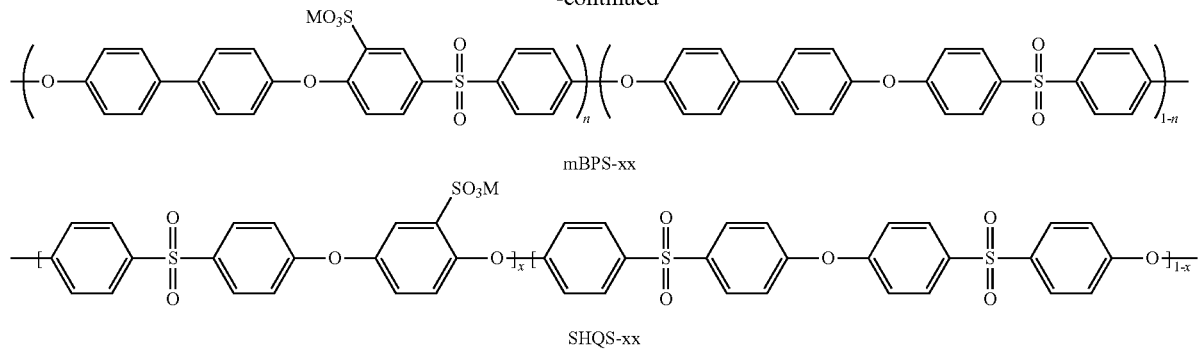

mBPS-xx

SHQS-xx

Figure 16:
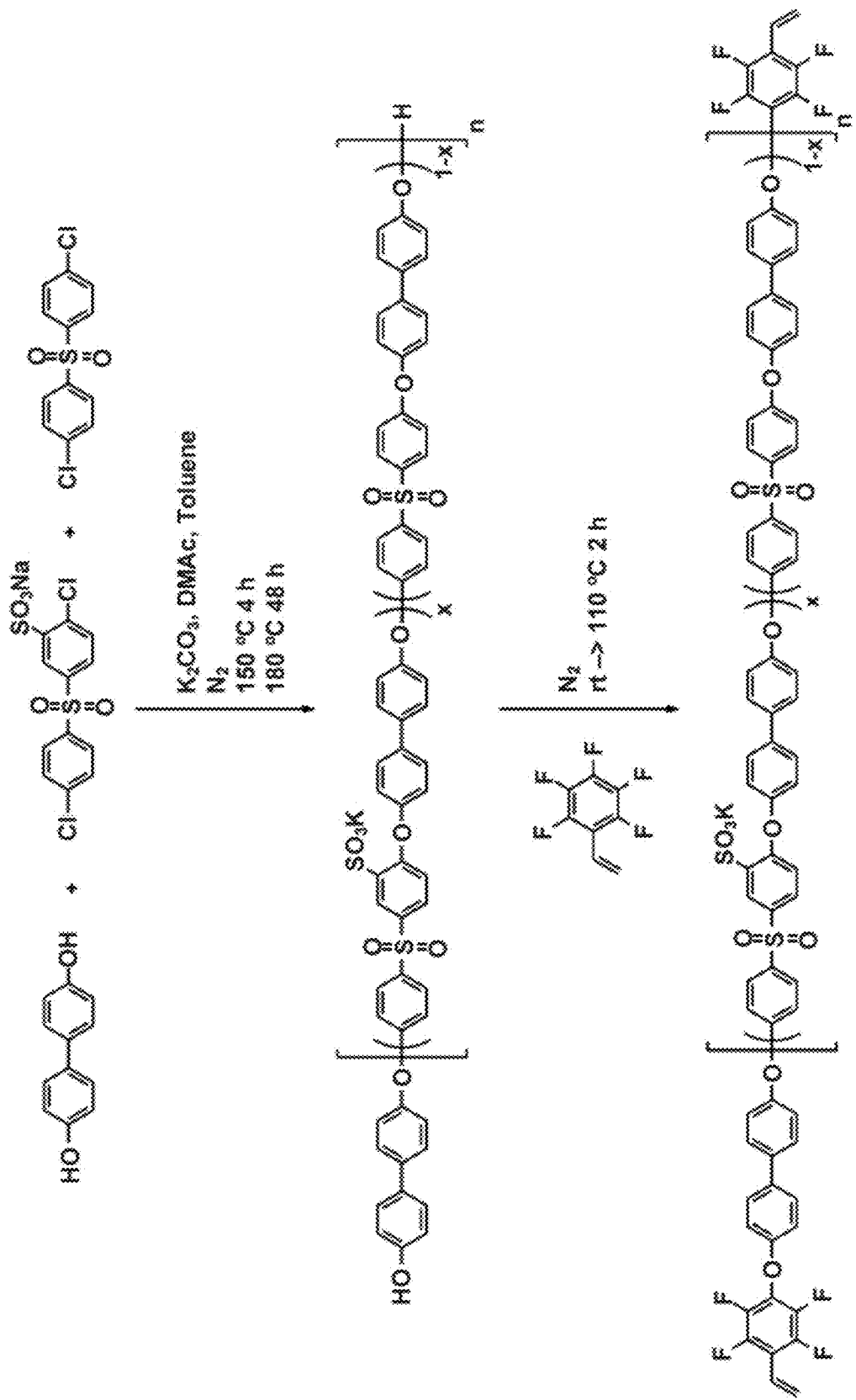

FIG. 16 provides an example synthetic route for polymer synthesis.

Figure 17:
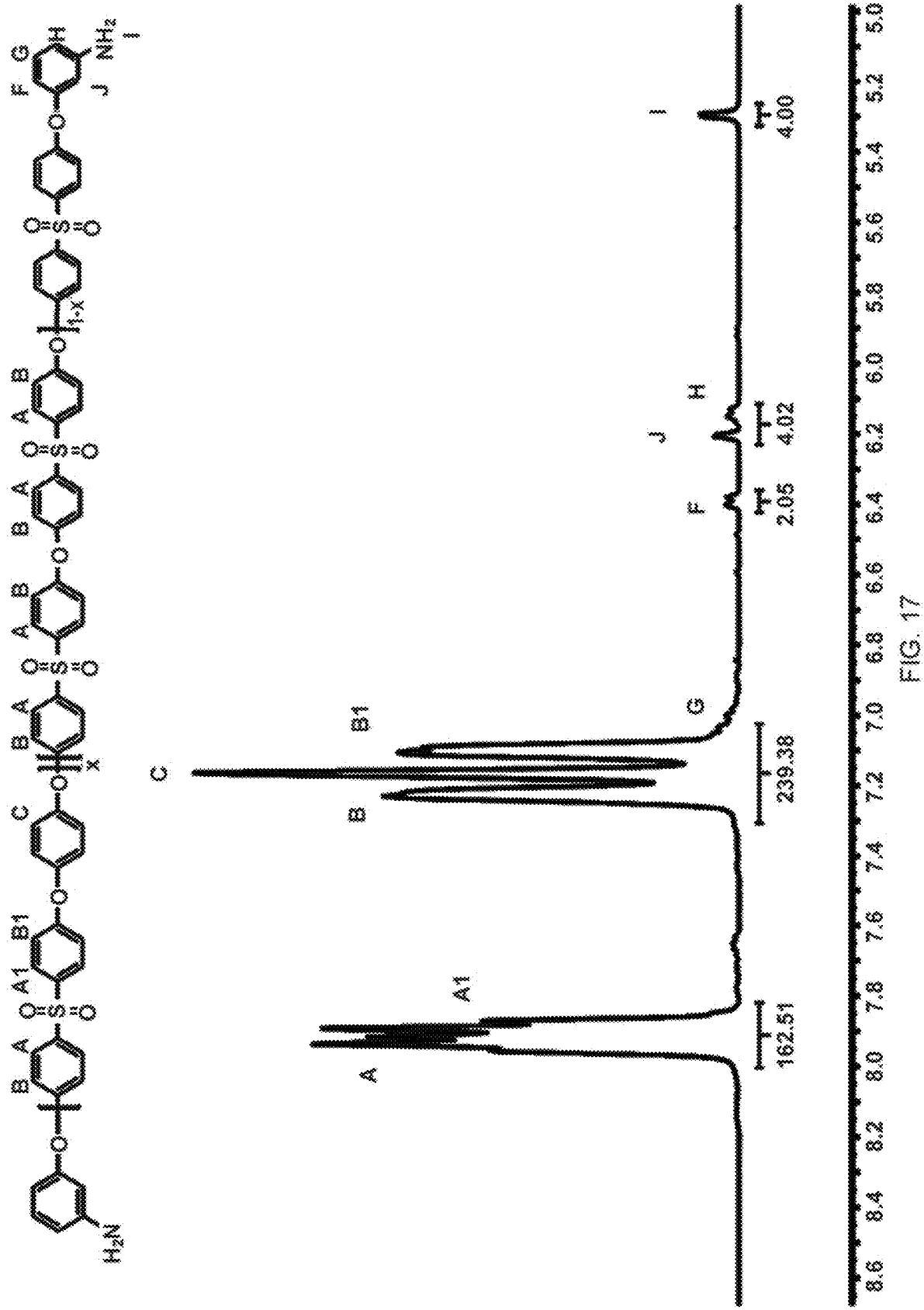
Figure 18:
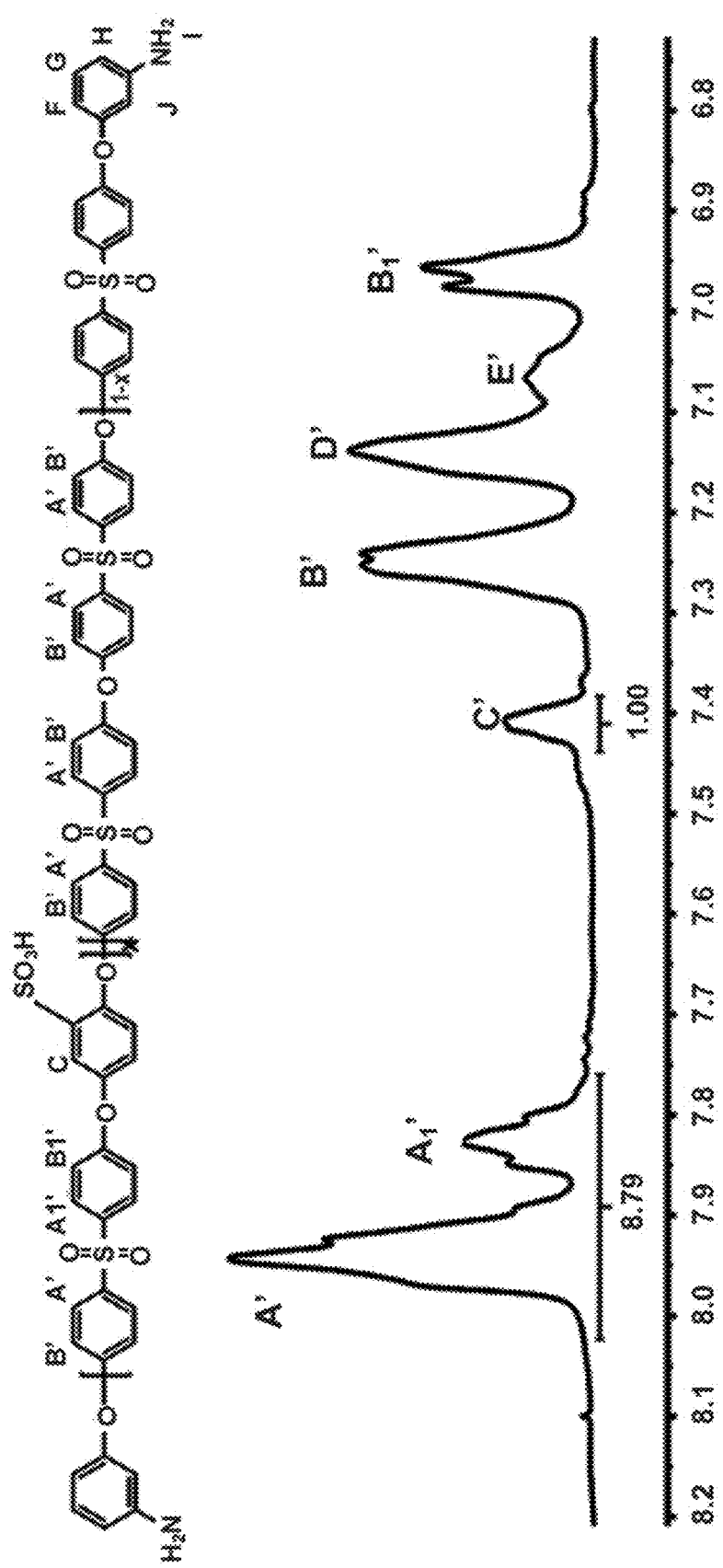
Figure 19:
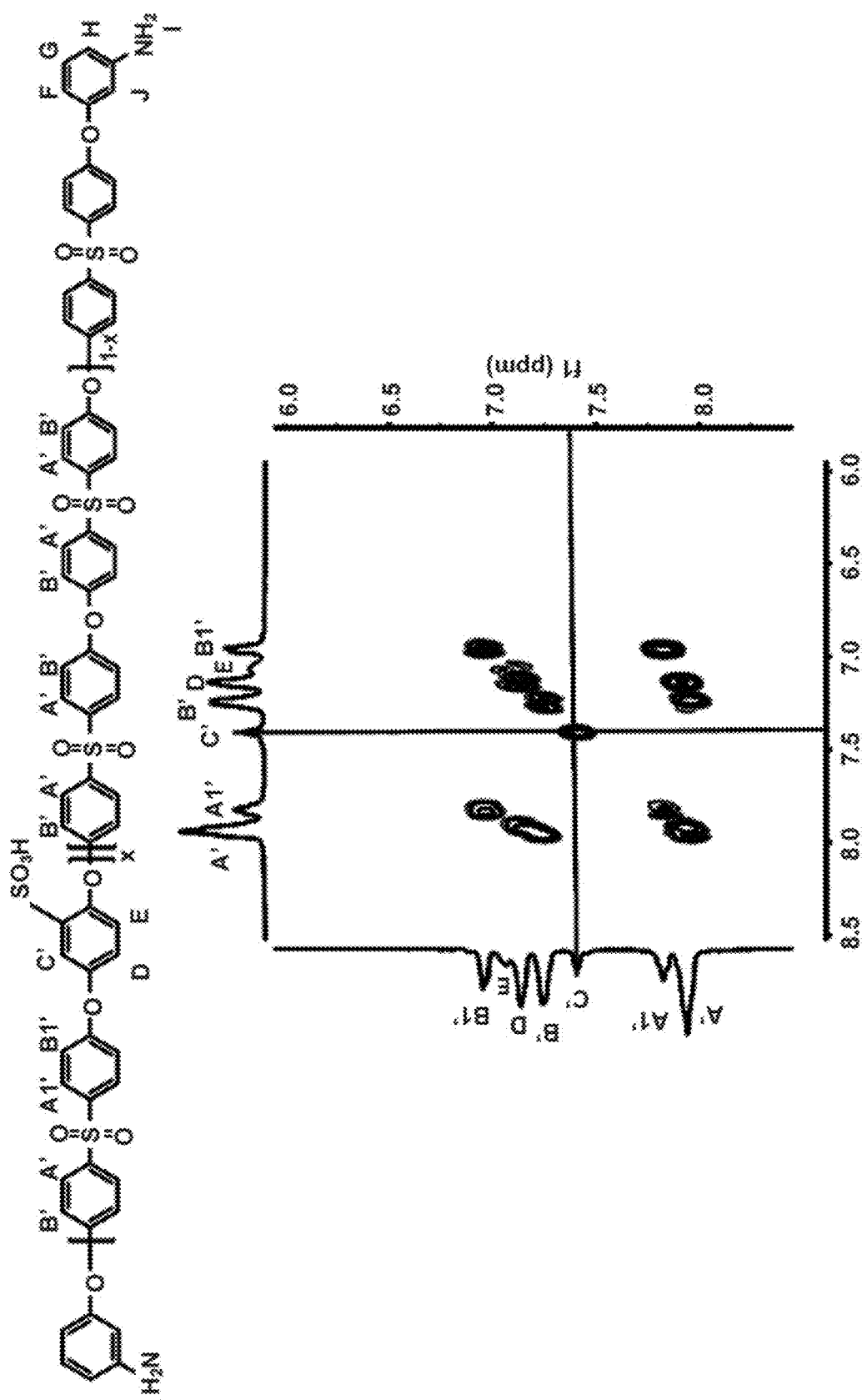

FIG. 17, FIG. 18, and FIG. 19 provides polymeric structure data by NMR.

Figure 20:
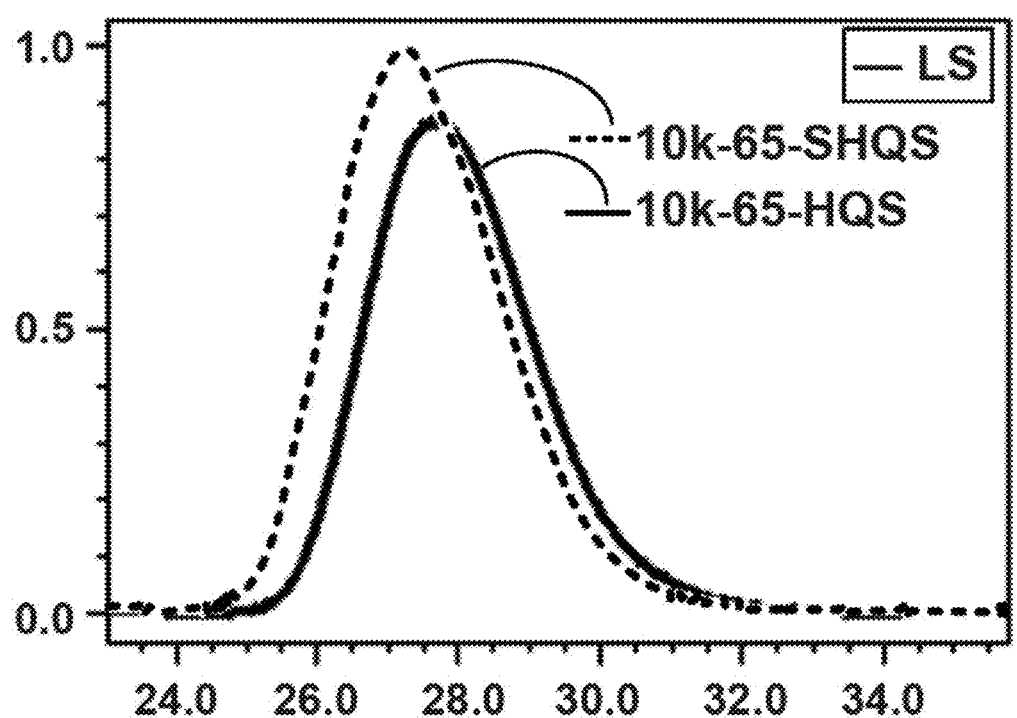

FIG. 20 provides size exclusion chromatography results, using a light scattering detector, to characterize molecular weight and molecular weight distribution for different polymers. (x axis refers to time in minutes and the y is a measure of light scattering intensity)

Figure 21A:
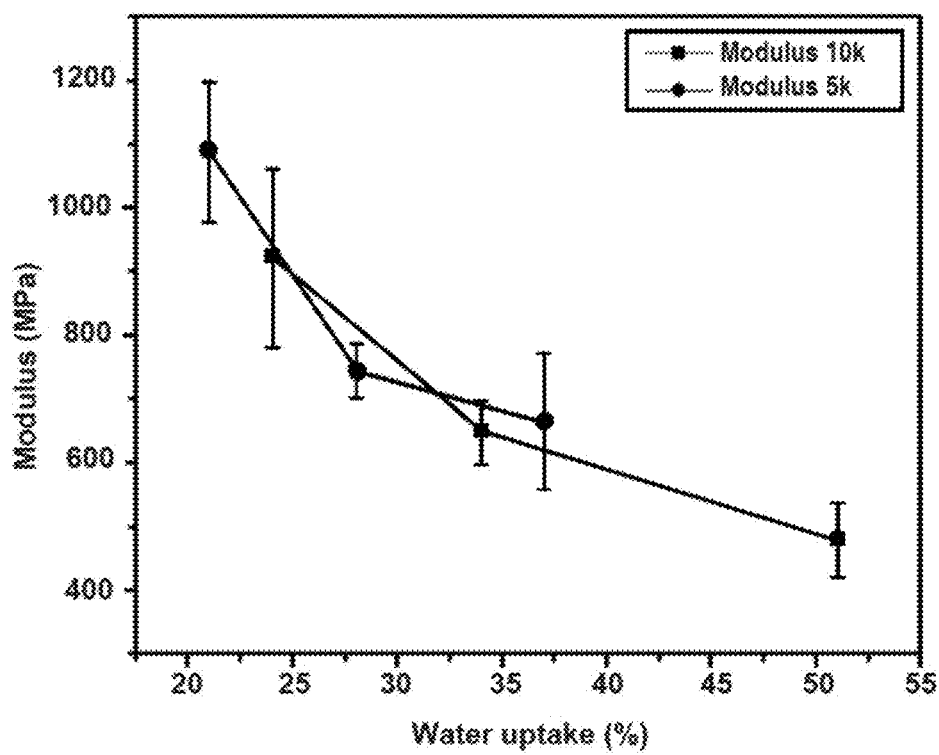
Figure 21B:
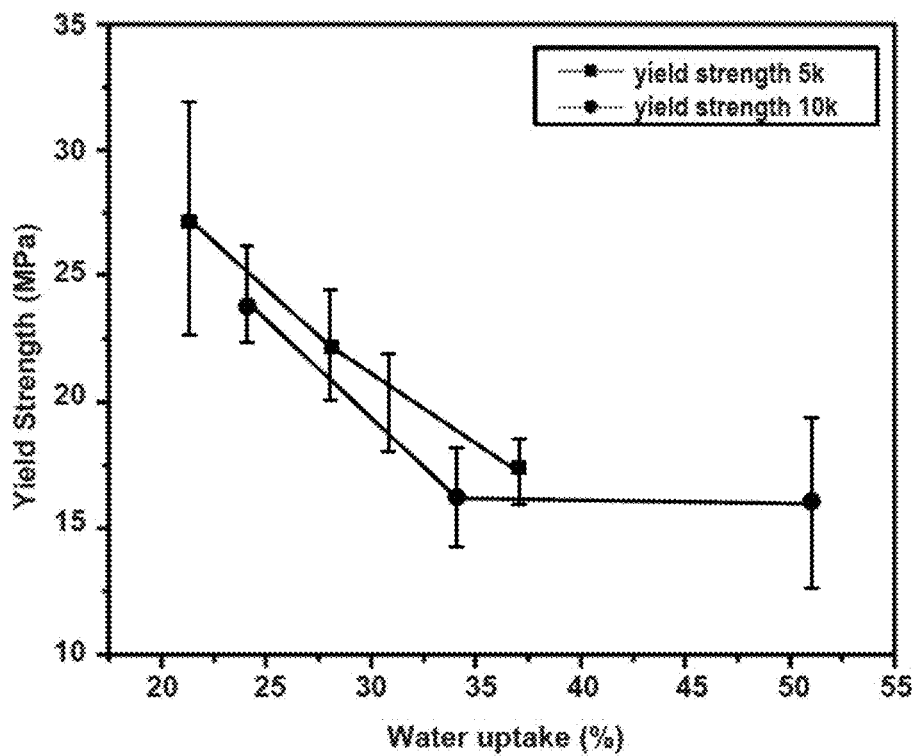
Figure 21C:
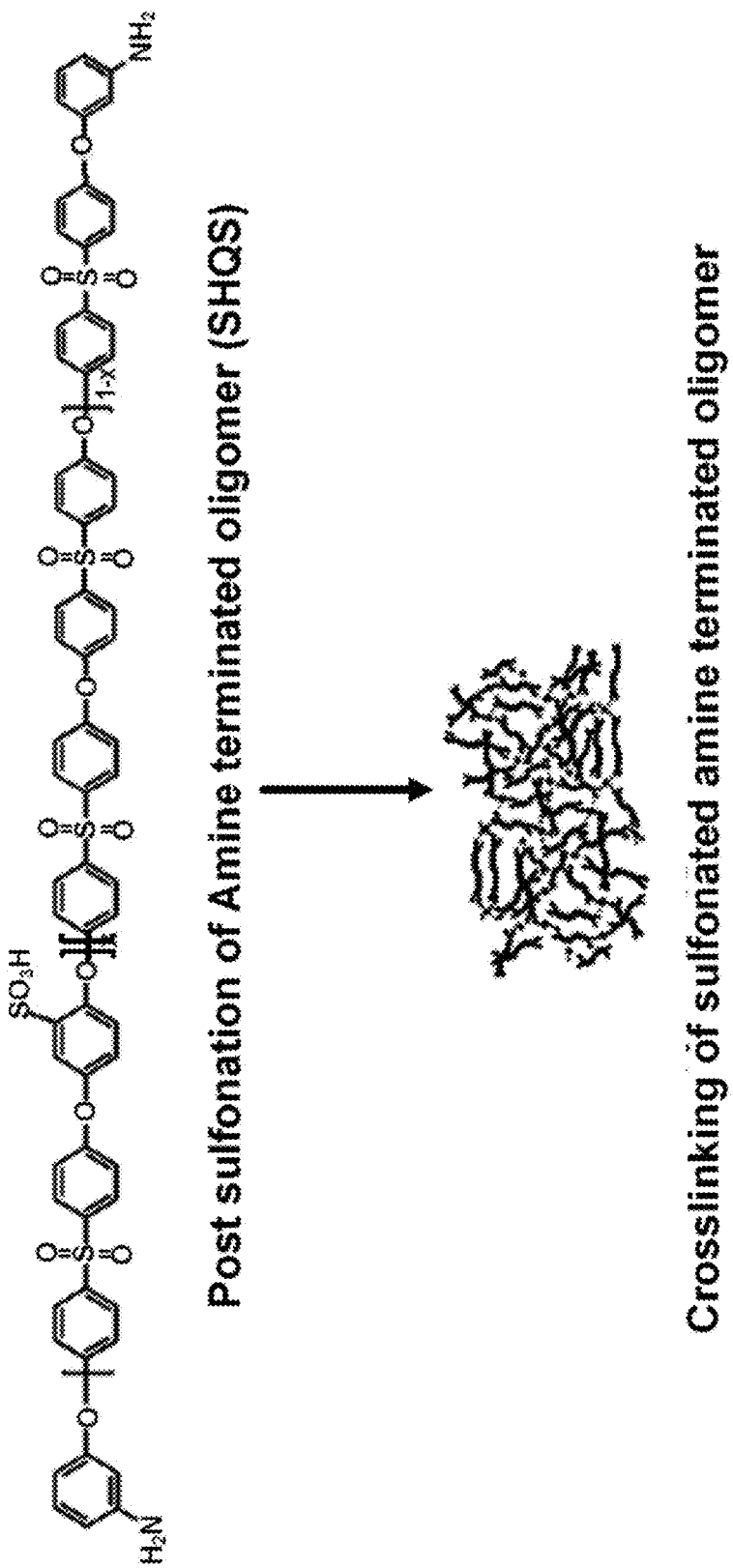

FIG. 21A and FIG. 21B show hydrated mechanical properties as a function of water uptake for crosslinked post-sulfonated membranes containing hydroquinone as shown in FIG. 21C.

Figure 22A:
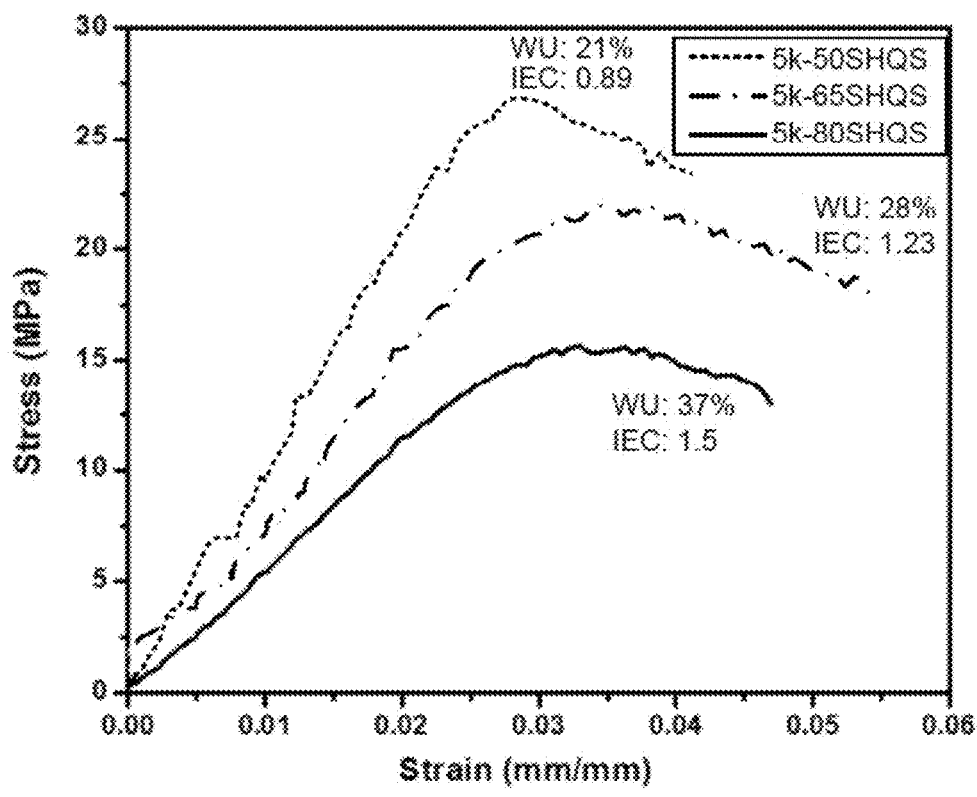
Figure 22B:
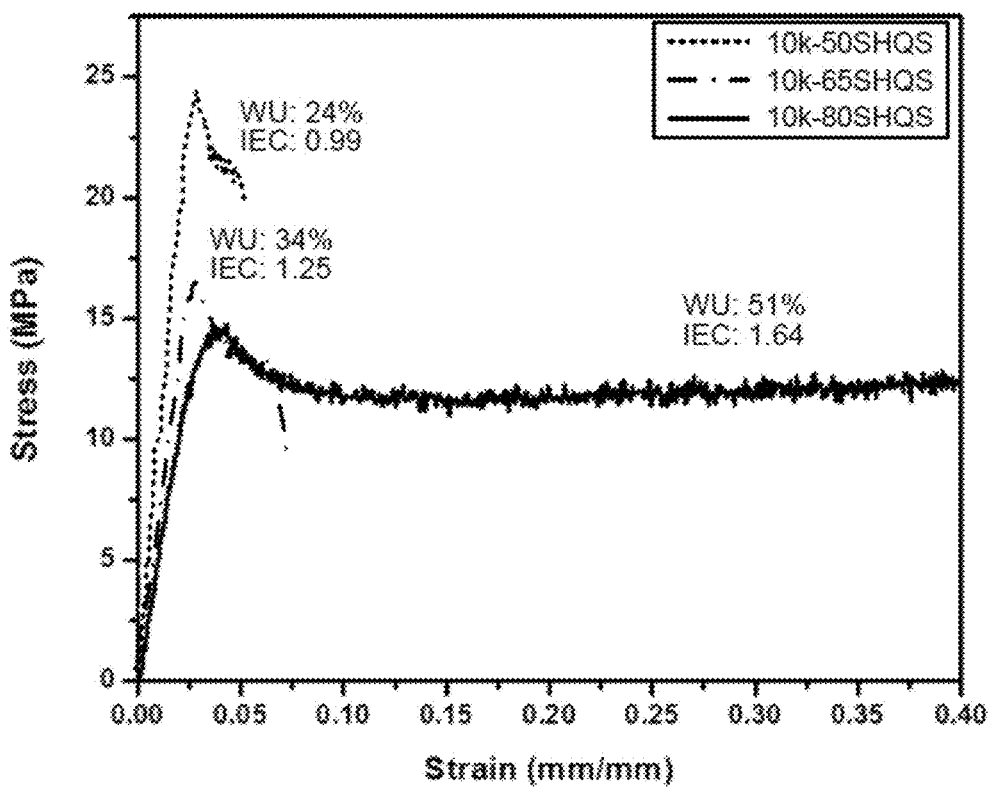

FIG. 22A and FIG. 22B provide hydrated stress/strain data for the crosslinked copolymer membranes described in FIG. 21C.

Figure 23:
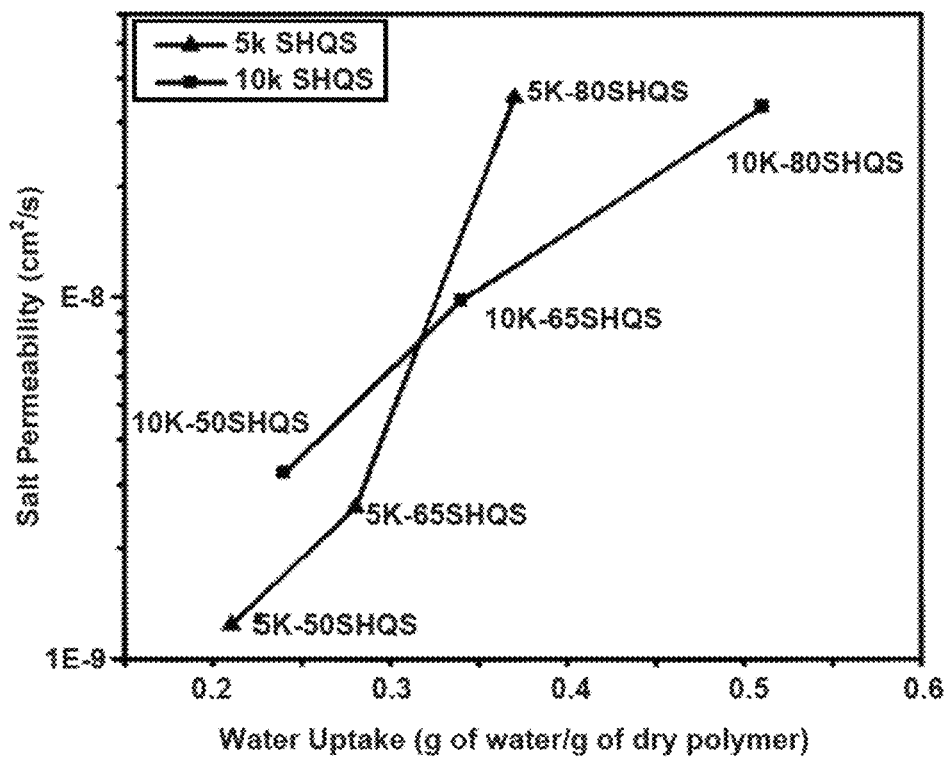
Figure 24:
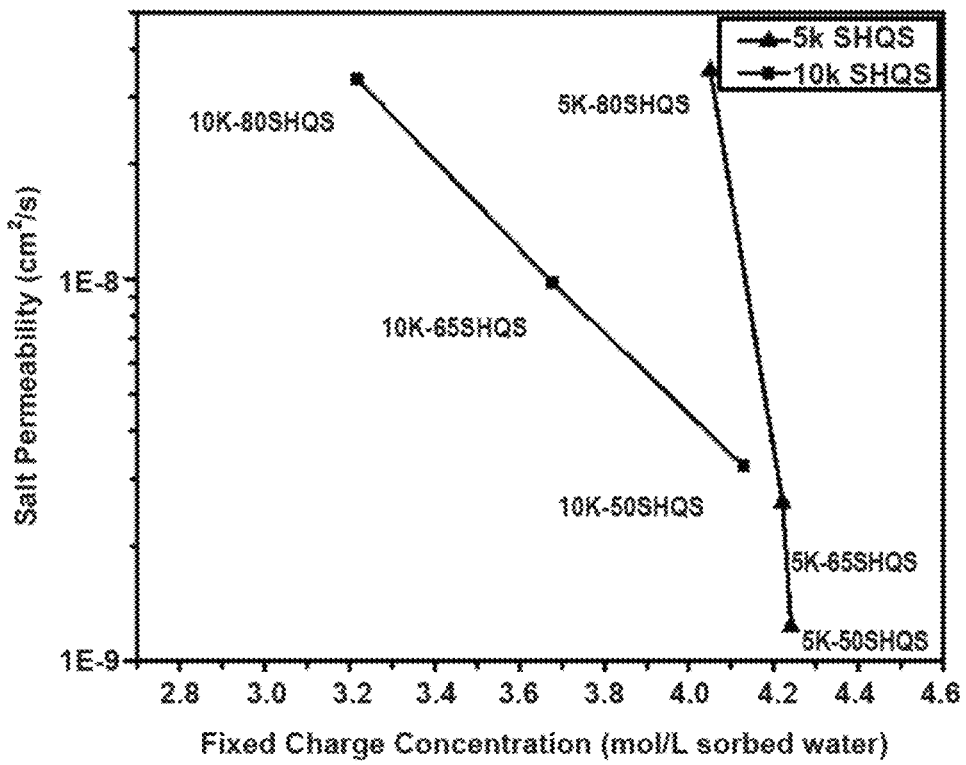

FIG. 23 and FIG. 24 provide salt permeability data for the crosslinked membranes described in FIG. 21C.

Figure 25:
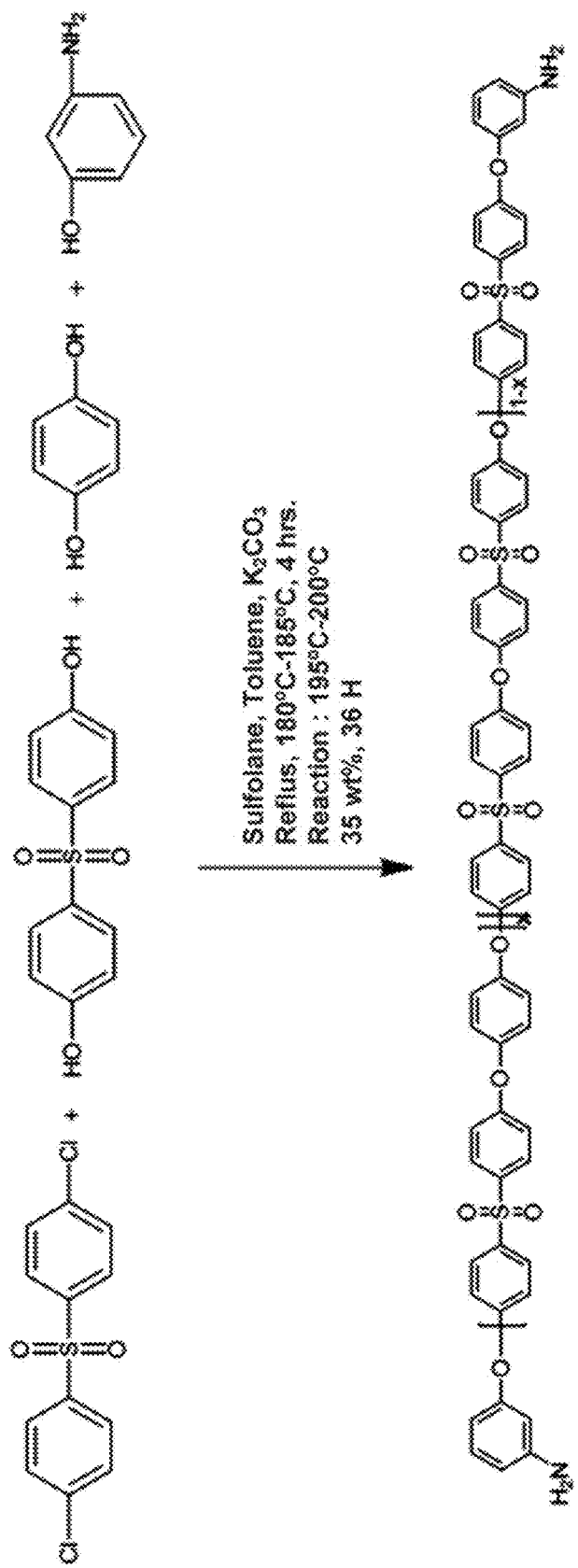

FIG. 25 provides an example synthetic route for polymer synthesis.

Figure 26:
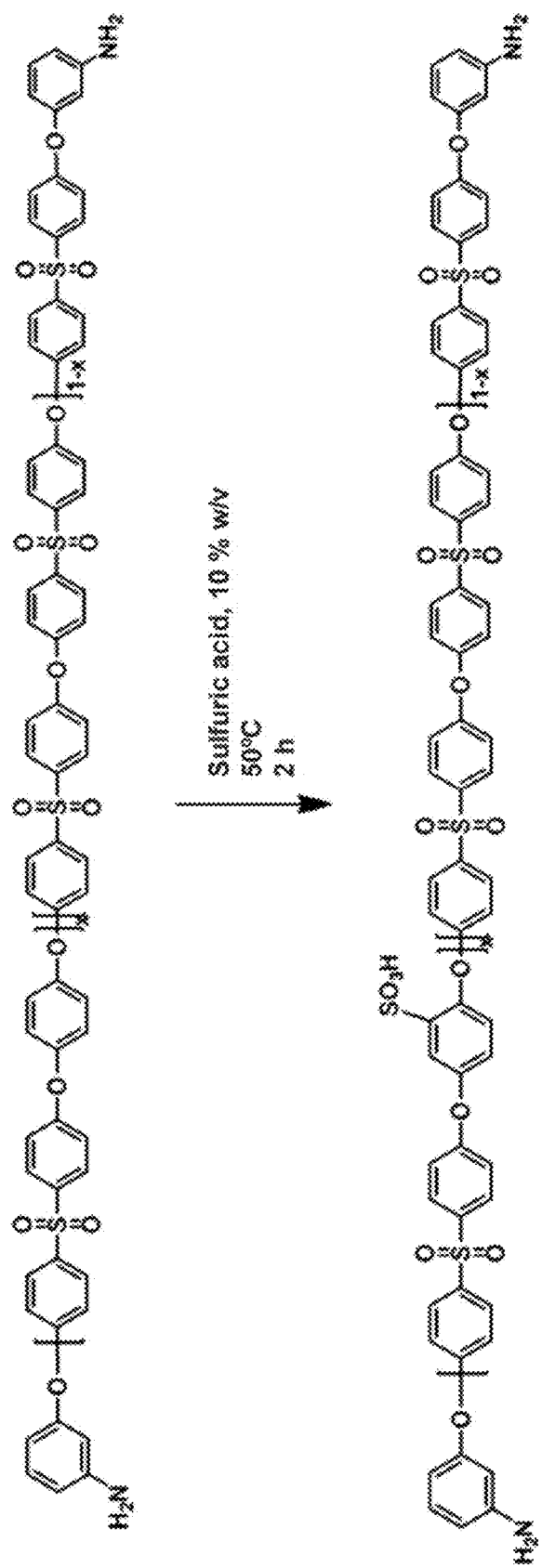

FIG. 26 provides an example post-sulfonation reaction of an oligomeric macromonomer.

Figure 27:
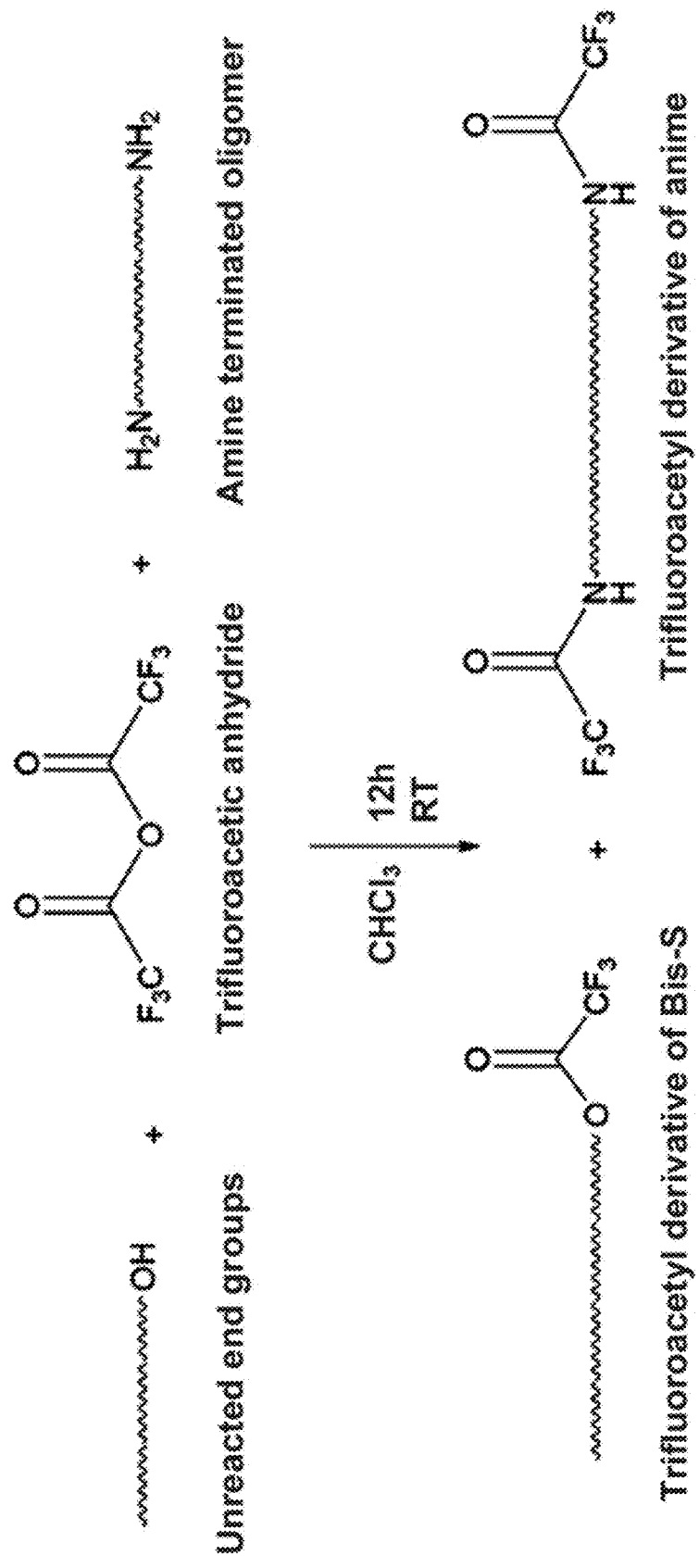

FIG. 27 provides a schematic overview of fluorine derivatization.

Figures 28A, 28B:
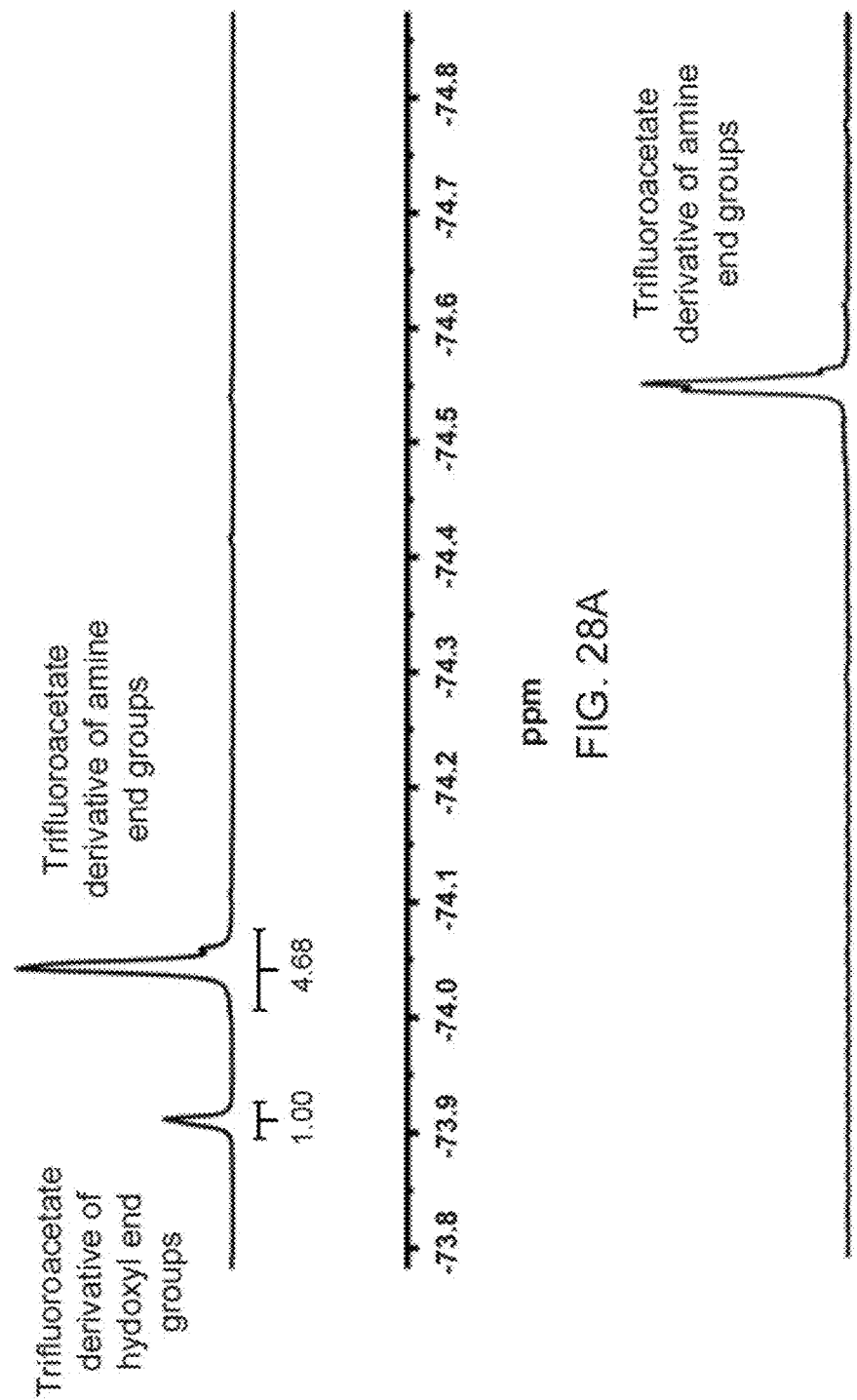

FIG. 28A and FIG. 28B provide NMR data for unreacted and reacted fluorine derivatives of the polymers described in FIG. 21C.

Figure 29:
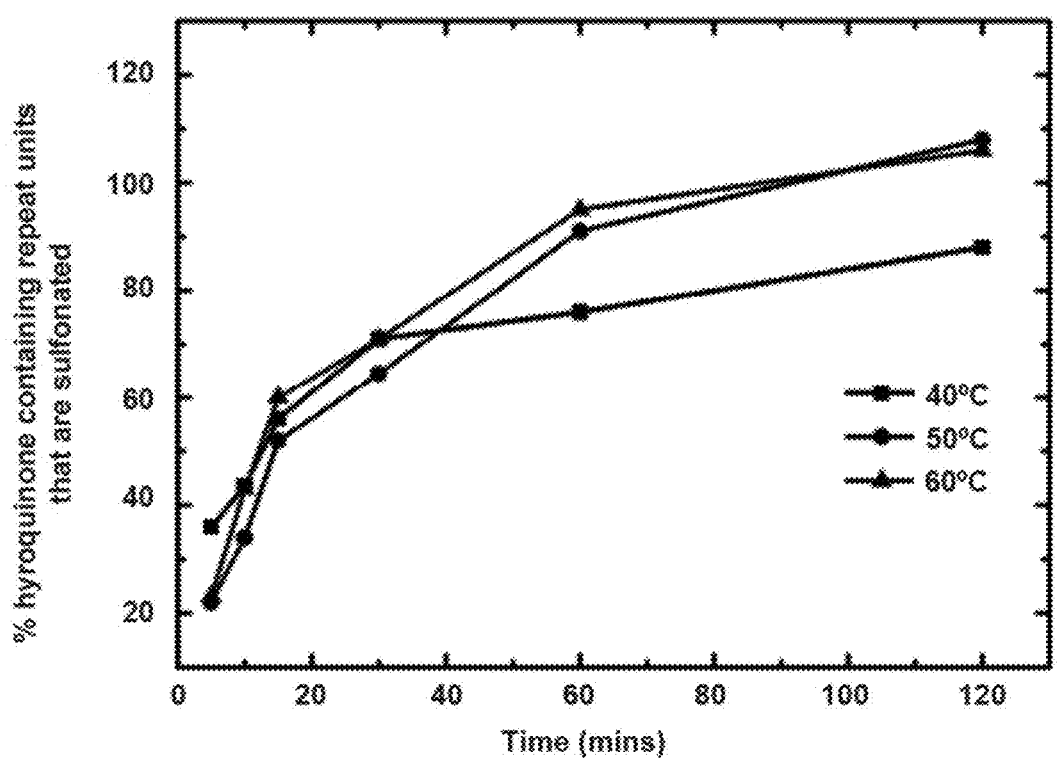

FIG. 29 provides data showing rate of sulfonation at different temperatures for a polymer with the structure shown in FIG. 21C with 29% of the units containing hydroquinone.

Figure 30:
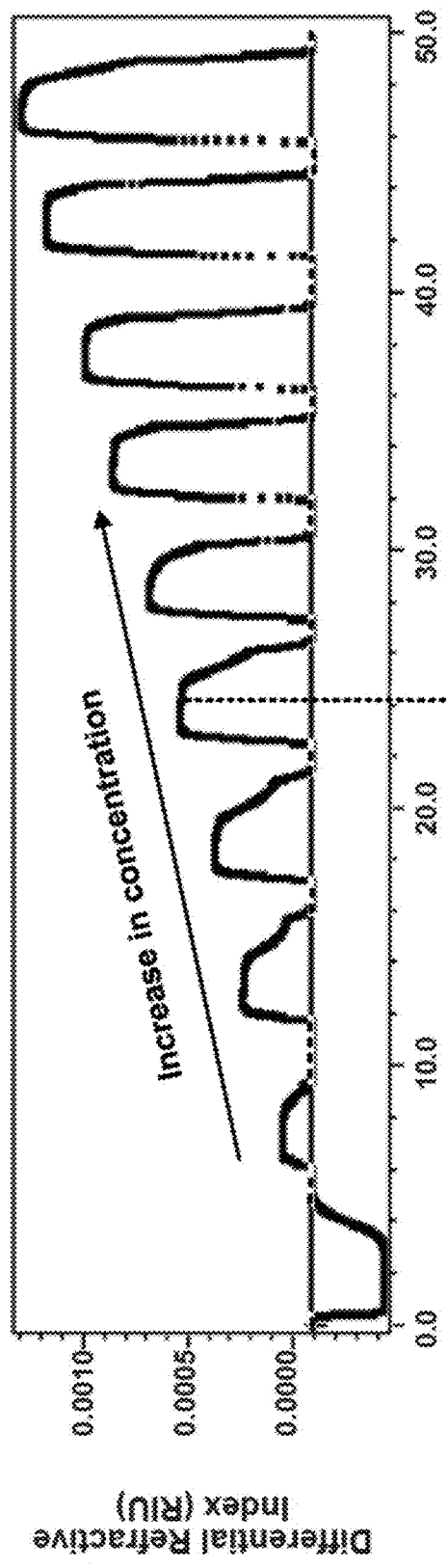
Figure 30:
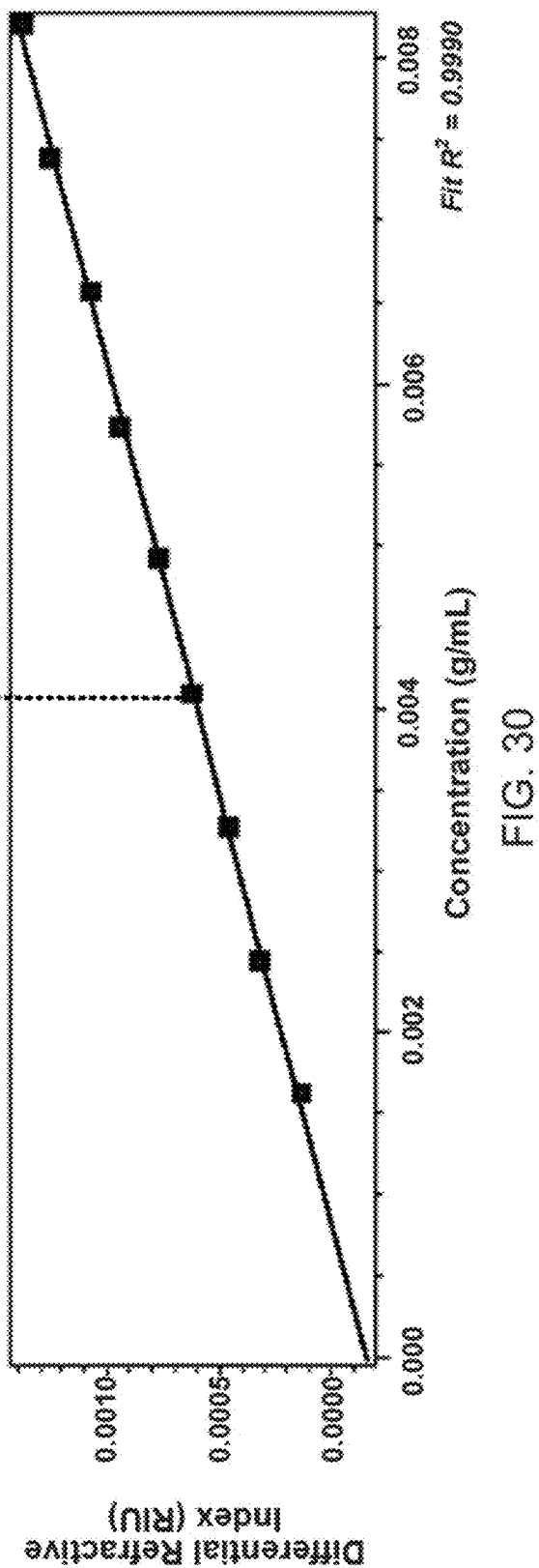

FIG. 30 provides differential refractive index data for the polymers described in FIG. 21C.

Figure 31:
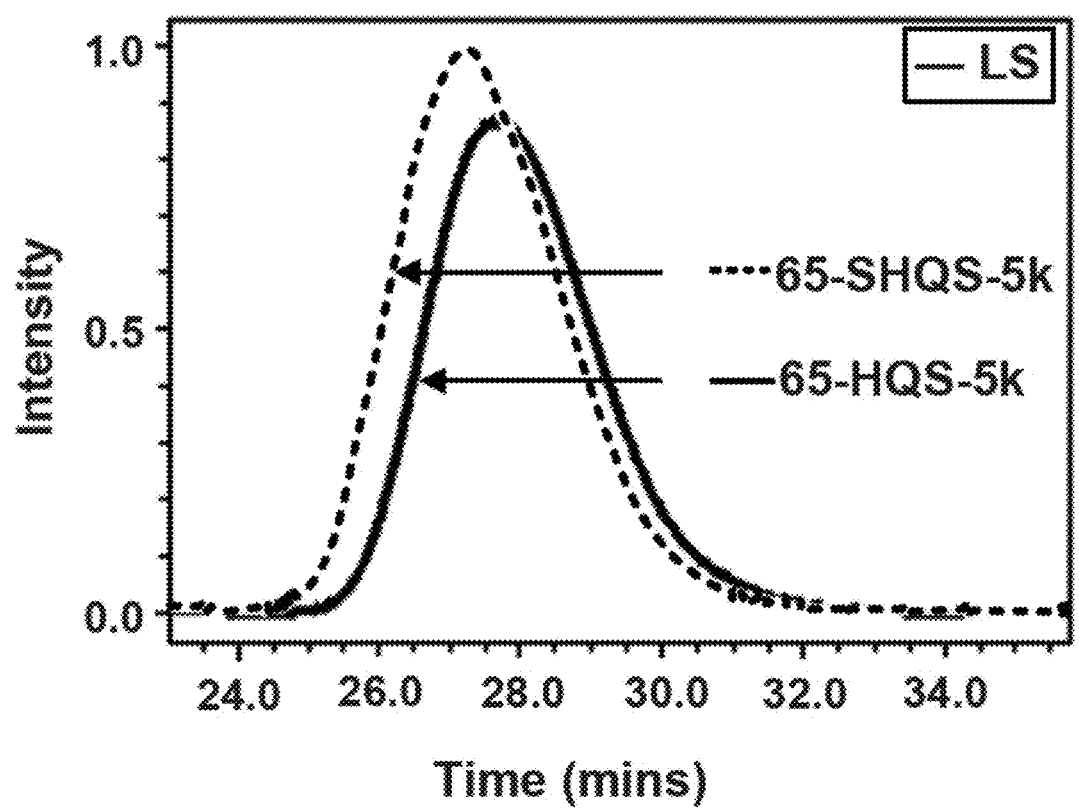

FIG. 31 provides size exclusion chromatography results, using a light scattering detector, to characterize molecular weight and molecular weight distribution for the oligomeric macromonomer as described in FIG. 21C both before and after sulfonation.

Figure 32:
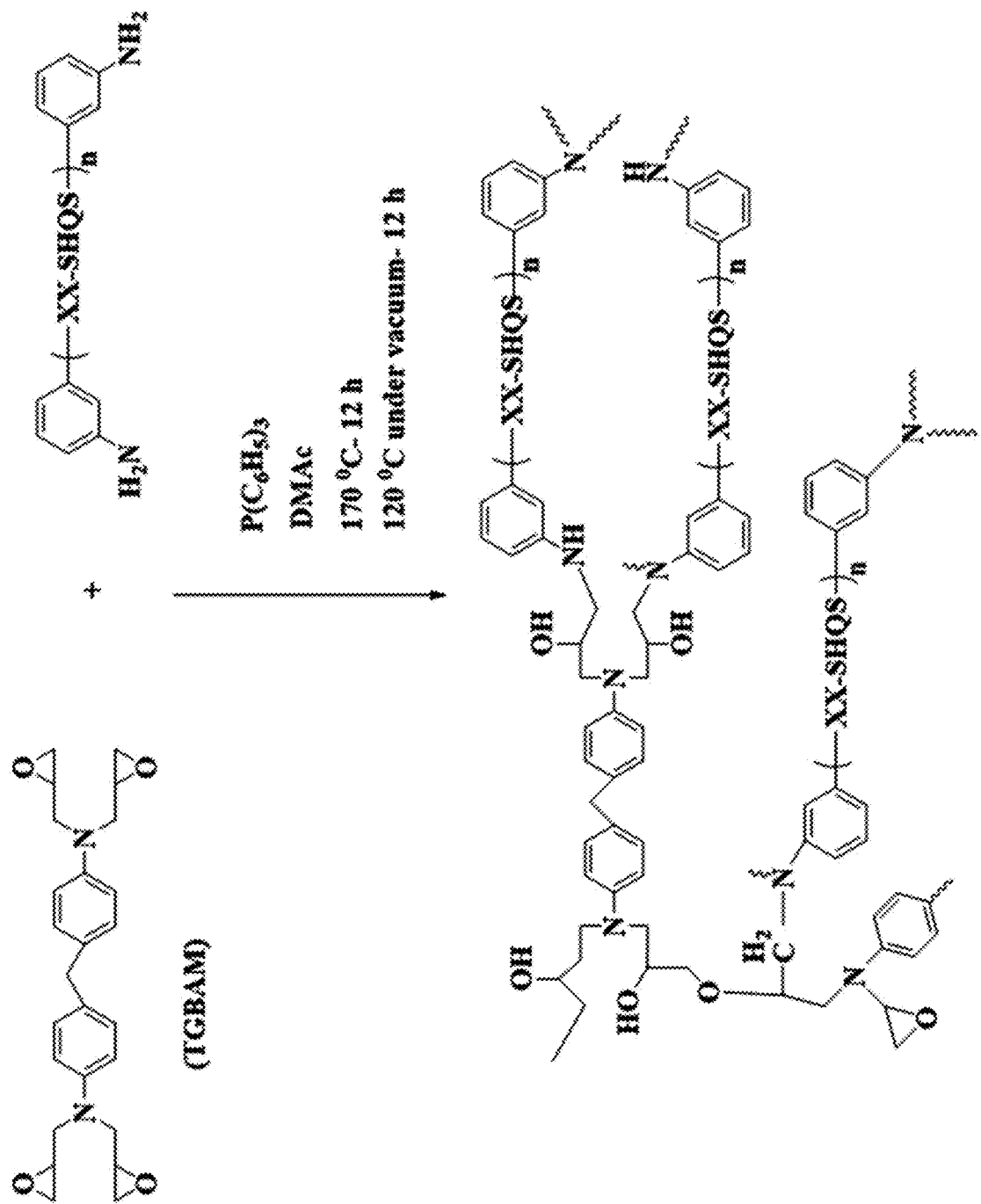

FIG. 32 provides an example of epoxy crosslinking of post-sulfonated, aminophenol terminated oligomeric macromonomers as described in FIG. 21C.

Figure 33:
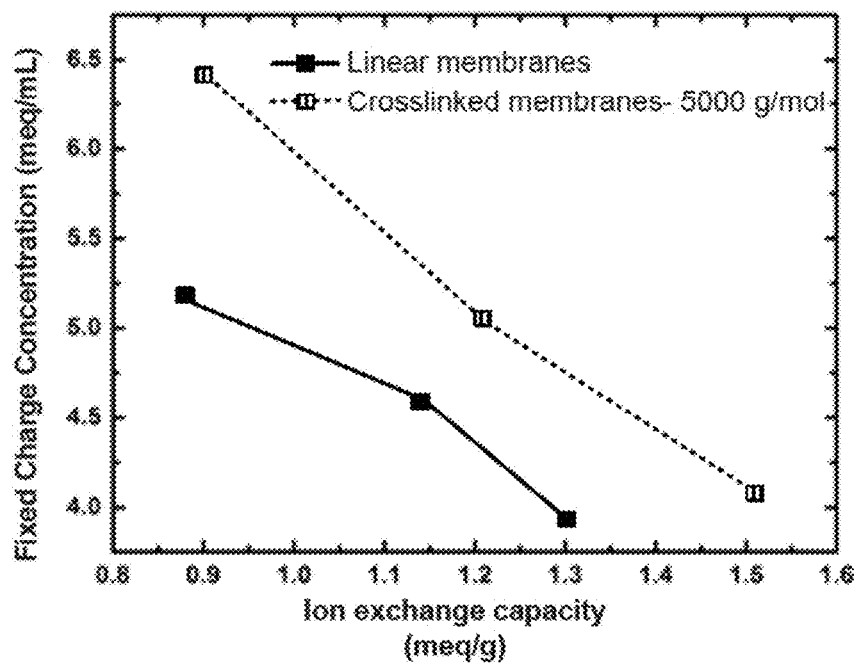
Figure 34:
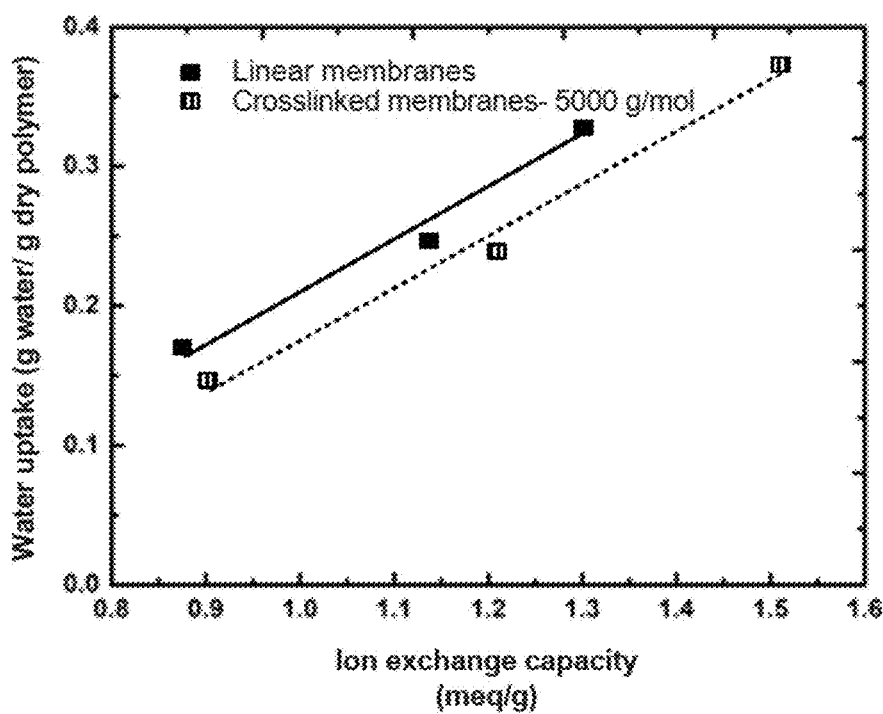

FIG. 33 and FIG. 34 provide ion exchange capacity data for epoxy crosslinked membranes as described in FIG. 32.

Figure 35:
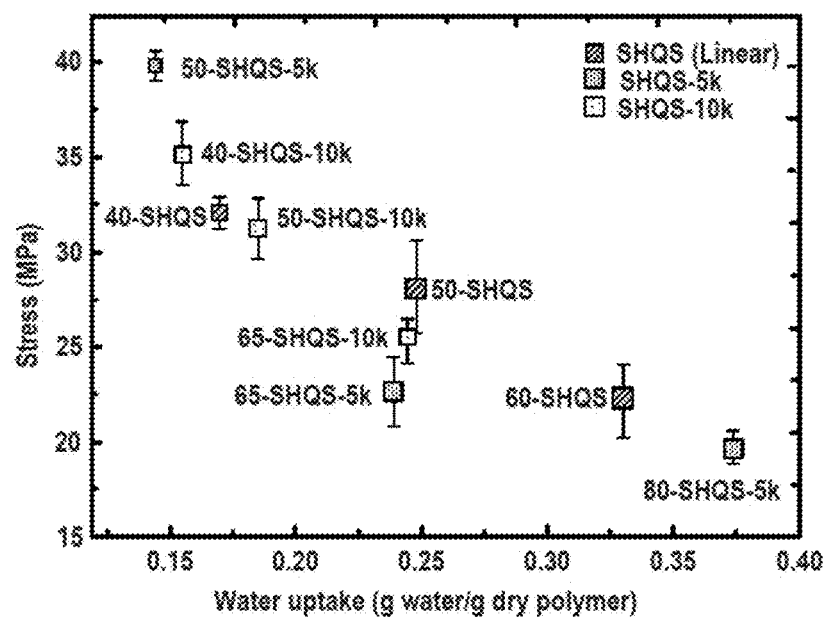
Figure 35:
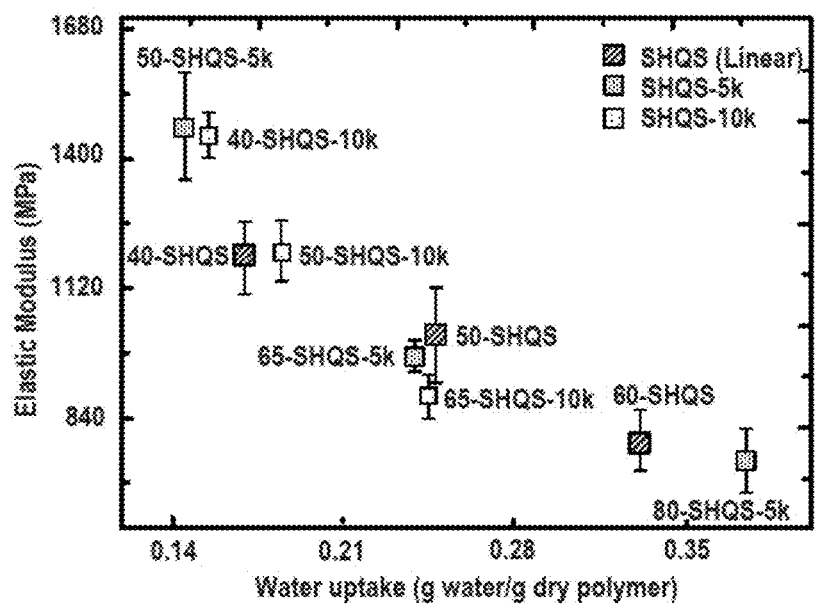

FIG. 35 provides hydrated mechanical property data as a function of water uptake for linear and epoxy-crosslinked oligomers as described in FIG. 32.

DETAILED DESCRIPTION OF SPECIFIC EMBODIMENTS

Embodiments of the present invention relate to water desalination membranes and methods of desalinating water. The water desalination membranes may employ poly(arylene ether)s, which may include one or more sulfonate groups at various points along the polymer chain, either directly attached to the chain or pendent to the polymer chain. In some embodiments, the polymers may be made from sulfonated monomers, and the resulting sulfonated polymers may be referred to herein as pre-sulfonated polymers. In some embodiments, the polymers may be made from non-sulfonated monomers but are subjected to a sulfonation process after polymerization, such as by exposing the polymers to sulfuric acid; the resulting sulfonated polymers may be referred to herein as post-sulfonated polymers. The sulfonated polymers described herein are useful for preventing transport of aqueous ionic species (e.g., NaCl) across a membrane made from the polymers while allowing water to pass.

The sulfonated polymers described herein provide numerous benefits. For example, the sulfonated polymers described herein exhibit good performance for rejecting monovalent ions in the presence of polyvalent cations. This is in contrast to data on separations of mixed salt feedwaters by reverse osmosis for previous sulfonated poly(arylene ether) membranes. See, e.g., A. E. Allegrezza, Jr., B. S. Parekh, P. L. Parise, E. J. Swiniarski, J. L. White, Chlorine resistant reverse osmosis modules, Desalination, 64 (1987), 285-304; P. L. Parise, A. E. Allegrezza, Jr., B. S. Parekh, Reverse Osmosis, Chlorine resistant reverse osmosis membrane and module, based on a paper presented at the first annual Ultrapure Water conference and exposition, Philadelphia, Pa., Apr. 13-15, 1987; and Derek E. Stevens, Bill Mickols, Caleb V. Funk, Asymmetric reverse osmosis sulfonated poly(arylene ether sulfone) copolymer membranes, Journal of Membrane Science, 452 (2014), 193-202. This aspect may be important for practical use in water desalination since polyvalent cations are always or almost always present in a source water feed used in desalination. Furthermore, embodiments of the present invention provide polymers that are stable in chlorinated waters. While it has been shown previously that sulfonated poly(arylene ether)s are resistant to degradation by aqueous chlorine compounds, this high chemical stability is a benefit relative to the interfacial polyamide desalination membranes that comprise most of the current desalination membrane market. Chlorine and chlorine-compounds are routinely used in water treatment to sterilize the water, but such sterilization agents may degrade some polymeric membranes. For desalination, de-chlorination processes may be used to remove chlorine compounds from water to be desalinated using a membrane. Advantageously, membranes made from the polymers described herein exhibit good stability in water containing chlorine disinfectants and so may allow for elimination or reduction of de-chlorination efforts prior to desalination.

The sulfonated polymers described herein may include monosulfonated polymers, which may refer to a single sulfonate group bonded to one of the copolymer units, or disulfonated polymers, which may refer to two sulfonate groups bonded to one of the copolymer units. In some cases, each of these configurations may find practical utility in semi-permeable membranes used for water desalination.

An example copolymer may comprise the structure:

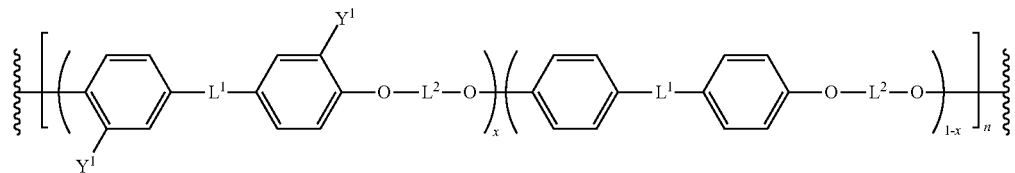

where each $L^1$ is independently

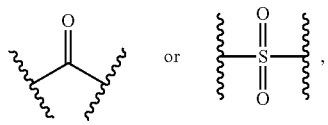

each $L^2$ is independently

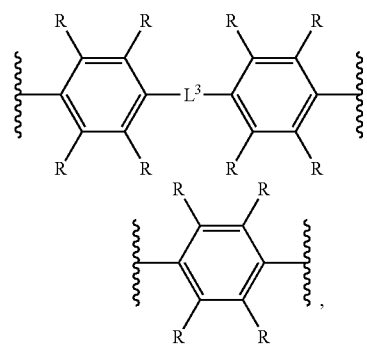

each $L^3$ is independently a single bond,

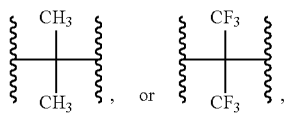

Z is a counterion (e.g., a metal ion), and each R is independently H, F, or $CH_3$. Values for x may be from 0 to 1, and values for n may be any suitable number for a polymer, such as from 2 to 100,000, for example. In the case of monosulfonated polymers, one $Y^1$ is $SO_3Z$ and the other $Y^1$ is H. In the case of disulfonated polymers, both $Y^1$ may be $SO_3Z$. These polymers may optionally be crosslinked, such as after exposure to a crosslinking agent.

Another example copolymer, which may be monosulfonated or disulfonated may have the structure where each $L^1$ is independently

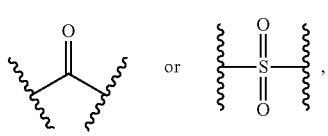

each $L^2$ is independently

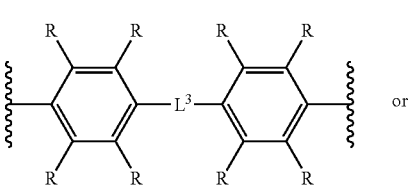

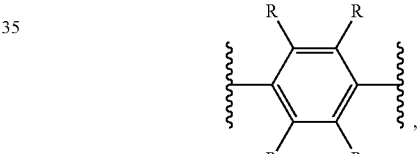

each $L^1$ is independently a single bond, $CH_3$, or

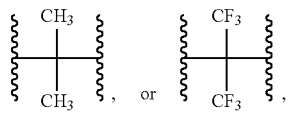

each $Y^1$ is independently H or $SO_3Z$, Z is a counterion (e.g., $Na^+$ or $K^+$), each R is independently H, F, or $CH_3$, each A is independently, a phenol or an aromatic amine derived from an aminophenol,

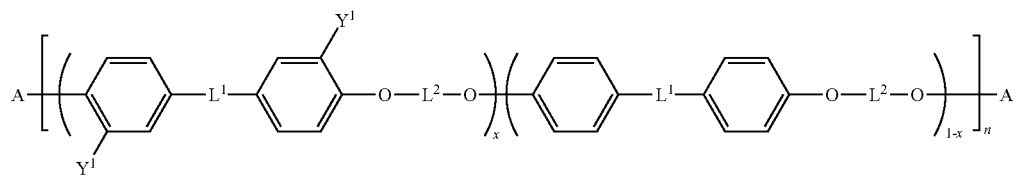

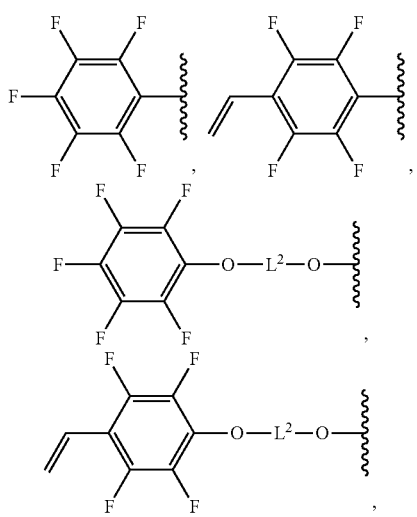

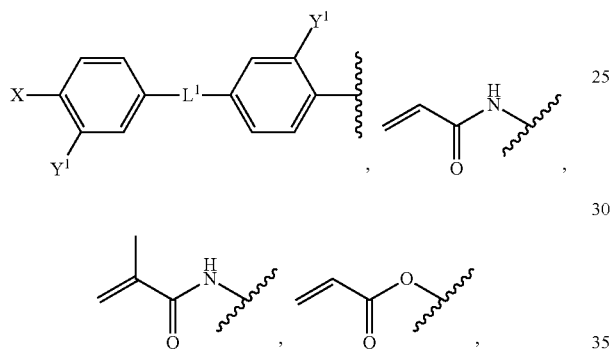

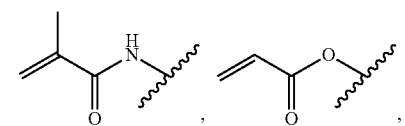

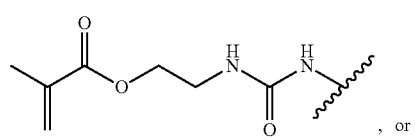

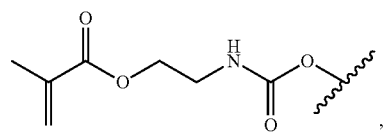

wherein X is a halogen.

Another example copolymer may comprise the structure:

where each $L^1$ is independently

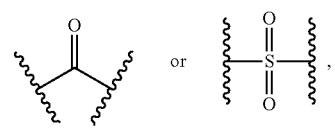

wherein each $L^2$ is independently

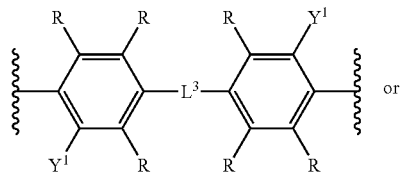

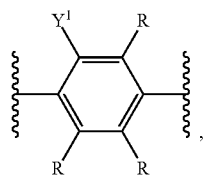

wherein each $L^3$ is independently a single bond, $CH_3$

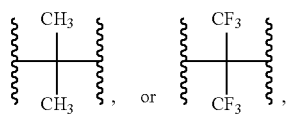

wherein Y is $SO_3Z$ or H, wherein Z is a counterion, and wherein each R is independently H, F, or $CH_3$. Such a copolymer may correspond to a post-sulfonated copolymer, for example.

Another example copolymer, which may correspond to a post-sulfonated copolymer, may have the structure

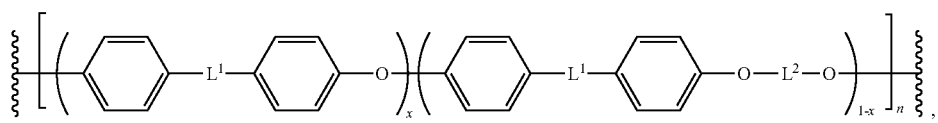

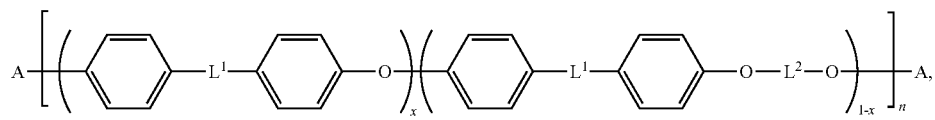

where each $L^1$ is independently

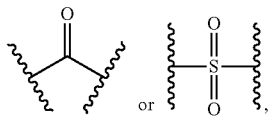

each $L^2$ is independently

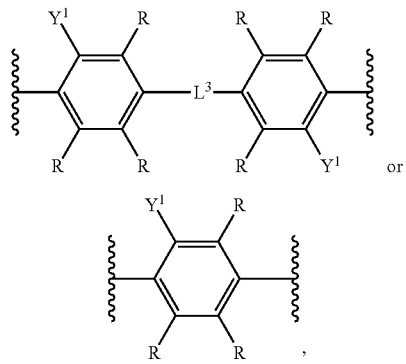

each $L^3$ is independently a single bond,

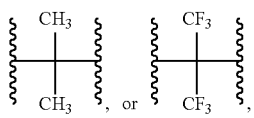

each $Y^1$ is $SO_3Z$ or H, Z is a counterion (e.g., Na⁺ or K⁺), each R is independently H, F, or $CH_3$, each A is independently,

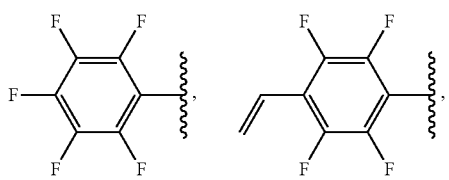

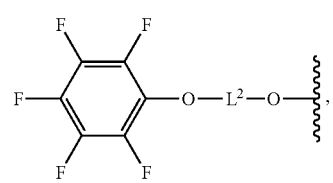

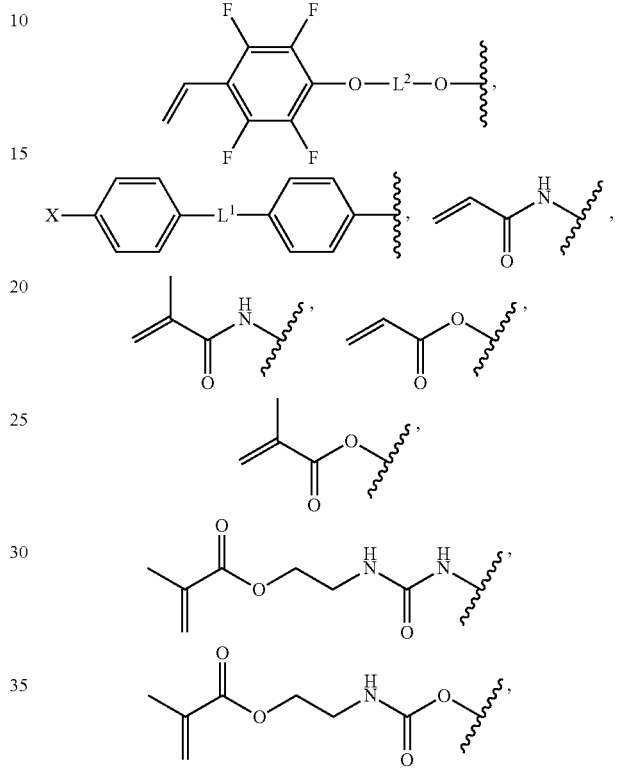

a phenol, or an aromatic amine derived from an aminophenol, wherein X is a halogen.

In the above example copolymers, values for x may be from 0 to 1, and values for n may be any suitable number for a polymer, such as from 2 to 100,000, for example. Any of the aforementioned groups may have one or more hydrogen atoms optionally substituted by another group. These polymers may optionally be crosslinked, such as after exposure to a crosslinking agent.

In general the terms and phrases used herein have their art-recognized meaning, which can be found by reference to standard texts, journal references and contexts known to those skilled in the art. The following definitions are provided to clarify their specific use in the context of the invention.

"Linear polymer" is used to describe a polymer exhibiting an overall non-crosslinked configuration in its individual molecular form.

In an embodiment, disclosed compositions or compounds are isolated or purified. In an embodiment, an isolated or purified compound is at least partially isolated or purified as would be understood in the art.

The molecules disclosed herein contain one or more ionizable groups. Ionizable groups include groups from which a proton can be removed (e.g., —$SO_3H$) or added (e.g., amines) and groups which can be quaternized (e.g., amines). All possible ionic forms of such molecules and salts thereof are intended to be included individually in the disclosure herein. With regard to salts of the compounds described herein, it will be appreciated that a wide variety of available counter-ions may be selected that are appropriate for salts of this invention for a given application. In specific applications, the selection of a given anion or cation for preparation of a salt can result in increased or decreased solubility of that salt.

As used herein, the terms "group" and "moiety" may refer to a functional group of a chemical compound. Groups of the disclosed compounds refer to an atom or a collection of atoms that are a part of the compound. Groups of the disclosed compounds may be attached to other atoms of the compound via one or more covalent bonds. Groups may also be characterized with respect to their valence state. The present disclosure includes groups characterized as monovalent, divalent, trivalent, etc. valence states. In embodiments, the term "substituent" may be used interchangeably with the terms "group" and "moiety."

As is customary and well known in the art, hydrogen atoms in chemical formulas disclosed herein are not always explicitly shown, for example, hydrogen atoms bonded to the carbon atoms of aliphatic, aromatic, alicyclic, carbocyclic and/or heterocyclic rings are not always explicitly shown in the formulas recited. The structures provided herein, for example in the context of the description of any specific formulas and structures recited, are intended to convey the chemical composition of disclosed compounds of methods and compositions. It will be appreciated that the structures provided do not indicate the specific positions of atoms and bond angles between atoms of these compounds. In the case of substituted groups, one or more hydrogen atoms may be replaced by any one or more of the other groups described herein.

The invention may be further understood by the following non-limiting examples.

Figure 1:
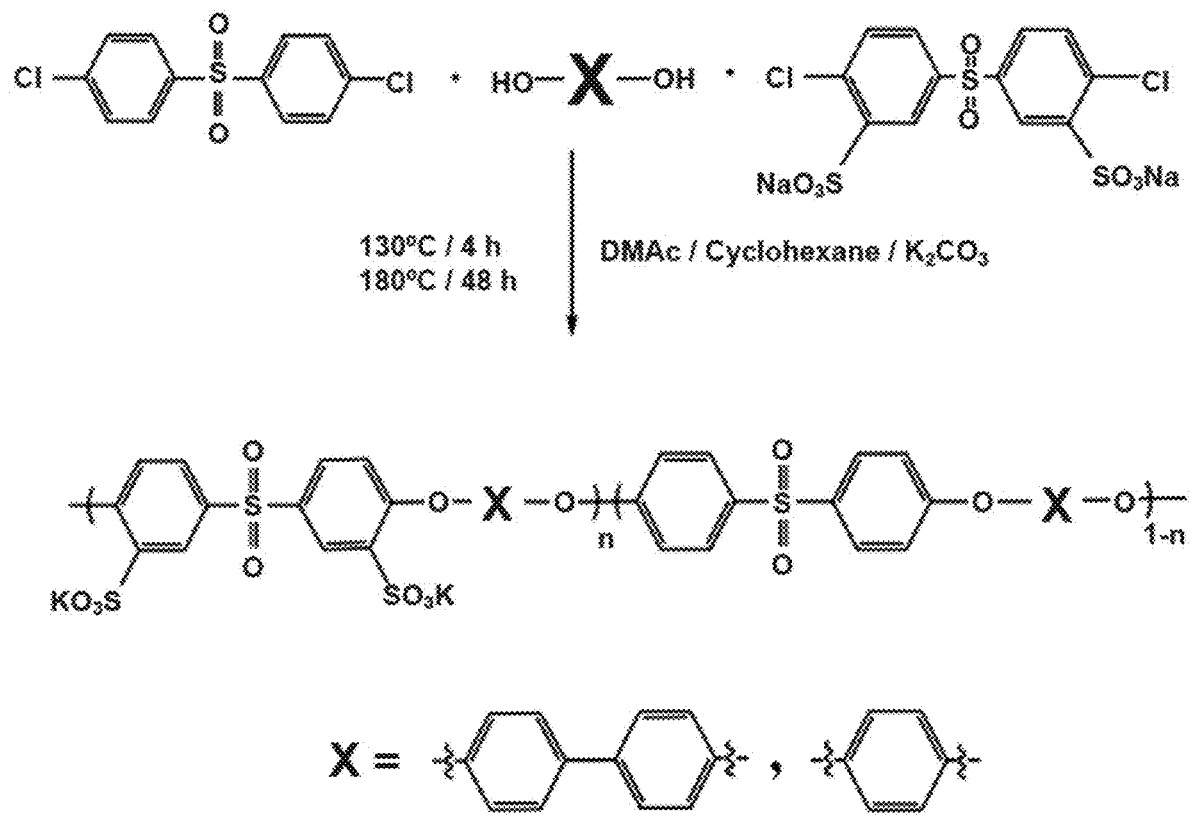
FIG. 1 provides an example synthetic route for polymer synthesis.

Sulfonated poly(arylene ether) membranes for desalination of water can be prepared by direct polymerization using pre-sulfonated monomers or by synthesizing a non-sulfonated poly(arylene ether), then sulfonating the synthesized polymer, a process known as "post-sulfonation" since the sulfonation step is done after the polymer is synthesized. In the case of post-sulfonation, the sulfonate groups can be added to a linear copolymer, to a end functional macromonomer or to the crosslinked network. Firstly, pre-sulfonated monomers can be used to synthesize poly(arylene ether sulfone)s or poly(arylene ether ketone)s. This method has an advantage of enabling control over the degree of sulfonation by choosing the desired level of the sulfonated comonomer. It also produces a randomly sulfonated copolymer. Moreover, there is no reduction in molecular weight that might be caused by harsh reactants in a post-sulfonation process. Sulfonated monomers with either chlorine or fluorine reactive groups produce such structures. The analogous sulfonated aromatic ketone monomers are also included. For the case of a directly polymerized sulfonated poly(arylene ether ketone), 4,4'-difluorobenzophenone would be used to replace 4,4'-dichlorodiphenylsulfone as depicted in FIG. 1 or sulfonated 4,4'-difluorobenzophenone can be incorporated.

Figure 2:
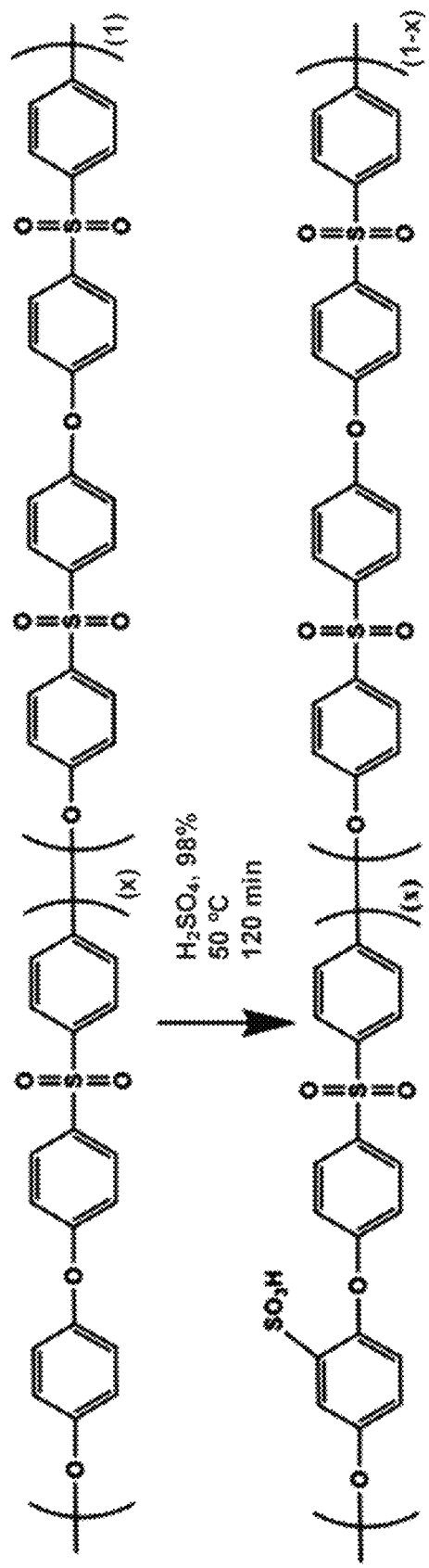
FIG. 2 provides an overview of post-sulfonation of a polymer.

Secondly, non-sulfonated poly(arylene ether)s can be synthesized, then selectively post-sulfonated only on aromatic rings that are not deactivated against electrophilic aromatic substitution post-sulfonation as shown in FIG. 2. For such a method, the conditions of post-sulfonation can be carefully optimized to sulfonate only the non-deactivated rings (toward electrophilic aromatic sulfonation) and to avoid degradation of the molecular weight.

Figure 3:
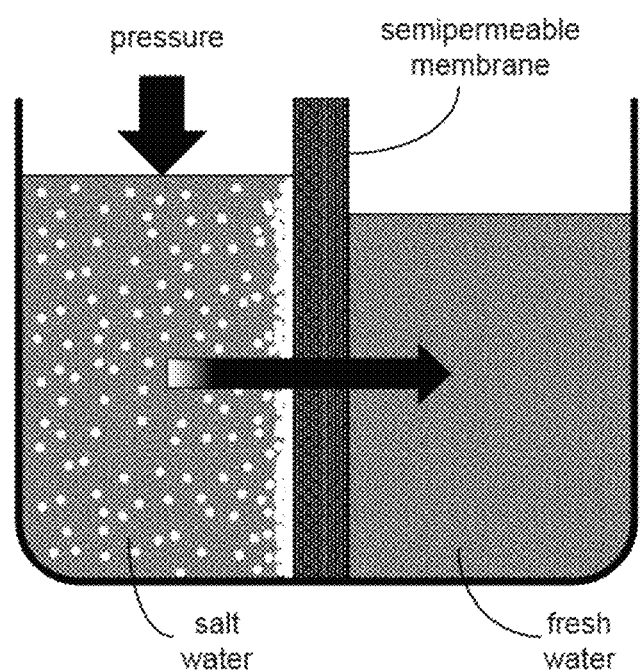
FIG. 3 provides a schematic illustration of a water desalination process.
Figure 4:
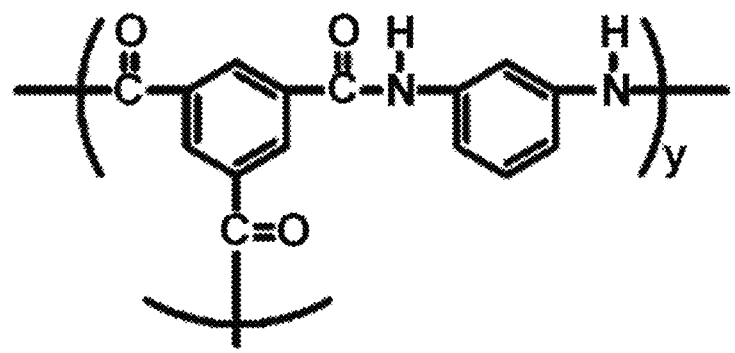
FIG. 4 provides an example of the structure of a common desalination membrane, prepared by interfacially polymerizing m-phenylene diamine and trimesoyl chloride.
Figure 5:
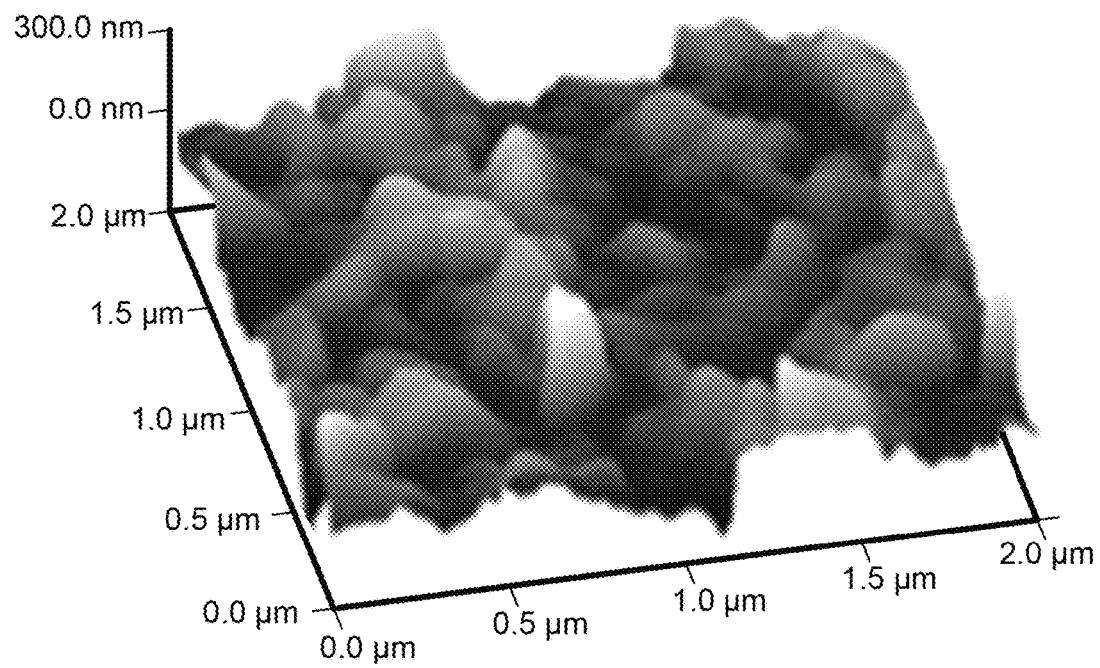
FIG. 5 provides data showing surface roughness of polymeric membranes. Top: an interfacially polymerized polyamide membrane; Bottom: A sulfonated polysulfone membrane.
Figure 5:
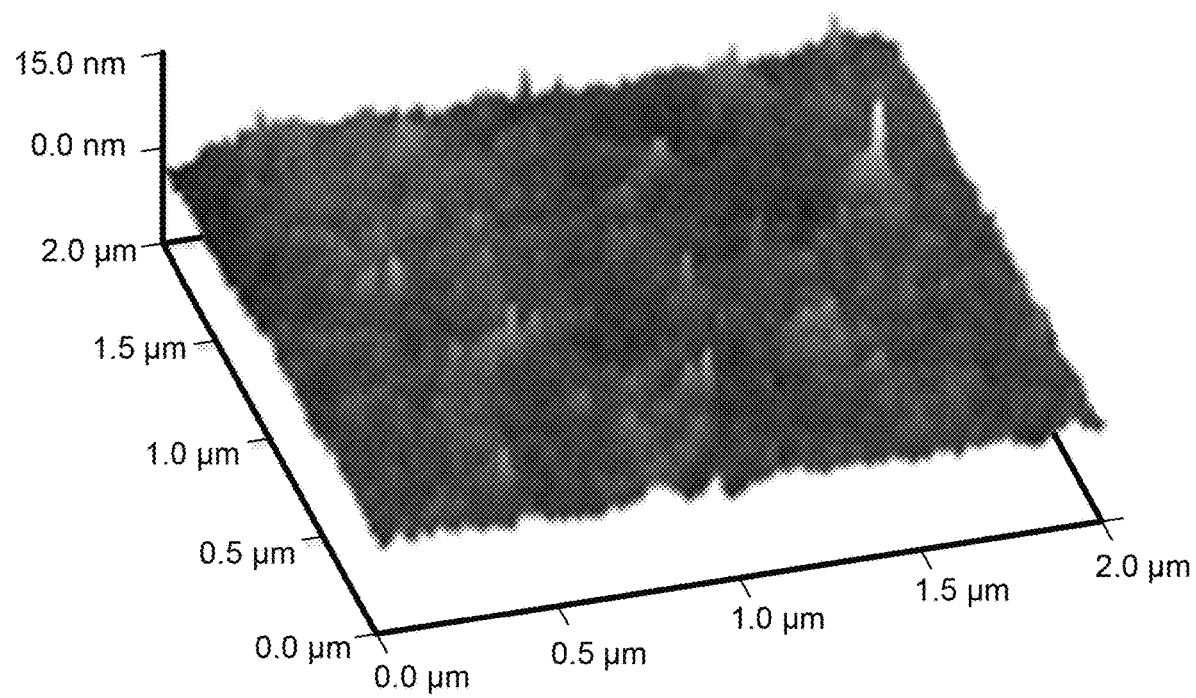

Membrane based desalination of water can be accomplished by reverse osmosis or by electrodialysis. In both processes, the separation membranes are non-porous and the separation process occurs by a solution-diffusion mechanism. Reverse osmosis utilizes saline feedwater pressurized against a membrane where the pressure must be at least sufficient to overcome the osmotic pressure (FIG. 3). Membranes may be asymmetric or employ thin film composites with a sulfonated poly(arylene ether) atop a porous polymeric support. Effective reverse osmosis membranes must allow selective flux of water with high rejection of salt, and the separation layer must be thin (~100-500 nm) to afford sufficiently high water flux. Current polyamide membranes (FIG. 4) degrade in the presence of conventional chlorinated disinfectants, so the water must be pre-treated with chlorine, dechlorinated prior to passage through the membrane, then re-chlorinated after desalination. Moreover, the nature of the interfacial polymerization atop the porous polymeric support that is used for the conventional polyamide thin film composite membranes leads to a rough surface relative to the sulfonated poly(arylene ether) membranes of the present invention (FIG. 5). The rough surface contributes to fouling by salt and other impurities in the water during the desalination process. Fouling of interfacial polyamide thin film composites is a major deterrent to a desalination process.

Figure 6:
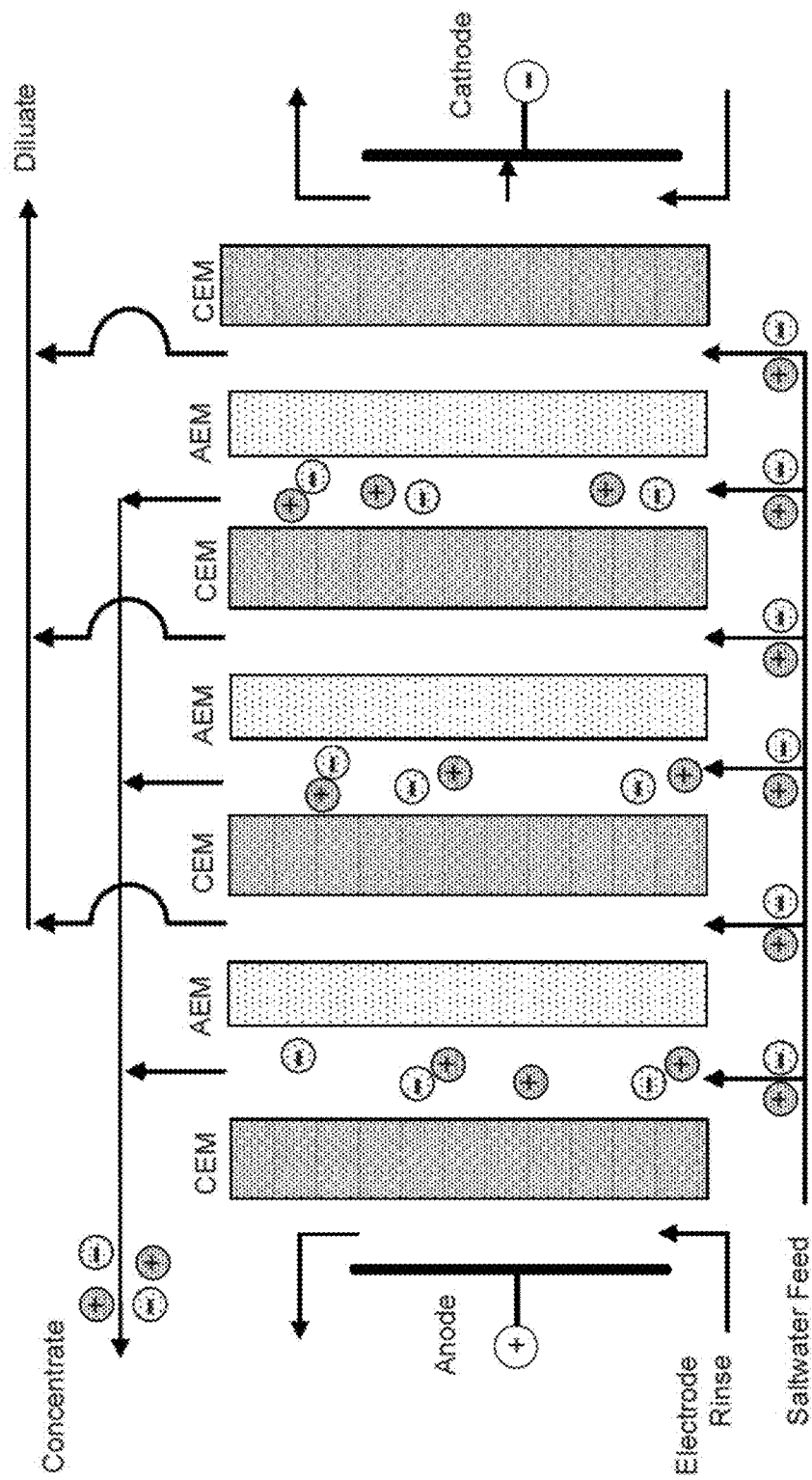
FIG. 6 provides a schematic illustration of an electrodialysis system.
Figure 7:
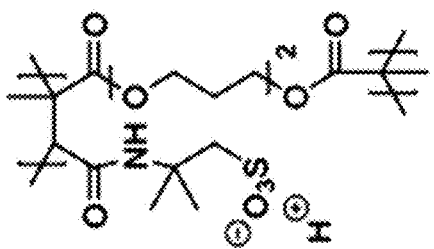
FIG. 7 provides an overview of an example crosslinking reaction to form an ion exchange membrane.
Figure 7:
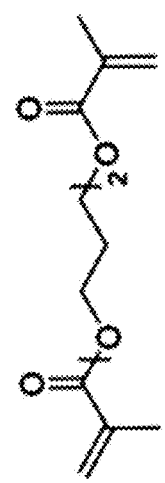
Figure 7:

Electrodialysis utilizes stacks of alternating anion exchange membranes (AEMs) and cation exchange membranes (CEMs) with compartments between the membranes for introduction of saline feedwater situated between an anode and a cathode. An electric current is applied that drives anions from the feedwater toward the positive electrode and cations toward the negative electrode (FIG. 6). The CEMs are comprised of polyelectrolyte polymers that have fixed anions on their structure. The sulfonated poly(arylene ether)s of this invention similarly have fixed anions on their structures, so they may function as CEMs. They must selectively transport cations from the feedwater through the membranes and reject co-anions (e.g., transport sodium ions and reject chloride ions). Likewise, the AEMs contain fixed cations and those membranes must selectively transport anions and reject co-cations (e.g., transport chloride and reject sodium ions). The selectivity is driven by electrostatic Donnan exclusion of co-ions by the membrane fixed ions. Thus, the concentration of fixed ions on the membrane should be high. This means that the number of fixed ions per gram of dry polymer should be high and the amount of absorbed water should be kept relatively low. Ideally, electrodialysis membranes should be as thin as possible to minimize electrical resistance since more energy is required to run the desalination process as electrical resistance increases. Electrodialysis membranes may comprise crosslinked polyelectrolytes that are synthesized by free radical copolymerization. Common commercial monomers include chloromethylstyrene-divinylbenzene that can be post-aminated to make AEMs, sulfonated styrene-divinylbenzene to make CEMs, or alternative monomers as shown in FIG. 7. The mechanical properties of commercial AEMs and CEMs are poor, so they must be reinforced with substantial amounts of hydrophobic polymers to be used in electrodialysis stacks. This increases areal electrical resistance in electrodialysis processes that require additional energy to operate and reduces effective membrane area, which increases capital costs. The sulfonated poly(arylene ether)s of the present invention have superior mechanical properties relative to conventional CEMs, and thus may not require as much support by hydrophobic polymers.

Structure-Property Relationships of Linear and Crosslinked Disulfonated Poly(Arylene Ether Sulfone)s from Pre-Disulfonated Sulfone Monomers.

Figure 8:
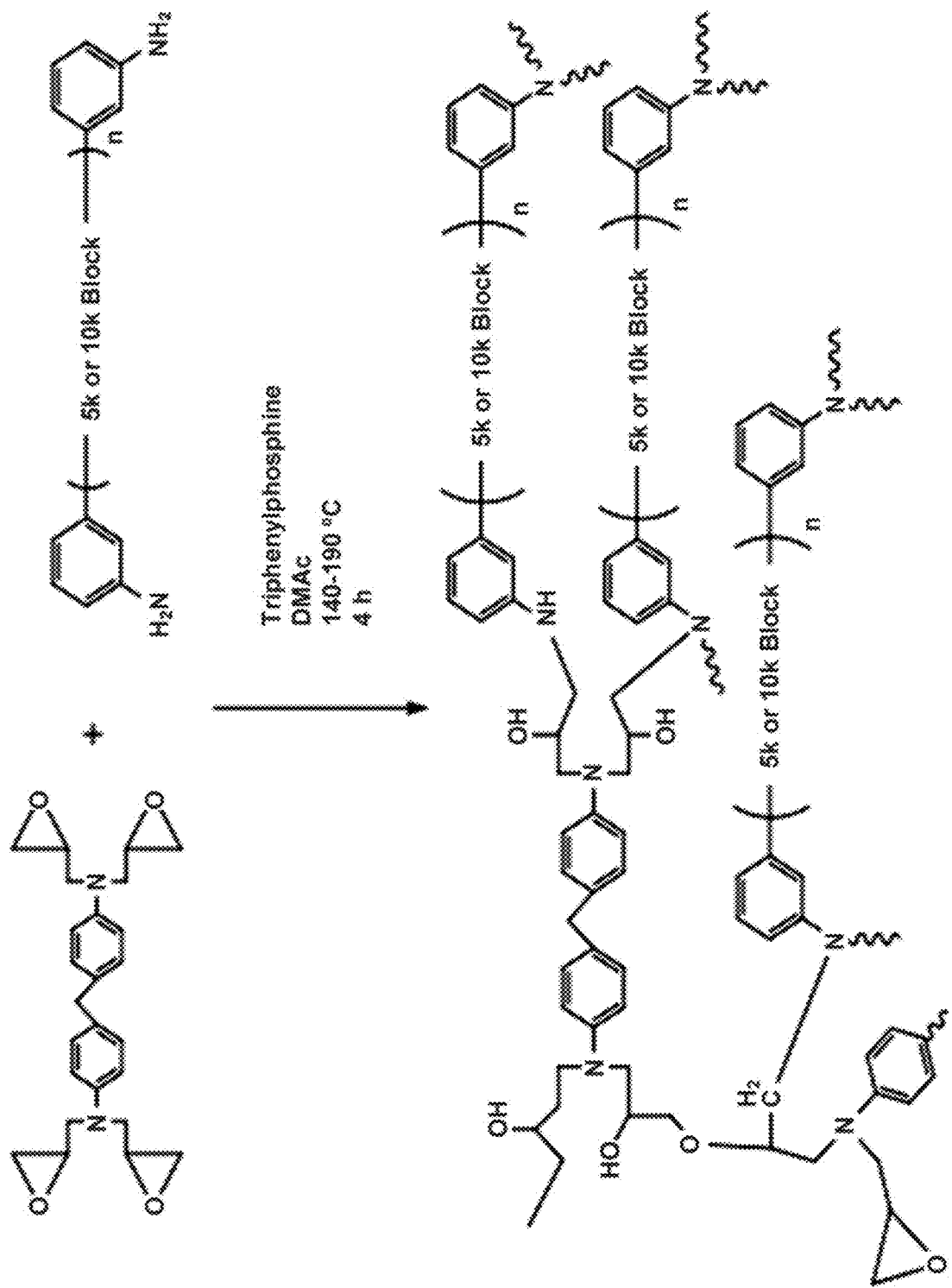
FIG. 8 provides an overview of an example crosslinking reaction to form a sulfonated poly(arylene ether) network. (5 k or 10 k block refers to a sulfonated poly(arylene ether) macromonomer)

Linear directly polymerized sulfonated poly(arylene ether sulfone)s containing either biphenol or bisphenol A as the bisphenol monomer were made with systematically varied degrees of sulfonation by utilizing a pre-disulfonated monomer. In addition, controlled molecular weight oligomers with ~5000 and ~10,000 g/mole $M_n$ were prepared with biphenol or bisphenol A as the bisphenol monomer that were terminated with m-aminophenol to yield aromatic primary amine endgroups. Those oligomers were reacted with a multifunctional epoxy reagent, tetraglycidyl bis(aminophenyl)methane (TGBAM), as shown in FIG. 8 to make crosslinked membranes. The amount of fixed sulfonate anions on these linear and crosslinked copolymers is expressed as the ion exchange capacity (IEC) in units of milliequivalents per gram of dry polymer. For a given IEC, the amount of water that can be absorbed (water uptake) decreases with network formation (Table 1).

TABLE 1

| Number | Membrane | Gel Fraction (%) | IEC (meq/g) | Water Uptake (%) | Fixed Charge Conc. (mol of ions/L sorbed water) |
|---|---|---|---|---|---|
| 1 | XLB60-5 | 95.4 ± 1.3 | 1.84 | 56 ± 1.2 | 3.28 |
| 2 | XLB70-5 | 96.6 ± 0.5 | 2.06 | 67 ± 1.0 | 3.07 |
| 3 | XLB80-5 | 92.3 ± 2.2 | 2.28 | 80 ± 2.5 | 2.85 |
| 4 | XLB50-10 | 94.7 ± 1.8 | 1.74 | 39 ± 0.5 | 4.46 |
| 5 | XLB60-10 | 97.8 ± 2.0 | 2.03 | 63 ± 1.0 | 3.22 |
| 6 | XLB70-10 | 98.0 ± 1.0 | 2.27 | 78 ± 2.1 | 2.91 |
| 7 | BPS-40 | | 1.65 | 55 ± 2.8 | 3.10 |
| 8 | BPS-50 | | 1.93 | 105 ± 3.0 | 1.84 |

XLBx-y: XL = crosslinked, Bx = degree of disulfonation, y = block length of the precursor oligomer in 1000's.
BPS-XX = linear biphenol based polysulfone with pre-disulfonated monomers and XX = degree of disulfonation

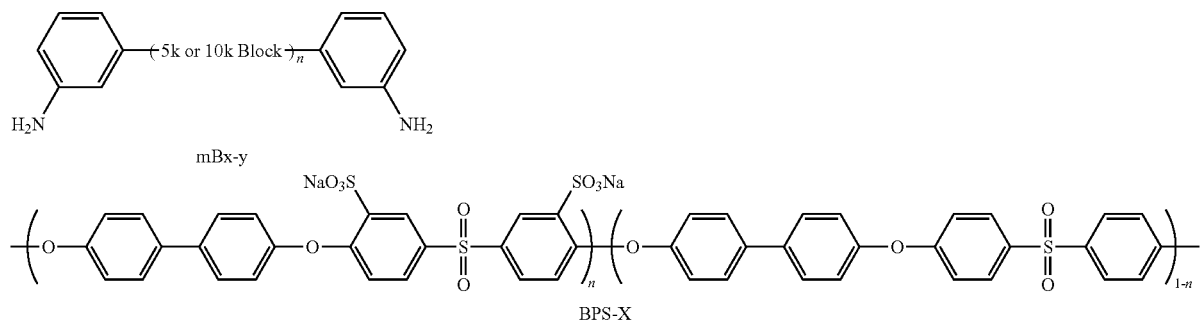

For example, the crosslinked entry number 4 in Table 1 (XLB50-10 that was 50% disulfonated with an oligomeric $M_n$ of ~10,000 g/mole) has an IEC of 1.74 meq/g with a water uptake of 39%, whereas the linear entry number 7 (BPS-40 with 40% of the comonomers disulfonated) has an IEC of 1.65 (slightly lower) and a water uptake of 55% (significantly higher). Likewise, the crosslinked XLB60-10 (60% disulfonated with a 10,000 g/mole oligomer) has an IEC of 2.03 and a water uptake of only 63% whereas the linear BPS-50 with 50% of the comonomer units disulfonated and an IEC of 1.93 (entry number 8 in Table 1) has a much higher water uptake of 105%. Thus, it is clear that network formation constrains the amount of water that is absorbed and thus, the fixed ion concentrations (moles of ions/Liter of absorbed water) are inherently higher for the networks relative to the analogous linear copolymers.

Figure 9:
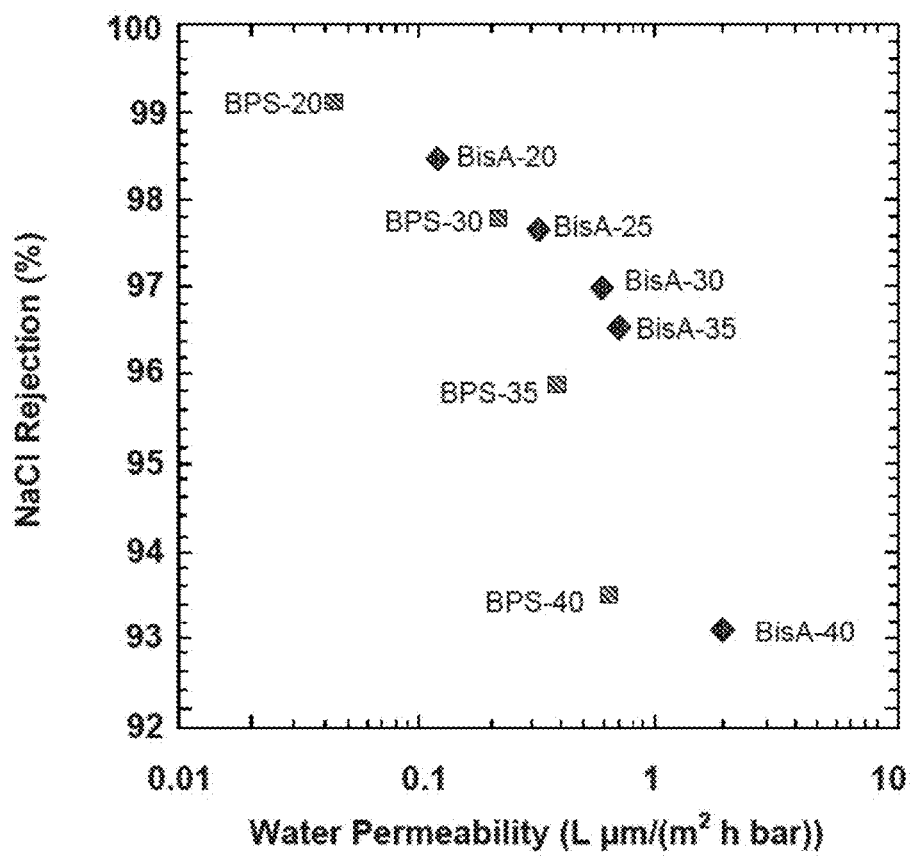
FIG. 9 provides data showing salt rejection and water permeability of different membranes. The top structure is BPS-XX and the bottom structure is BisA-XX. XX refers to the degree of disulfonated units.
Figure 9:
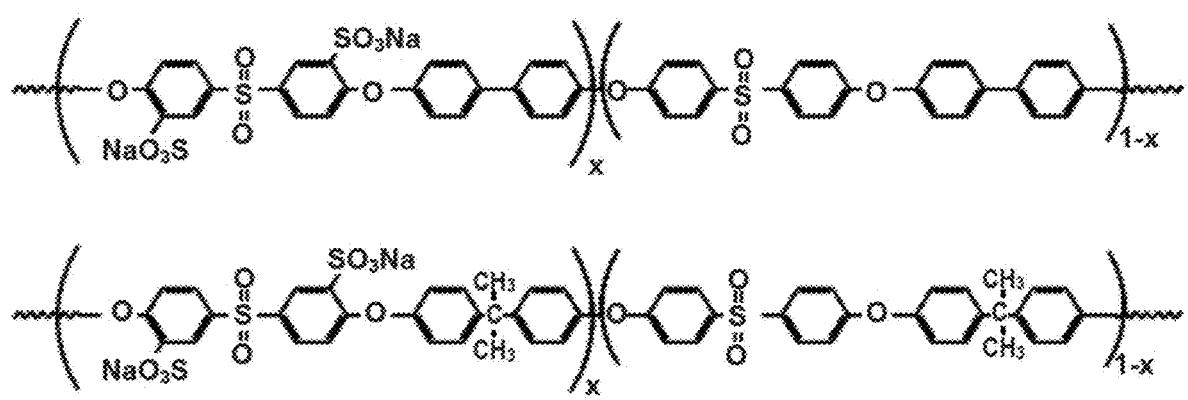
Figure 10:
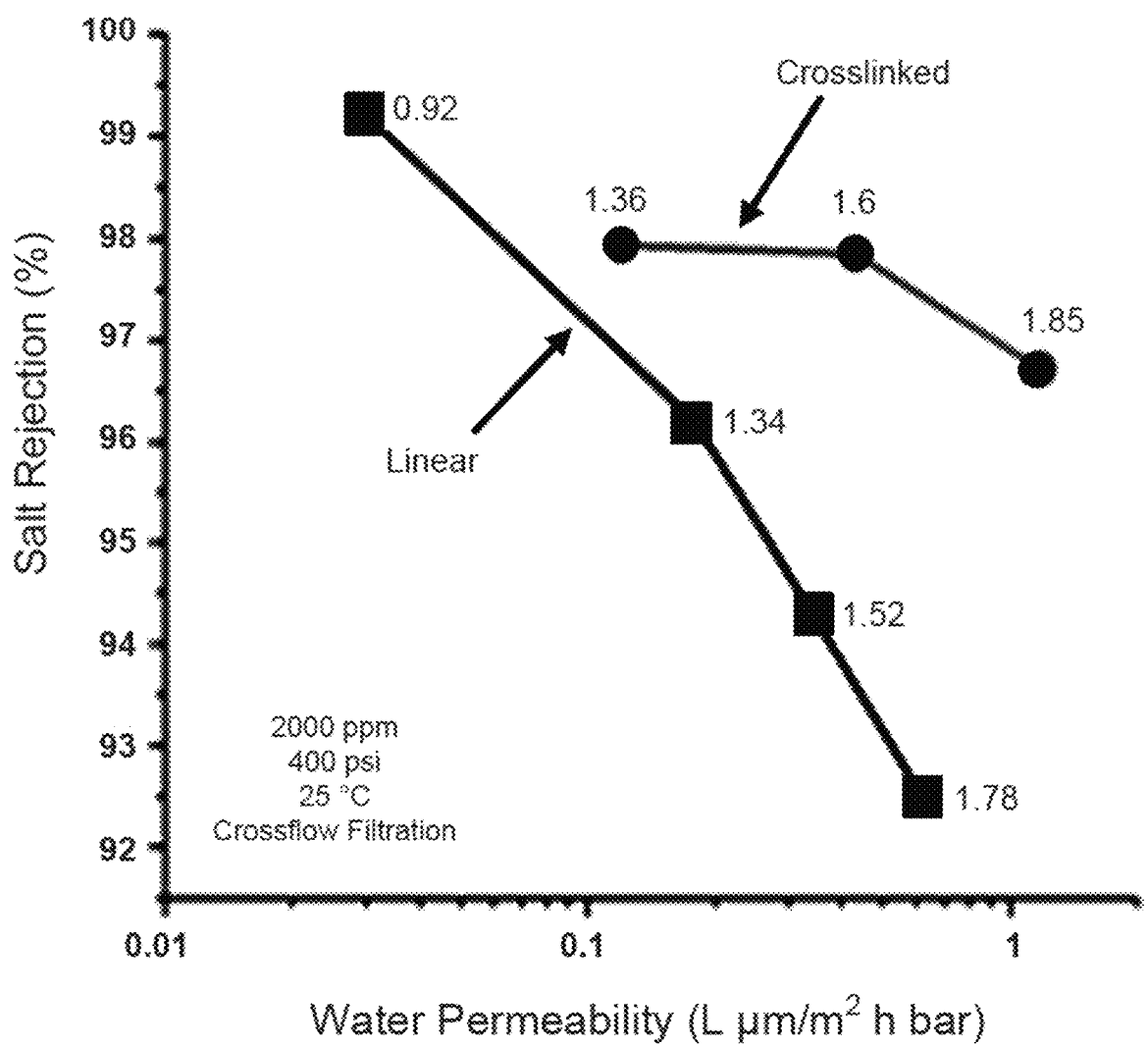
FIG. 10 provides data showing salt rejection and water permeability of different membranes. One line refers to data on linear copolymers with the top structure shown in FIG. 9. The other line refers to data for an analogous structure where an oligomer with a molecular weight of 10,000 g/mole was crosslinked with a tetrafunctional epoxy reagent (TGBAM).
Figure 11:
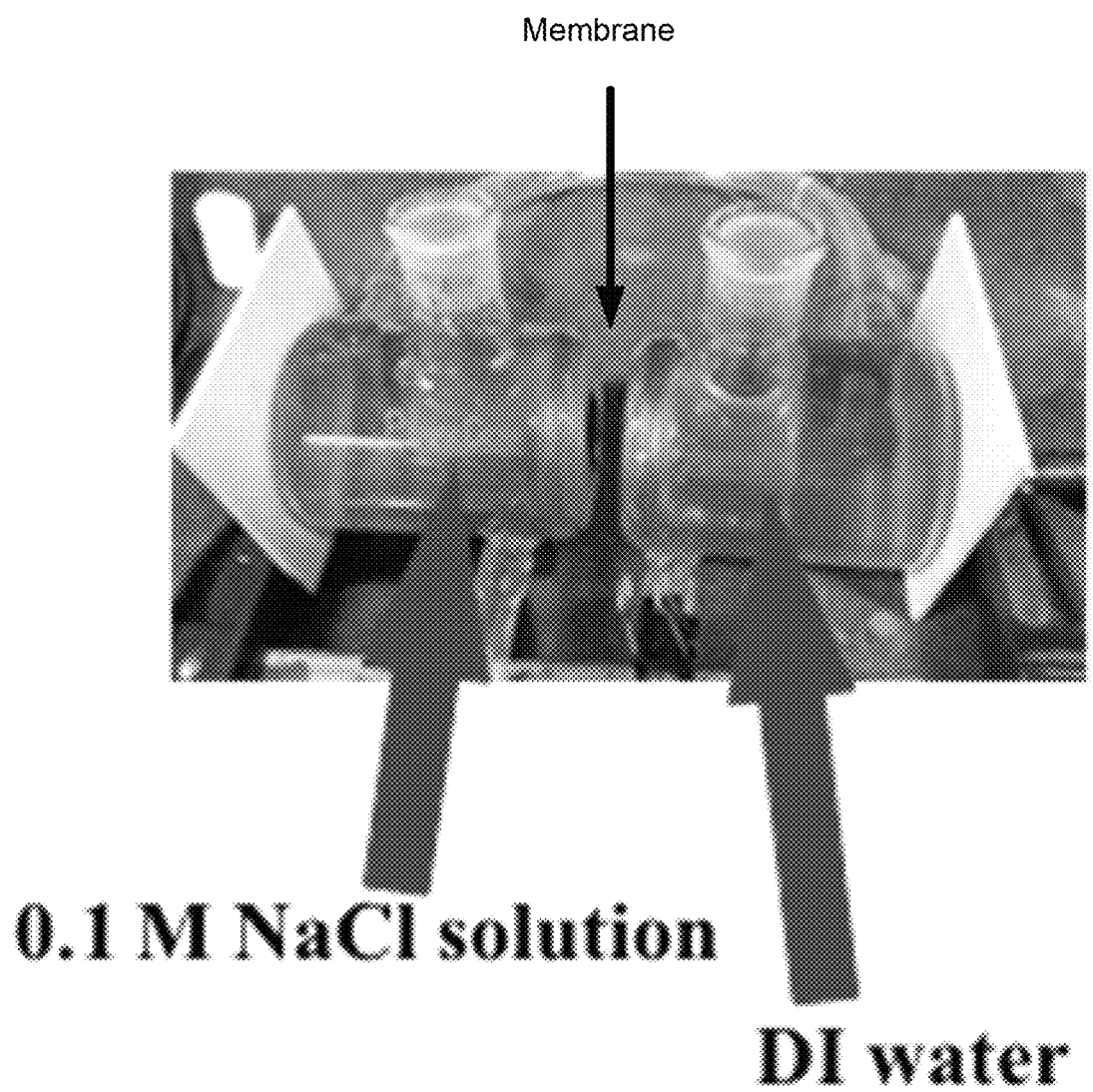
FIG. 11 provides a photograph of an example permeation test-cell for evaluating salt permeability, $<P_s>$ in membrane samples.
Figure 12:
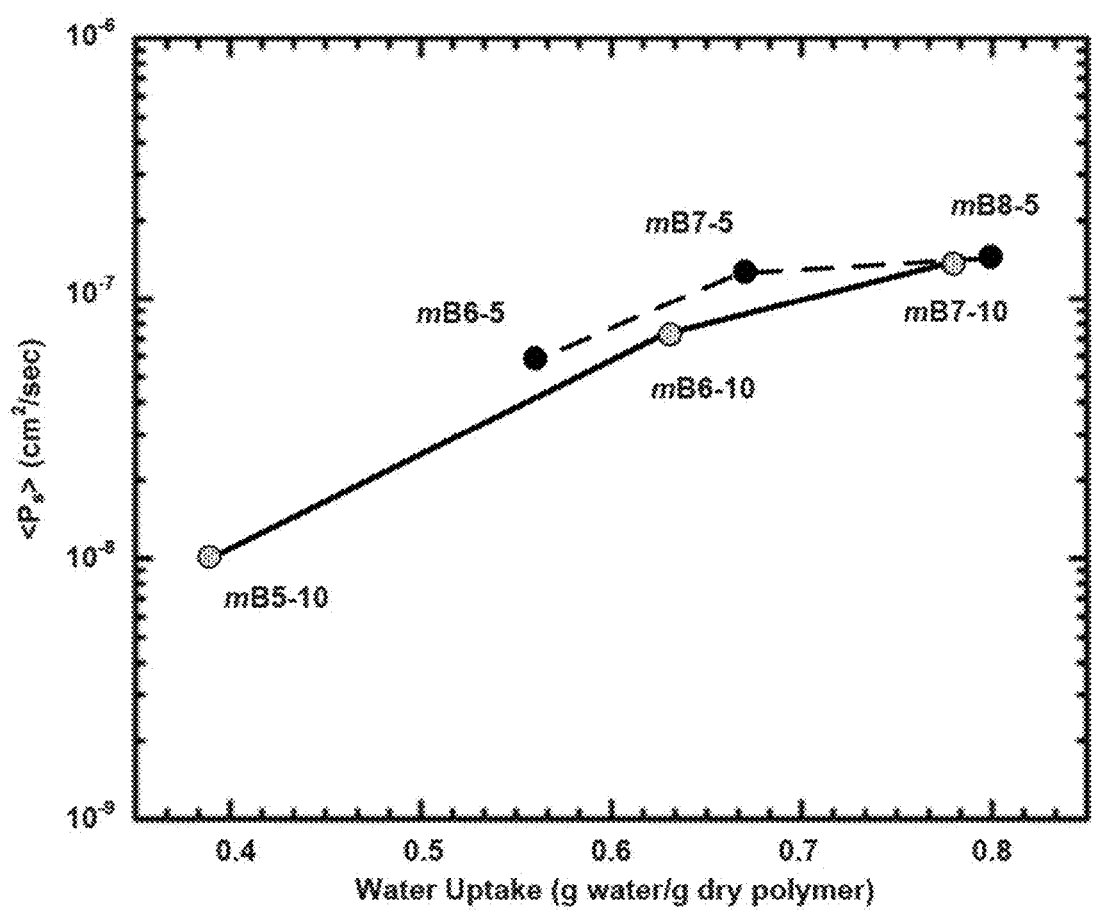
FIG. 12 and FIG. 13 show the relation between salt permeability and water uptake of different membranes (FIG. 12) and salt permeability vs. fixed charge concentration (FIG. 13).
Figure 13:
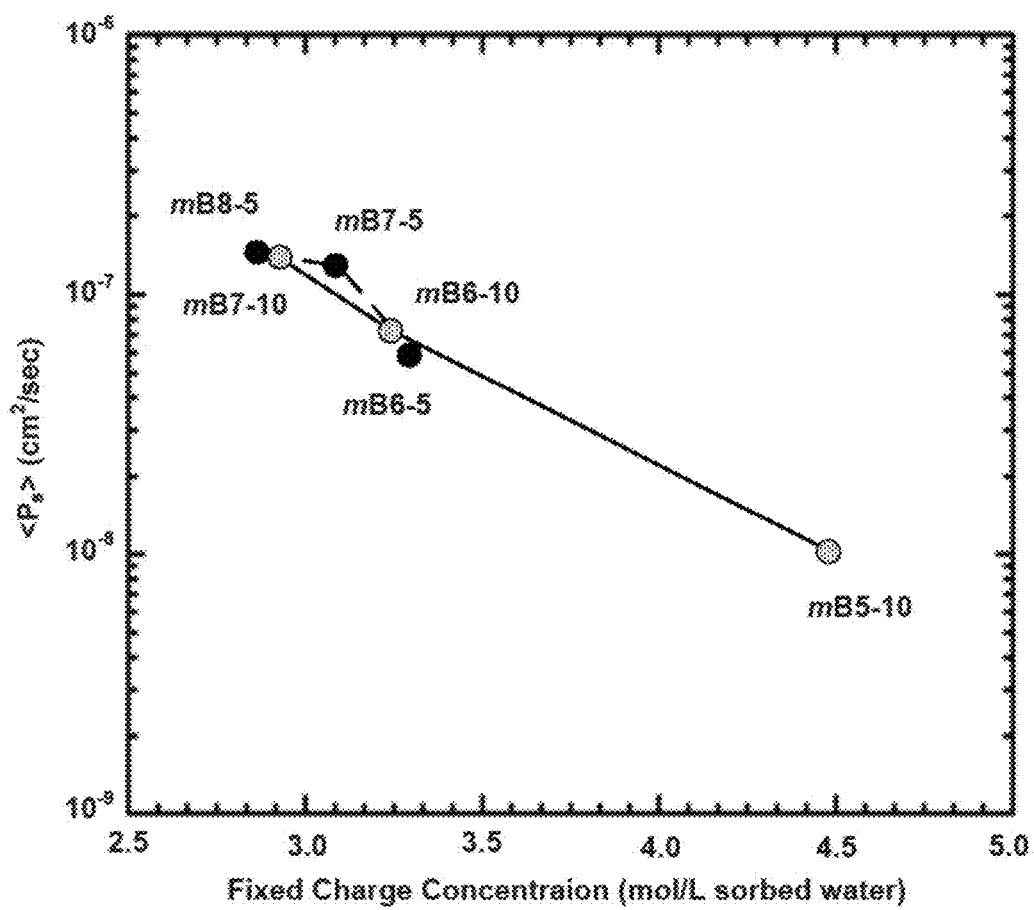

Water permeability increases and salt rejection decreases as the degree of disulfonation in the linear materials is increased (FIG. 9). This may be directly related to the amount of absorbed water. A comparison of the same properties of analogous crosslinked materials, however, shows clearly that better retention of high salt rejection is achieved for the crosslinked materials vs. the linear membranes as water permeability increases (FIG. 10). Again, this may be related to the lower amount of water absorption in the crosslinked networks relative to the linear materials. For example, the linear BPS-40 with 40% of the units disulfonated has a water uptake of 55% and an IEC of 1.78 while crosslinked membranes with IECs of 1.6 (water uptake of 26.6%) and 1.85 (water uptake of 41.3%) have significantly better sodium chloride rejection. Sodium chloride permeability was measured by monitoring the conductivity of a receptor solution as the ions diffused through a series of crosslinked disulfonated poly(arylene ether sulfone) membranes. The diffusion cell is depicted in FIG. 11. FIG. 12 and FIG. 13 illustrate the decrease in salt passage with decreased water uptake and the corresponding desirable decrease in salt passage as the fixed charge concentration in the membranes is increased, respectively. It is desirable to minimize the co-ion concentration in the membranes to achieve good salt rejection in reverse osmosis and good selectivity of counterion vs. co-ion transport through electrodialysis membranes. As the fixed charge concentration in the membrane is increased, the co-ion concentration in the membrane decreases. The Manning parameter, which characterizes the dimensionless fixed charge density, should be high to maintain selective low co-ion absorption and transport, and the Manning parameter decreases as the average distance between fixed charges on the membrane is increased. Methods to calculate the Manning parameter are set forth in J. Kamcev, M. Galizia, F. M. Benedetti, E.-S. Jang, D. R. Paul, B. D. Freeman, and G. S. Manning, "Partitioning of Mobile Ions Between Ion Exchange Polymers and Aqueous Salt Solutions: Importance of Counterion Condensation," Physical Chemistry ChemicalPhysics, 18, 6021-6031 (2016), which is incorporated herein by reference. Thus, as the degree of disulfonation is increased in these poly(arylene ether sulfone) membranes (i.e., the distance between fixed charge groups decreases), the Manning parameter increases and the co-ion sorption and transport decreases. However, the Manning parameter does not take into consideration differences in distribution of the fixed charge groups on the polymer backbone.

Description of Various Embodiments

While the rejection of sodium chloride by the disulfonated linear and crosslinked poly(arylene ether) membranes from the pre-disulfonated sulfone monomers is good, when mixed salt feeds containing a monovalent and multivalent cation were tested, the presence of the multivalent cation severely compromised the otherwise good rejection of sodium chloride of some membranes. This is illustrated in FIG. 14 where the salt rejection of a linear disulfonated poly(arylene ether sulfone) with 20% of the repeat units disulfonated was tested against feedwater containing mixtures of sodium chloride and calcium chloride. This is a major deterrent against the utility of such membranes since virtually all water to be desalinated contains significant amounts of multivalent salts in addition to monovalent salts. The reasons for this undesirable behavior with mixed salt feeds are not completely understood.

Several series of sulfonated poly(arylene ether sulfone)s with different chemical structures were prepared to identify membranes where the sodium chloride rejection is not significantly compromised by the presence of multivalent salts mixed with monovalent salts:

Monosulfonated Hydroquinone Based Linear Polymers (Post-Sulfonated) (SHQS-XX) (I)

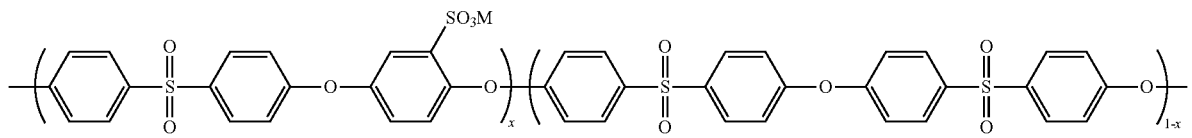

Monosulfonated Biphenol Based Linear Polymers (Pre-Sulfonated Monomers) (mBPS-XX) (II)

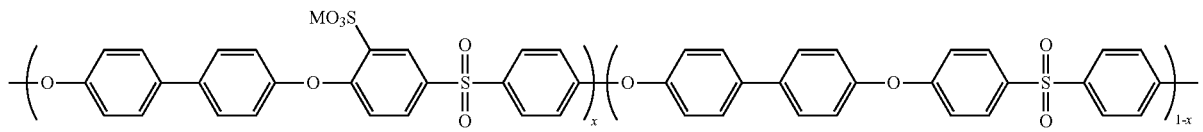

Disulfonated Biphenol Based Linear Polymers (Post-Sulfonated) (III)

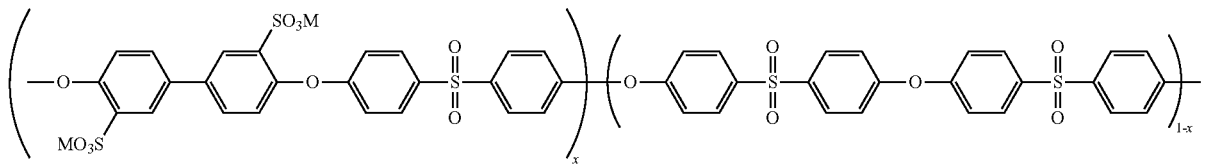

Disulfonated Biphenol Based Linear Polymers (Pre-Sulfonated Monomers) (BPS-XX) (IV)

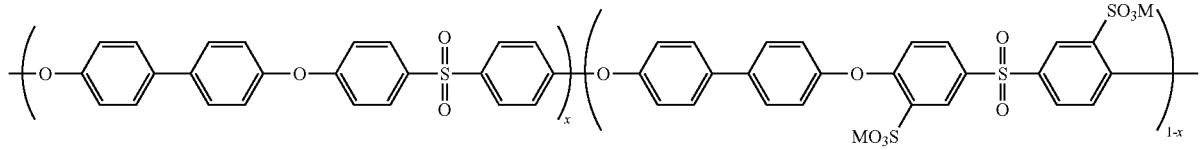

Monosulfonated Hydroquinone Based Crosslinkable Oligomers (Post-Sulfonated) (V)

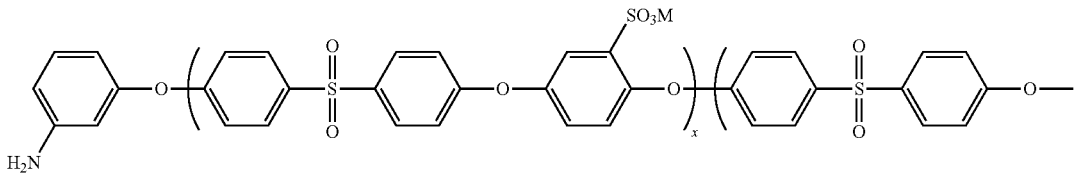

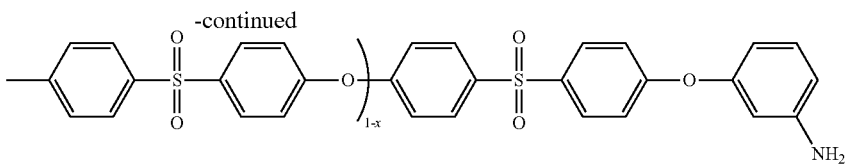

Disulfonated Biphenol Based Crosslinkable Oligomers (Pre-Sulfonated Monomers) (VI)

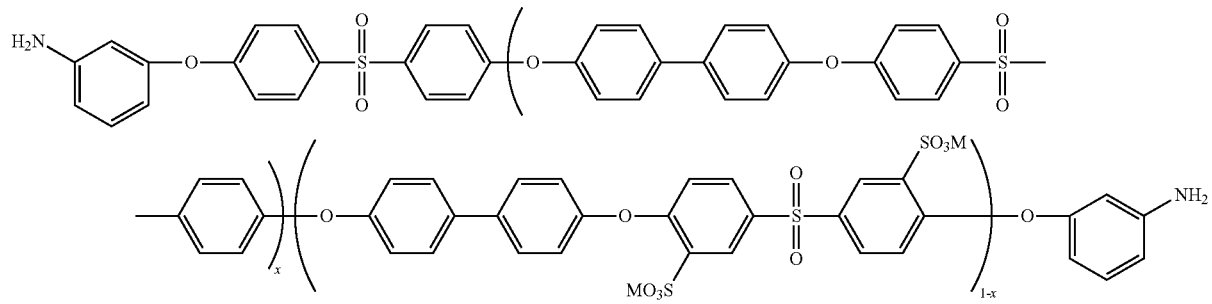

These were compared against the disulfonated biphenol based membranes that utilized pre-disulfonated sulfone monomers (structure IV, BPS-XX above) as depicted in FIG. 14. These included high molecular weight linear copolymers with somewhat different backbone structures, copolymers where the sulfonate anions were on adjacent rings on the sulfone unit versus those where the sulfonate anions were on adjacent rings on the biphenol unit, those where no two adjacent rings were sulfonated, and also sulfonated oligomeric copolymers that were later crosslinked. Unexpectedly, key features of some of these structures were identified that alleviated the problem of reduced monovalent salt rejection in the presence of multivalent salts. Results of sodium chloride rejection capacities in mixed sodium chloride/calcium chloride feeds are shown in Table 2. The water permeability (L μm m$^{-2}$ bar$^{-1}$ or cm$^2$ s$^{-1}$), salt permeability (cm$^2$ s$^{-1}$), salt rejection (%) and water/NaCl selectivity were determined at 25° C. using stainless steel crossflow cells. The pressure difference across the membrane (18.75 cm$^2$) was 400 psi. The initial aqueous feed contained 2000 ppm NaCl, and the feed solution was circulated past the samples at a continuous flow rate of 3.8 L min$^{-1}$. The feed pH was adjusted to a range between 6.5 and 7.5 using a 10 g/L sodium bicarbonate solution. NaCl concentrations in the feed water and permeate were measured with an Oakton 100 digital conductivity meter.

TABLE 2

The roman numerals in the headings refer to the structures shown above

|  | I<br>SHQS-40 | I<br>SHQS-50 | II<br>mBPS-51 | I<br>SHQS-60 | II<br>mBPS-61 | I<br>SHQS-60 | IV<br>BPS-32 |
|---|---|---|---|---|---|---|---|
| IEC-Na salt | 0.88 | 1.14 | 1.16 | 1.30 | 1.36 | 1.22 | 1.3 |
| H$_2$O uptake | 16 | 25 | 16 | 33 | 22 | 32 | 48 |
| H$_2$O permeability (×10$^7$) | 6.8 ± 2.7 | 15.9 ± 5.1 | 5.7 ± 0.2 | 24.9 ± 1.5 | 20.9 ± 2.6 | 22.7 ± 1.4 | 29.6 ± 0.9 |
| Salt rejection 2000 ppm NaCl | 98 ± 0.5 | 97.8 ± 0.3 | 99.3 ± 0.1 | 97.5 ± 0.3 | 98.7 ± 0.6 | 98.3 ± 0.1 | 97.5 ± 0.3 |
| +200 ppm CaCl$_2$ | 97.6 ± 0.8 | 96.1 ± 0.3 | 99.2 ± 0.1 | 95.6 ± 0.5 | 97.7 ± 0.2 | 98.5 ± 0.3 | 91.6 ± 0.5 |
| +400 ppm CaCl$_2$ | 97.1 ± 1.3 | 94.9 ± 0.7 | 99.0 ± 0.1 | 94.8 ± 0.2 | 97.1 ± 0.1 | 98.4 ± 0.1 | 88.7 ± 0.7 |

Firstly, the only difference in chemical structure of the mBPS-XX copolymers (II) relative to the BPS-XX copolymers (IV) is that mBPS-XX (II) has sulfonate ions on isolated rings whereas BPS-XX (IV) has sulfonate ions in sets of two on adjacent sulfone rings. Both sets are random copolymers. The copolymers that have the sulfonate ions distributed along the chain in sets of two that were prepared from the pre-disulfonated monomer (structure IV) uptake significantly more water relative to those that have the sulfonate ions on the isolated rings that were prepared from the pre-monosulfonated monomer (structure II) (Table 3).

TABLE 3

| Copolymer | IEC (meq/g) | Water Uptake in Na$^+$ form (%) | Water Uptake in K$^+$ form (%) | Fixed Charge Concentration (mol of ions/L sorbed water) |
|---|---|---|---|---|
| mBPS-51 | 1.16 | 16 ± 1.0 | 13 ± 0.6 | 7.25 |
| mBPS-61 | 1.36 | 22 ± 1.5 | 19 ± 0.0 | 6.18 |

TABLE 3-continued

| Copolymer | IEC (meq/g) | Water Uptake in Na+ form (%) | Water Uptake in K+ form (%) | Fixed Charge Concentration (mol of ions/L sorbed water) |
|---|---|---|---|---|
| mBPS-79 | 1.70 | 35 ± 1.1 | 29 ± 1.0 | 4.86 |
| BPS-32 | 1.32 | 48 | — | 2.75 |
| BPS-25 | 1.09 | 17 ± 0.8 | 14 ± 0.6 | 6.48 |
| BPS-33 | 1.38 | 40 ± 2.5 | 31 ± 0.6 | 3.45 |
| BPS-41 | 1.65 | 55 ± 1.0 | 42 ± 1.3 | 3.0 |

A comparison of mBPS-61 (II) and BPS-32 (IV) with almost equal numbers of ions (i.e., equal IECs) shows that the copolymer with isolated ring sulfonates (II) only absorbs about half the amount of water relative to the disulfonated BPS copolymer (IV). This makes the fixed charge concentration of the mBPS-61 (II) significantly higher than that for BPS-32 (IV). The result is very little compromise in sodium chloride rejection in the presence of calcium salts with mBPS-61 relative to significant compromise in BPS-32. The reason for the unexpected dramatic change in water absorption capacity with equivalent backbone structures and equivalent IECs is not understood. Secondly, comparison of entry 1 (SHQS-40 (I)) with entry 3 (mBPS-51 (II)) shows that these copolymers have equivalent water absorption with unequal numbers of ions (i.e., unequal IECs). This makes the fixed charge concentration of the mBPS-51 higher than that for SHQS-40 at equivalent amounts of water absorption and equivalent water permeabilities. The sodium chloride rejection in the presence of divalent calcium salts is good in both cases relative to the BPS copolymer but it is particularly outstanding for the case of mBPS-51 with the higher fixed charge concentration. In hindsight, the lower polarity of the backbone chemical structure of mBPS-51 relative to SHQS-40 may contribute to the capacity to increase the ion concentration yet maintain lower water absorption. The sodium rejection versus the amount of calcium ions added to the sodium chloride feed is summarized in FIG. 15. All of the copolymers in FIG. 15 except BPS-32 have the sulfonates on isolated rings whereas BPS-20 has sulfonates randomly distributed but in sets of two on adjacent rings. Thus, it is now recognized that sulfonated poly(arylene ether sulfone) membranes where the sulfonate anions are distributed randomly along the chain on isolated rings rather than distributed randomly but in sets of two adjacent rings next to a sulfone moiety have significantly improved monovalent salt rejection properties when exposed to mixed salt feedwaters. Surprisingly, structure II above, where the sulfonate ions are located on adjacent rings on biphenol units (rather than on sulfone units), also does not show significantly reduced monovalent salt rejection in the presence of $CaCl_2$. Thus, the exact placement of the sulfonates on poly(arylene ether)s with respect to their capacity to retain high monovalent salt rejection in mixed salt feedwaters that also contain multivalent salts is surprising.

Example 1. Synthesis of monosulfonated dichlorodiphenylsulfone monomer 4,4'-Dichlorodiphenylsulfone (17.4 mmol, 5 g) was introduced into a 250-mL, round bottom flask equipped with a mechanical stirrer and condenser, and purged with nitrogen for 5 minutes. The nitrogen flow was stopped and fuming sulfuric acid (19.1 mmol, 4.8 mL) was introduced to the reaction flask. The 4,4'-dichlorodiphenylsulfone dissolved in the fuming sulfuric acid at room temperature. When dissolution was complete, the oil bath temperature was raised to 100° C. The reaction was allowed to proceed for 6-7 hours. The reaction mixture was cooled to room temperature, then the reaction flask was placed in an ice bath. Over 10 minutes, a mixture of DI water (40 mL) and ice (40 g) was slowly added to the reaction while stirring. After complete addition of the ice water, the reaction was heated to 65° C. and NaCl (30 g) was slowly added to precipitate the mixture. The mixture was filtered and the filtrate was returned to the reaction flask. DI water (100 mL) was added to the flask to form a suspension that contained both insoluble and soluble products. The suspension was neutralized by slowly adding 10 M aqueous NaOH solution. The neutralization was constantly checked with litmus paper. The suspension was re-precipitated by adding NaCl (30 g) at 65° C. The precipitate was filtered and the solid filtrate was collected. The solid was dissolved in a DI water (70 mL) and $CHCl_3$ (30 mL) mixture and the aqueous layer was collected. 1-Butanol (150 mL) was added to the aqueous layer and the mixture was shaken and allowed to separate. The 1-butanol layer was collected, dried over $MgSO_4$, and filtered. After solvent evaporation via rotary evaporator, the product was collected with a yield of 59%. The monosulfonated 4,4'-dichlorodiphenylsulfone did not melt up to the limit of 300° C. of the melting point apparatus.

Synthesis of a Linear Sulfonated Poly(Arylene Ether Sulfone) by Direct Polymerization with Isolated Sulfonatedrings.

Aromatic nucleophilic substitution step copolymerization was used to synthesize a series of monosulfonated biphenol-based poly(arylene ether sulfone) (mBPS-XX) and disulfonated biphenol-based poly(arylene ether sulfone) (BPS-XX) copolymers. In this series "XX" represent the degree of monosulfonation and disulfonation in mBPS and BPS, respectively.

Example 2

A mBPS-80 with 80% of the repeat units monosulfonated was synthesized as follows. Biphenol (14.96 mmol, 2.7863 g), 4,4'-dichlorodiphenylsulfone (2.2445 mmol, 0.6445 g), monosulfonated 4,4'-dichlorodiphenylsulfone (12.85 mmol, 5.00 g), and DMAc (45 mL) were charged into a 250-mL three neck round bottom flask equipped with a mechanical stirrer, condenser, nitrogen inlet, and Dean-Stark trap filled with toluene. The mixture was stirred in an oil bath at 150° C. until the monomers completely dissolved. $K_2CO_3$ (18.08 mmol, 2.5 g) and toluene (20 mL) were added into the flask. The reaction was refluxed for 4 hours to azeotropically remove water from the system. Toluene was drained from the Dean-Stark trap, and the oil bath temperature was raised to 180° C. to remove residual toluene from the reaction. The reaction solution was stirred for 48 hours, then cooled to room temperature. After dilution of the solution with DMAc (100 mL), it was filtered to remove the salt. The transparent solution was precipitated by addition into isopropanol (1000 mL) with vigorous stirring. The white fibers were filtered and then stirred in boiling DI water for 4 hours to remove any residual DMAc. The copolymer was filtered and dried at 120° C. under reduced pressure in a vacuum oven. Yield 90% copolymer.

Example 3. Synthesis of a Linear Sulfonated Poly(Arylene Ether Sulfone) with Isolated Sulfonated Rings by Post-Sulfonation Aromatic nucleophilic substitution step copolymerization was used to synthesize a series of hydroquinone-based poly(arylene ether sulfone) copolymers (HQS xx). HQS-60 with 60% of the repeat units containing hydroquinone was synthesized as follows. Hydroquinone (19.85 mmol, 2.186 g), 4,4'-dichlorodiphenylsulfone (33.08 mmol, 9.501 g), bisphenol sulfone (13.235 mmol, 3.312 g) and sulfolane (43 mL) were charged into a 250-mL three neck round bottom flask equipped with a mechanical stirrer, condenser, nitrogen inlet, and Dean-Stark trap filled with toluene. The mixture was stirred and heated in an oil bath at 150° C. until the monomers dissolved. $K_2CO_3$ (38.382 mmol, 5.305 g) and toluene (21 mL) were added into the flask. The reaction was refluxed for 6 hours to azeotropically remove water from the system. Toluene was drained from the Dean-Stark trap, and the oil bath temperature was raised to 200° C. to remove residual toluene from the reaction. The reaction solution was stirred for 47 hours at 200° C. The reaction mixture was hot filtered to remove salts and precipitated in DI water. The polymer was stirred in boiling DI water for 4 hours to remove any residual solvent. The polymer was filtered and dried at 120° C. under reduced pressure in a vacuum oven. For sulfonation, 10 g of the dry polymer was dissolved in 100 mL of concentrated sulfuric acid in a three neck round bottom flask equipped with a nitrogen inlet and thermometer, overhead stirrer, and a condenser. An oil bath was used to maintain the temperature at 50° C. The reaction was stirred vigorously to promote rapid dissolution. After maintaining the reaction temperature for 2 hours, the solution was precipitated into ice cold water, and rinsed thoroughly to remove residual acid. The polymers were stirred in 1.0 M NaCl overnight, dried at 50° C. for 4 hours at atmospheric pressure, then dried for 12 hours under vacuum at 120° C.

Example 4. Oligomer Synthesis with the Pre-Monosulfonated Monomer

The reaction scheme for the synthesis is shown in FIG. 16. The molecular weights may be controlled by adjusting the stoichiometry of the monomers and terminating reagents according to methods well known for step-growth polymerizations. The following procedure is for a 10,000 g/mole oligomer terminated with crosslinkable tetrafluorostyrene endgroups. 4,4'-Dichlorodiphenylsulfone (38.43 mmol, 11.04 g), monosulfonated-4,4'dichlorodiphenylsulfone (38.43 mmol, 14.96 g), 4,4'-biphenol (80.55 mmol, 15.00 g), potassium carbonate (96.66 mmol, 13.35 g), dimethylacetamide (240 mL), and toluene (25 mL) were added to a 500-mL three neck round bottom flask equipped with a mechanical stirrer, Dean-Stark trap, condenser, and nitrogen inlet. The reaction vessel was immersed in an oil bath and heated to 150° C. to azeotropically dry the mixture for 4 hours. The toluene was drained from the Dean-Stark trap and the oil bath temperature was increased to 180° C. for 48 hours. The reaction was allowed to cool to room temperature, then pentafluorostyrene (72.44 mmol, 10 mL) was added to the reaction vessel, and the mixture was heated to 110° C. for 2 hours. The reaction was diluted with dimethylacetamide (80 mL) and allowed to cool to room temperature. The reaction mixture was precipitated into stirring isopropyl alcohol (2500 mL), resulting in a white polymer. The polymer was filtered and added to stirring deionized water (3000 mL) at room temperature overnight to remove salts and residual DMAc. The polymer was isolated and dried in vacuo at 65° C. for 48 hours to obtain an 87% yield.

Example 5. Crosslinking a Thin Film of the ~0,000 g/Mole Oligomer Described Above by Free Radical Polymerization The oligomer (0.4 g) was dissolved in 1 mL of dimethylacetamide. AIBN (0.008 g) was added in the mixture. A clean glass plate was placed in an oven that was continuously purged with nitrogen, the plate was levelled, then heated to 80° C. The polymer solution in DMAc was poured onto the plate and a doctor's blade with a gap of ~70 microns was utilized to spread the solution across the plate. The 80° C. temperature was maintained for 20 minutes, then the film was immersed in deionized water to delaminate the film from the glass plate. The film was boiled in deionized water for 2 hours to remove residual dimethylacetamide, then dried under vacuum at 140° C. for 24 hours. Thermogravimetric analysis showed that <2% of dimethylacetamide/water remained. The film was submerged in dimethylacetamide for 24 hours at room temperature to extract the sol fraction. The mixture was vacuum filtered, and the gel fraction was dried for 24 hours at 140° C. under vacuum. Thermogravimetric analysis showed ~5 wt % dimethylacetamide remaining. The gel fraction was 85 wt %.

Another example reacted a mixture of the 10,000 g/mole tetrafluorostyrene terminated oligomer with a 2000 g/mole tetrafluorostyrene terminated oligomer. The oligomer mixture (0.7 g) contained the 10,000 g/mole oligomer (0.585 g) and the 2000 g/mole oligomer (0.115 g) and 17 mg of AIBN dissolved in 1.75 mL of dimethylacetamide. The mixture was cured under nitrogen at 80° C. for 20 minutes. The gel fraction after exhaustive extraction with dimethylacetamide was 70%.

Another example reacted a mixture of the 10,000 g/mole tetrafluorostyrene terminated oligomer with a 2000 g/mole tetrafluorostyrene terminated oligomer with divinylbenzene as a low molecular weight reactant. The oligomer mixture (0.7 g) contained the 10,000 g/mole oligomer (0.585 g) and the 2000 g/mole oligomer (0.115 g). Divinylbenzene (7 mg) and 17 mg of AIBN were dissolved in 1.75 mL of dimethylacetamide. The mixture was cured under nitrogen at 80° C. for 20 minutes. The gel fraction after exhaustive extraction with dimethylacetamide was 57%.

Alternatively, the ~10,000 g/mole tetrafluorostyrene-functional oligomer described above was cured with light. The oligomer (0.4 g) and 4 mg of 2,4,6-trimethylbenzoyl-diphenylphosphine oxide (TPO) were dissolved in 0.9 mL of dimethylacetamide plus 0.1 mL of diethylene glycol. The solution was cast on a glass plate and cured at 60° C. with 365 nm light for 3 seconds. The gel fraction of the film was 92% after exhaustive extraction with dimethylacetamide.

Blends of different molecular weight oligomers with functional endgroups can be cured by free radical polymerization either thermally or photochemically. For example, a blend of a minor amount of a 2,000 g/mole tetrafluorostyrene terminated oligomer can be mixed with a major amount of a 10,000 g/mole tetrafluorostyrene terminated oligomer and cured in a similar manner to that designated above in example 5. Moreover, small amounts of low molecular weight monomers, e.g., ~1-5 weight percent of divinylbenzene, may also be co-cured with such mixtures.

Controlled post-sulfonation of linear non-sulfonated poly(arylene ether sulfone)s, some that contained hydroquinone comonomers and some that contained biphenol, have also been achieved. The hydroquinone (or biphenol) rings in the copolymers should be the only rings that are activated for electrophilic aromatic sulfonation. By using mild sulfonation conditions, those activated rings can be quantitatively monosulfonated (for hydroquinone) or disulfonated (for biphenol) without sulfonating any of the other positions on the backbone.

The inventors have further discovered that controlled molecular weight end-functional oligomers can be prepared, then selectively post-sulfonated only on positions that are activated for electrophilic aromatic substitution. This inventive aspect has the advantage over other membranes in that no monosulfonated or disulfonated monomers are required. The method affords a means to prepare crosslinked sulfonated polysulfone networks without the need to synthesize pre-formed sulfonated monomers. By forming random copolymeric oligomers by step-growth polymerization, the method allows for controlling both the level of sulfonation and also the distribution of sulfonate anions along the oligomer backbones. These networks provide a means for improving the fixed charge concentration without the necessity of synthesizing and purifying new monomers.

Historically, the post-sulfonation route led to uncontrolled sequences of sulfonic acid groups along the chains unless special compositions were utilized. Most previous work on post-sulfonation of polysulfones utilized rather harsh conditions because the rings to be sulfonated included both activated and deactivated rings toward the electrophilic aromatic sulfonation reaction. Hence, post-sulfonation as an approach for sulfonating poly(arylene ether sulfone)s was abandoned due to poor control over the extent of sulfonation, inability to control the microstructure of the sulfonated units, and decrease in molecular weight due to chain scission during sulfonation. These post sulfonated polysulfone membranes were found to be resistant to degradation by chlorine but showed relatively low salt rejections relative to the state-of-the-art interfacial polyamides. Alternatively, controlled post-sulfonation of poly(arylene ether sulfone)s that contained hydroquinone or biphenol units may be performed. The sulfonation reaction may proceed only at the hydroquinone (or biphenol) because all of the other rings were deactivated toward electrophilic aromatic sulfonation by the electron withdrawing sulfone groups. In the current example, the reaction kinetics and measurements of molecular weight of a polysulfone containing hydroquinone were studied to optimize the sulfonation process with a minimal level of chain scission. This information was used for developing a series of post-sulfonated polymers with varying structures to determine their relationships among structures and properties.

Description of Various Embodiments—Synthesis and Characterization of Controlled Molecular Weight Oligomers that are Made by Post-Sulfonation with Crosslinkable Endgroups A systematic series of oligomers with a range of hydroquinone content was synthesized by varying the ratio of bisphenol sulfone and hydroquinone monomers. The polymerization takes place via the carbonate method in which $K_2CO_3$ deprotonates the phenol monomers to form an anionic nucleophile. The nucleophile attacks the electronegative carbon attached to the halogen, with release of the halogen. Only a slight excess of $K_2CO_3$ was utilized to avoid any hydrolysis of the halogen functional monomer, thus in turn, preventing unwanted endgroups.

A reaction using post-sulfonation to generate controlled molecular weight aminophenol-terminated oligomers by post-sulfonation is provided. The first step is synthesis of the non-sulfonated oligomer, the second step is post-sulfonation, the third step is regeneration of the amine endgroups and conversion of the pendent sulfonic acid groups to salts. In the second step, only the hydroquinone units become sulfonated because all of the other rings are selected to be deactivated toward the electrophilic aromatic sulfonation reaction, so that they do not react under the mild conditions used for the post-sulfonation. The hydroquinone sulfonations are quantitative, thus allowing control over the degree of sulfonation by controlling how much hydroquinone is charged into the reaction, even though an excess of sulfuric acid is used in the post-sulfonation reaction. Rose showed (U.S. Pat. No. 4,273,903, John B. Rose, inventor, to Imperial Chemical Industries, Ltd., Jun. 16, 1981) selective sulfonation of the hydroquinone but he did not discuss any method for forming controlled molecular weight oligomers so that they could be functionalized with amine endgroups or with other types of functional endgroups. So the Rose patent does not disclose crosslinking reactions or crosslinked polymers. The copolymer moieties derived from the bisphenol sulfone do not post-sulfonate but the moieties derived from the hydroquinone do. There are other bisphenols that could potentially be used with the bisphenol sulfone as alternatives for the hydroquinone (listed below). An example utilizing biphenol instead of hydroquinone is provided herein. During post-sulfonation, it sulfonates with approximately one ion on each ring (the use of biphenol is not included in Rose's 1981 patent).

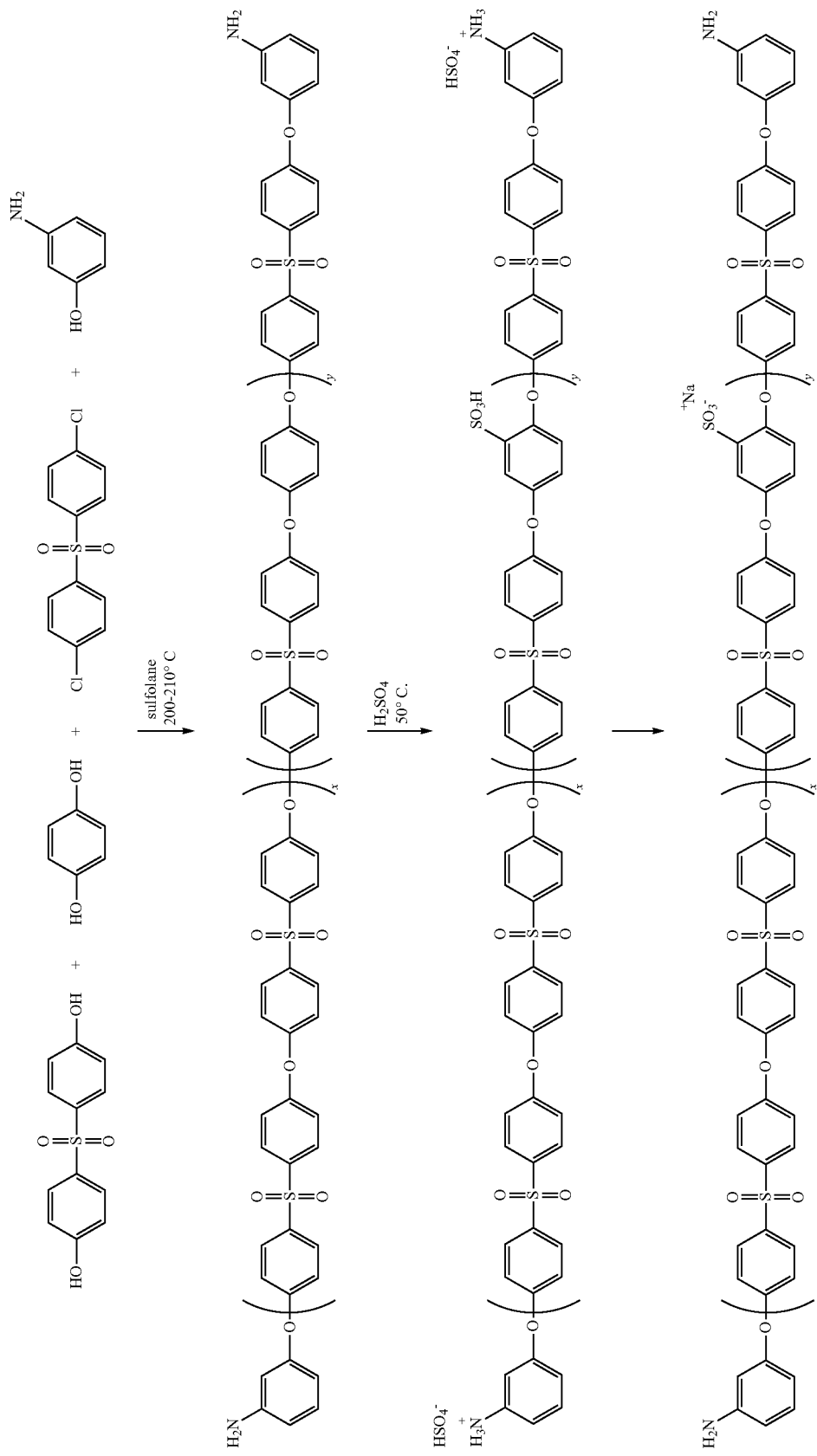

The below structures show other bisphenols that are useful for post-sulfonation in addition to hydroquinone, where each R can independently be H or $CH_3$:

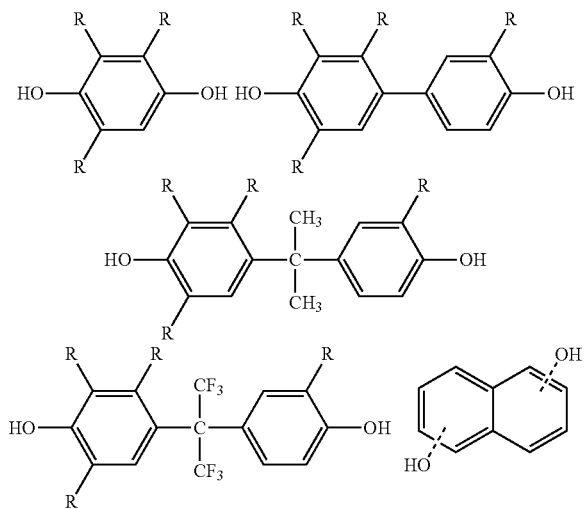

Example 6. Synthesis of Amine Terminated Hydroquinone Polysulfone Oligomers for Subsequent Post-Sulfonation and Crosslinking A reaction to prepare a 10,000 g/mole $M_n$, amine-terminated oligomer with 50 mole % of the bisphenol moieties being hydroquinone is provided. It is recognized that other molecular weights may be synthesized by adjusting the stoichiometry of the reactants. Hydroquinone (2.642 g, 24 mmol), bisphenol sulfone (6.006 g, 24 mmol), and m-aminophenol (0.436 g, 4 mmol) were dissolved in 67 mL of sulfolane in a 3-neck round bottom flask equipped with a nitrogen inlet, overhead stirrer, and condenser with a Dean Stark trap. Toluene (34 mL) and $K_2CO_3$ (8.624 g, 62 mmol) were added and the reaction was refluxed at 180-185° C. to azeotropically remove any water. After 4 hours, the toluene was removed from the Dean Stark trap. 4,4'-Dichlorodiphenylsulfone (14.358 g, 50 mmol) was added into the reaction and the reaction temperature was raised to 200-210° C. After 48 hours, the mixture was allowed to cool to ~150° C. and then diluted with 40 mL of N,N-dimethylacetamide. The solution was filtered hot to remove salts and subsequently precipitated in isopropanol. The polymer was boiled in water with 3 changes of water to remove trace amounts of sulfolane and then dried at 50° C. for 4 hours, followed by 12 hours under vacuum at 110° C. The reaction had a yield of 97%.

Example 7. Synthesis of Amine Terminated, Biphenol Polysulfone Oligomers for Subsequent Post-Sulfonation and Crosslinking A reaction to prepare a 10,000 g/mole $M_n$, amine-terminated oligomer with 28 mole % of the bisphenol moieties being biphenol is provided. Biphenol (4.34 g, 0.0233 moles), bisphenol sulfone (15 g, 0.06 moles), and m-aminophenol (0.828 g, 0.0076 moles) were dissolved in 123 mL of sulfolane in a 3-neck round bottom flask equipped with a nitrogen inlet, overhead stirrer, and condenser with a Dean Stark trap. The reaction temperature was controlled with a temperature controller connected to a thermocouple in a salt bath. Toluene (34 mL) and $K_2CO_3$ (13.80 g, 0.10 moles) were added and the reaction was refluxed at 180-185° C. to azeotropically remove any water. After ~4 hours, the toluene was removed from the Dean Stark trap. 4,4'-dichlorodiphenylsulfone (24.97 g, 0.087 moles) was added into the reaction flask and the temperature was raised to 200-210° C. After 48 hours, the mixture was allowed to cool to ~150° C. and then diluted with 30 mL of N,N-dimethylactamide. The mixture was hot-filtered, then kept above the melting point of sulfolane (27.5° C.) while it was precipitated in isopropanol to remove traces of solvents. The polymer was boiled in water with 3 changes of water to remove trace amounts of sulfolane and then dried at 50° C. for 4 hours, followed by 12 hours under vacuum at 110° C.

Example 8. Post Sulfonation of Amine-Terminated, Hydroquinone Polysulfone Oligomers A dry 10,000 g/mole $M_n$ hydroquinone polysulfone oligomer (10 g) was dissolved in 100 mL of concentrated sulfuric acid in a 3-neck round bottom flask equipped with a nitrogen inlet and thermometer, overhead stirrer, and a condenser. An oil bath was used to maintain a reaction temperature of 50° C. After 2 hours of reaction, the solution was precipitated into ice-cold water, then rinsed with water to remove excess acid until litmus paper showed no traces of acid in the filtrate. The sulfonated polysulfone oligomer with ammonium endgroups was converted to the salt form and the ammonium endgroups were converted to amines by stirring in 0.1 M aq. NaOH for 6 hours. The amine terminated sulfonated hydroquinone polysulfone oligomer was filtered and dried at 50° C. for 7 hours at atmospheric pressure, then for 12 hours under vacuum at 110° C. Proton NMR showed that the hydroquinone units had been sulfonated. A water insoluble product was obtained and no degradation of the oligomer was observed. The sulfonic acid groups were only substituted on the activated hydroquinone for electrophilic aromatic substitution due to the mild reaction conditions.

FIG. 17 provides a $^1$H NMR spectrum of a 10k-65-HQS oligomer showing quantitative terminal endgroup functionality. The fraction of hydroquinone-containing units were confirmed from the $^1$H NMR spectra (FIG. 17). The integral corresponding to the amine peaks (I) was standardized at 4 and integration of the cluster of peaks from the protons adjacent to the sulfone groups was subtracted from the integrals of the cluster of peaks B, $B_1$, and C, to yield the number of protons on the hydroquinone units. Hence, by determining the number of hydroquinone and the bisphenol sulfone units, molecular weights of the oligomers were calculated.

FIG. 18 provides a $^1$H NMR of 10k-65-SHQS. Quantitative monosulfonation of the hydroquinone rings in the oligomers was confirmed by $^1$H NMR as shown in FIG. 18. Due to the presence of water and the hydrophilicity, broad peaks were observed. However, appearance of the peak C' was observed simultaneously with a disappearance or reduction in C peaks. Correlation $^1$H NMR spectroscopy (FIG. 19) confirmed that the C' peak corresponded to the proton next to the sulfonic acid group since it did not correlate to any other proton. FIG. 19 provides COSY NMR data of 10k-65-SHQS confirming sulfonation only on the hydroquinone units.

End Group Analysis of the Oligomers by Fluorine Derivatization.

The amine terminated oligomers with amine and any residual phenolic end groups were reacted with trifluoroacetic anhydride to produce the respective trifluoroacetate derivatives. The reaction for the derivatization of a 5,000 g/mole, amine-terminated oligomer with 50 mole % of the bisphenol moieties being hydroquinone (50-HQS-5k) is provided. 50-HQS-5k oligomer (200 mg, 0.040 mmol), with amine end groups and possibly unreacted hydroxyl end groups, was dissolved in 5 mL of $CHCl_3$ in a 25-mL flask and trifluoroacetic anhydride (0.5 mL, 3.53 mmol) was added. The reaction mixture was held at 25° C. for 12 hours. DI water (100 mL) was added to the reaction mixture to hydrolyze the remaining anhydride, and the mixture was stirred at room temperature for 2 hours. The organic phase was analyzed by $^{19}F$ NMR.

FIG. 25 provides an overview of the synthesis of controlled molecular weight random oligomers by nucleophilic aromatic substitution. X=0.40, 0.50, 0.65, 0.80. FIG. 27 provides an overview of the fluorine derivatization of the oligomers to check for unreacted monomers and completion of the reaction.

To confirm the absence of undesirable residual phenol or chlorine end groups after the reaction, the oligomer was derivatized with trifluoroacetic anhydride as shown in FIG. 27. The anhydride reacts with the amine end groups forming a derivative that resonates at ~−74 ppm in the $^{19}F$ NMR spectrum (FIGS. 28A and 28B). The anhydride also reacts with any unreacted end groups of Bis-S or hydroquinone, resonating downfield from the amine. An aliquot taken at 24 hours showed that there was one equivalent of phenol from Bis-S for very five equivalents of amine. However, an aliquot taken at 36 hours showed successful completion of the reaction. FIG. 28A provides $^{19}F$ NMR spectra of the oligomers showing unreacted hydroxyl end groups and amine groups of the oligomer-aliquot at 24 h of the reaction and FIG. 28B provides $^{19}F$ NMR spectra of only amine end groups of the oligomer-aliquot at 36 h of the reaction.

FIG. 20 provides light scattering SEC curves of 10k-65-SHQS and 10k-65-HQS to confirm the molecular weights. FIG. 20 displays symmetric light scattering curves. The elution times of the sulfonated oligomers were lower than their non-sulfonated counterparts (FIG. 20). The molecular weights and percentages of hydroquinone units are shown in Table 4.

TABLE 4

Summary of molecular weights.

| Oligomer | $M_n$ by $^1H$ NMR (kDa) | $M_n$ by SEC (kDa) | $M_w$ by SEC (kDa) | PDI | dn/dc |
|---|---|---|---|---|---|
| 5k-50-HQS | 5.0 | 6.8 | 10.2 | 1.5 | 0.1713 |
| 5k-50-SHQS | 5.4 | 8.2 | 12.2 | 1.5 | 0.1674 |
| 5k-65-HQS | 5.3 | 7.6 | 16.5 | 2.2 | 0.2044 |
| 5k-65-SHQS | 6.1 | 10.0 | 19.6 | 2.0 | 0.1934 |
| 5k-80-HQS | 6.0 | 10.8 | 22.1 | 2.0 | 0.1879 |
| 5k-80-SHQS | 7.30 | 14.4 | 28.5 | 2.0 | 0.1772 |
| 10k-50-HQS | 12.3 | 13.7 | 27.5 | 2.0 | 0.1885 |
| 10k-50-SHQS | 13.8 | 18.2 | 35.9 | 2.0 | 0.17 |
| 10k-65-HQS | 11.2 | 9.9 | 21.5 | 2.2 | 0.1793 |
| 10k-65-SHQS | 13.0 | 17.5 | 38.4 | 2.2 | 0.1533 |
| 10k-80-HQS | 11.2 | 14.6 | 25.8 | 1.8 | 0.1772 |
| 10k-80-SHQS | 13.7 | 26.4 | 49.6 | 1.9 | 0.1544 |

Example 9. Post-Sulfonation of an Amine-Terminated Biphenol Polysulfone Oligomer Post-sulfonation of an amine-terminated biphenol polysulfone oligomer was conducted in the same manner as an amine-terminated hydroquinone polysulfone oligomer described in example 8. One sulfonate on each biphenol ring resulted.

Example 10. Crosslinking of Amine-Terminated, Post-Sulfonated, Hydroquinone Polysulfone Oligomers with Epoxy Reagents Film casting involved crosslinking of the post-sulfonated telechelic oligomers with the crosslinking agent TGBAM utilizing triphenylphosphine as a catalyst. The crosslinking reaction was conducted above the Tgs of the oligomers, which were suppressed by the solvent (DMAc). The IECs of the crosslinked networks were lower than the precursor oligomers due to incorporation of the hydrophobic TGBAM. The fixed charge concentration was calculated as the ratio of IEC to water uptake. High gel fractions (90%) were observed for all of the networks.

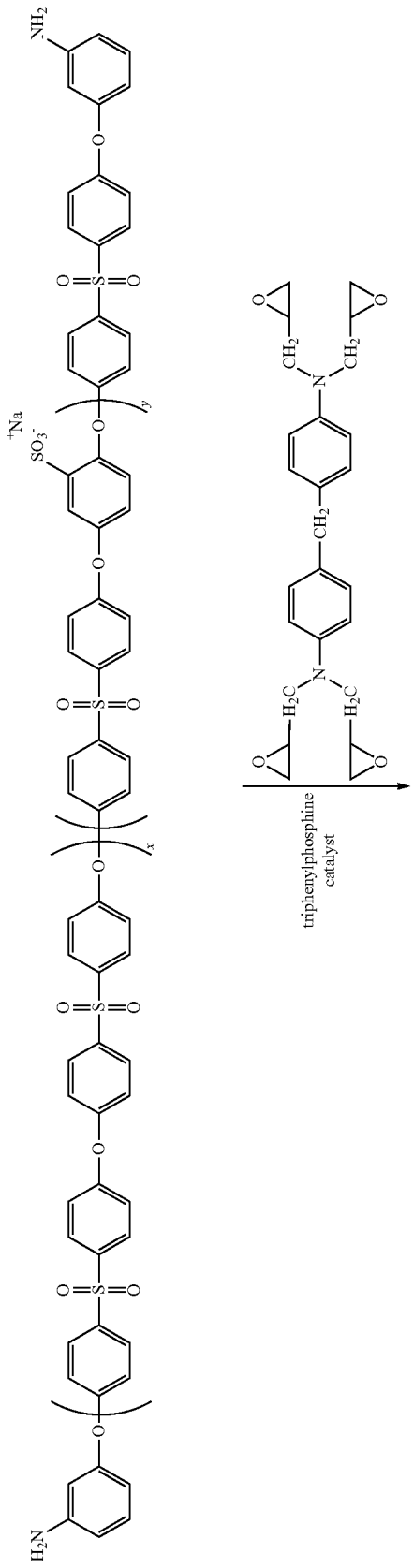

A crosslinking reaction for a 10,000 g/mole oligomer is provided. A 10,000 g/mole $M_n$, amine-terminated, post-sulfonated hydroquinone polysulfone oligomer (0.046 mmol, 0.63 g), tetraglycidyl bis(p-aminophenyl)methane (0.114 mmol, 0.048 g) and triphenylphosphine ($5.5 \times 10^{-3}$ mmol, 1.44 mg) were dissolved in 8 mL of N,N-dimethyl-acetamide. The solution was syringe-filtered through a 0.45 m polytetrafluoroethylene filter. The solution was cast on a circular Teflon mold with flat edges and a diameter of 10 cm. The mold was placed on a levelled surface in an oven at 70° C. The temperature was ramped from 70 to 175° C. over 6 hours and the film was cured at 175° C. for 12 hours. The epoxy-cured network was detached from the Teflon mold by immersion in deionized water and dried.

A summary of IECs, water uptakes and gel fractions is provided in Table 5. Crosslinked membranes were dried at 120° C. under vacuum overnight. After drying, 0.1-0.2 g of the sample was placed in a 20-mL scintillation vial filled with DMAc and stirred at 100° C. for ~12 hours. The remaining solid was filtered, transferred to a weighed vial, dried at 160° C. under vacuum for ~12 hours, and then weighed. Three measurements were taken for each film and gel fractions were calculated by Equation 1.

$$\text{Gel Fraction (\%)} = \frac{\text{Final mass of extracted film}}{\text{initial mass of dried film}} \times 100 \quad (1)$$

The water uptakes of the crosslinked membranes were determined gravimetrically. First, the membranes in their sodium salt form were dried at 120° C. under vacuum for 24 hours and weighed. These membranes were soaked in water at room temperature for 24 hours. Wet membranes were removed from the liquid water, blotted dry to remove surface droplets, and quickly weighed. The water uptake of the membranes was calculated according to Equation 2, where $mass_{dry}$ and $mass_{wet}$ refer to the masses of the dry and the wet membranes, respectively.

$$\text{Water Uptake (\%)} = \frac{Mass_{wet} - Mass_{dry}}{Mass_{dry}} \times 100 \quad (2)$$

Hydrated Tensile Properties.

Absorbed water stretches the polymer network, and the stretching is resisted by elastic retractive forces. Hence, the tensile properties of the networks depend upon the water uptake. The yield strengths and moduli dropped upon increase in water uptake, but the hydrated networks remained in the glassy regime. FIG. 21A provides a graph of modulus vs water uptake for fully hydrated membranes; FIG. 21B provides a plot of yield strength vs water uptake for fully hydrated membranes. FIG. 21C provides a schematic illustration of crosslinking of post-sulfonated amine terminated oligomers.

Networks prepared with ~5,000 and ~10,000 g/mole oligomers show different trends with respect to ultimate strains in their fully hydrated states. FIG. 22A provides stress strain curves of fully hydrated membranes with a 5k-XX-SHQS series, and FIG. 22B provides stress strain curves of fully hydrated membranes with a 10k-XX-SHQS series. The 5,000 g/mole series networks were restricted to ~5.5% ultimate strains. This could be attributed to hydrostatic forces becoming much greater than the elastic forces of the polymer network as the networks absorbed more water. The 10,000 g/mole oligomer networks had higher water uptakes than the 5000 g/mole counterparts, likely attributable in part to the lower amount of hydrophobic crosslinking reagent used to crosslink the 10,000 g/mole oligomer. The crosslinking agent not only decreased the hydrophilicity of the system due to inherent hydrophobicity but it also reduced the flexibility of the 5000 g/mole networks to a greater extent than the networks prepared with the 10,000 g/mole oligomers. This made the networks with the 5000 g/mole oligomers more brittle than those containing the 10,000 g/mole prepolymers. Hence, networks that contained the 10,000 g/mole prepolymers were more flexible due to the higher chain length between crosslinks.

Example 11. Reaction of Amine-Terminated, Post-Sulfonated Polysulfone Oligomers with Endgroups for Subsequent Free Radical Crosslinking, then Crosslinking the Oligomers with Light Amine-terminated, post-sulfonated polysulfone oligomers can be reacted with acrylate and methacrylate reagents to produce acrylate, methacrylate, acrylamide or methacrylamide endgroups. These functional oligomers can then be crosslinked thermally or with light by free radical polym-

TABLE 5

Network properties of 5000 and 10,000 g/mole SHQS crosslinked oligomers and linear analogues.

| Oligomer | Hydroquinone content (mole %) | Degree of sulfonation (mole %) | IEC of the crosslinked film (meq/g) | Water Uptake (wt %) | Fixed charge concentration (mol of ions per L of sorbed water) | Gel Fraction (wt %) |
|---|---|---|---|---|---|---|
| 5k-50-SHQS | 49.3 | 48.3 | 0.89 | 21 ± 1.4 | 4.24 | 89 ± 4.1 |
| 5k-65-SHQS | 65.1 | 62.5 | 1.18 | 28 ± 3.1 | 4.22 | 92 ± 3.6 |
| 5k-80-SHQS | 83.8 | 75.4 | 1.50 | 37 ± 2.4 | 4.05 | 90 ± 3.3 |
| 10k-50-SHQS | 46.0 | 46.0 | 0.99 | 24 ± 2.3 | 4.13 | 88 ± 2.4 |
| 10k-65-SHQS | 64.2 | 60.0 | 1.25 | 34 ± 1.6 | 3.68 | 91 ± 2.0 |
| 10k-80-SHQS | 80.4 | 77.2 | 1.64 | 51 ± 2.6 | 3.22 | 88 ± 4.3 |
| Linear 60-SHQS | 60.0 | 56.8 | 1.30 | 33 | 3.94 | |
| Linear 40-SHQS | 40.0 | 39.4 | 0.88 | 16 | 5.50 | |
| Linear 50-SHQS | 50.0 | 50.3 | 1.14 | 25 | 4.56 | | erization. It is recognized that alternative functional endgroups and/or alternative crosslinking reagents could be used in a similar manner to produce crosslinked membranes wherein a controlled molecular weight oligomer, or blends of different molecular weight oligomers, are utilized as macromonomers. Examples of alternative functional endgroups are phenol, maleimide, nadimide, acrylate, methacrylate, acrylamide, methacrylamide, ethynyl, phenylethynyl, styrene, tetrafluorostyrene and others. Alternative crosslinking reagents are amines, azides, halogenated benzylic monomers and comonomers including molecules with double bonds that are reactive by free radical polymerization.

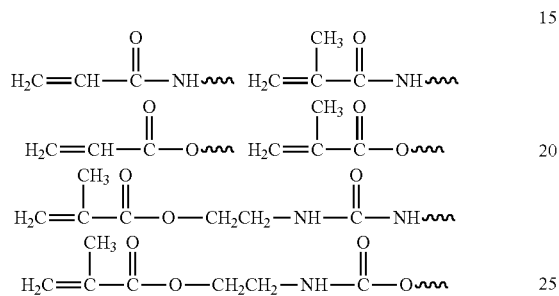

Functionalization of an amine-terminated, post-sulfonated hydroquinone polysulfone oligomer with acryloyl chloride to produce a post-sulfonated oligomer crosslinkable by free radical polymerization.

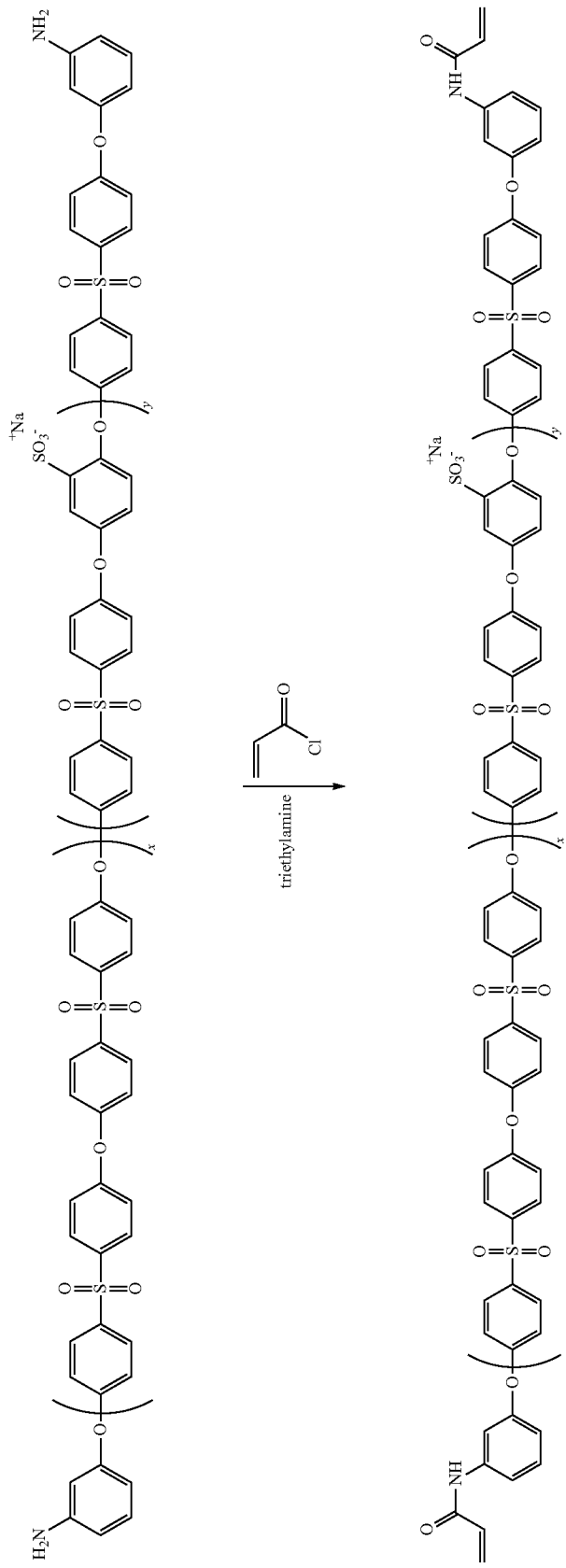

A procedure for synthesizing an ~10,000 g/mole $M_n$, amine-terminated, post-sulfonated hydroquinone polysulfone oligomer with 40% of the repeat units sulfonated is provided. The oligomer (2 g, $2\times10^{-4}$ equivalents of amine) was dissolved in a mixture of 30 mL of N,N-dimethylacetamide and 15 mL of toluene in a 2-neck, round bottom flask equipped with a Dean Stark trap topped with a condenser and a nitrogen inlet. The mixture was azeotroped in an oil bath set at 160° C. to remove any water for 4 hours. It was cooled to 0° C. in an ice bath, then dry triethylamine (1.53 mL, $11\times10^{-3}$ moles) was added, then acryloyl chloride (0.36 mL, $4.4\times10^{-3}$ moles) was added by syringe. It was stirred at 0° C. for 3 hours, then precipitated in isopropanol, washed with isopropanol for 12 hours, filtered and dried under vacuum at 80° C. for 24 hours, then stored in the dark in a refrigerator. Proton NMR showed the quantitative appearance of acrylamide endgroups. The oligomer (0.4 g) and 1 mg of 2,4,6-trimethylbenzoyl-diphenylphosphine oxide (TPO) were dissolved in 0.5 mL of dimethylacetamide plus 0.5 mL of diethylene glycol. The solution was cast on a glass plate and cured with 385-nm light at 60° C. for 5 minutes. The cast membrane had a gel fraction of 92% after exhaustive extraction with dimethylacetamide.

Example 12. Post-Sulfonation of Phenol Terminated Oligomers, then Functionalization of Terminal Groups for Free Radical Polymerization Post-sulfonated oligomers can also be prepared with phenol endgroups by offsetting the stoichiometry according to known methods to control molecular weight, then further functionalized so that they can be crosslinked by free radical polymerization using either heat or light in conjunction with an initiator. The procedure involves synthesizing the oligomer containing bisphenol sulfone together with a bisphenol that can be selectively sulfonated under mild conditions, post-sulfonating the oligomer, then further reacting the phenol terminated sulfonated oligomer with pentafluorostyrene, acryloyl chloride or isocyanatoethyl acrylate, methacryloyl chloride or isocyanatoethyl methacrylate to form crosslinkable endgroups. These can be further reacted in the presence of either thermal, or UV initiators with light, to produce crosslinked networks. The networks with tetrafluorostyrene endgroups would be expected to be particularly chlorine stable.

Salt Permeability.

The salt permeabilities of the polymer networks were measured under a concentration gradient where the upstream salt concentration was kept constant for all measurements. The salt permeabilities are plotted against water uptake and fixed charge concentration (FIG. 23 and FIG. 24). It was observed that with a decrease in water content in the networks, the salt permeability decreased for all of the networks (FIG. 23). However, this trend depended upon the block length of the prepolymers. The 5,000 g/mole oligomers contain an average of just ~10 repeat units which is on the threshold of entanglement length and this may make both their hydrated mechanical properties and their transport properties more sensitive toward even small changes in water uptake or fixed charge concentration. However, the 10,000 g/mole blocks are likely more entangled and this may explain why their mechanical and transport properties were less sensitive to changes in water uptake or fixed charge concentration than the networks with the 5000 g/mole oligomers.

The observed trend of salt permeability vs. fixed charge concentration can be explained on the basis of Donnan equilibria. The higher the fixed charge concentration, the greater the co-ion (i.e., $Cl^-$) rejection of these membranes, and the lower the salt permeability. Hence, it was observed that the salt permeability plummeted with increase in fixed charge concentration (FIG. 24).

Electrodialysis (ED) requires a high selectivity of counterions vs. co-ions and a high counterion permeability. Counterion permeability increases with increases in water content as water offers a medium of flow to the ions. However, this water uptake should be optimized, as an increase in water uptake causes a decrease in fixed charge concentration, especially in the case of linear ion exchange polymeric membranes. Low co-ion permeability, which manifests itself as low salt permeability, is not only a necessity in ED but also in other desalination processes, such as RO and forward osmosis, which utilize ion exchange membranes and where a high salt rejection is desirable. To optimize the water uptake and the fixed charge concentration, the membranes of this invention were crosslinked. The salt permeability was somewhat mitigated by crosslinking. The 10k-65-SHQS displays these optimal properties, not only in terms of water uptake and salt permeability, but also in the hydrated mechanical properties. It displayed a hydrated modulus of ~700 MPa. The cured membranes imbibed higher amounts of water with increasing degrees of sulfonation but they remained in the glassy state even when fully hydrated. The yield stresses of the fully hydrated, crosslinked networks ranged from approximately 10-25 MPa.

Structure and Molecular Weights of the Functional Oligomers.

The non-sulfonated and sulfonated oligomers were characterized by quantitative $^1$H NMR to calculate the molecular weights and degrees of sulfonation (FIG. 17 and FIG. 18). Completion of the reaction was confirmed by the absence of peaks of undesired end groups in the spectra. The spectra were normalized using the peaks from the amine end groups.

The A, A1 signals overlapped and resonated at 7.88 to 8.02 ppm. The I peaks from the amine end groups resonated at 5.33 ppm. The C protons of the hydroquinone resonated at 7.2 ppm. After sulfonation, the C protons shifted downfield to 7.45 ppm due to the electron withdrawing nature of the sulfonic acid groups that deshielded the protons. The amine end groups were acidified during the sulfonation at 50° C. for 2 hours, shifting the peaks downfield. Thus, the sulfonated oligomers were stirred in a solution of 0.1N NaOH to recover the amine end groups. FIG. 17 and FIG. 18 provide $^1$H NMR of an oligomer with a target molecular weight of ~5000 g/mol and 65% hydroquinone containing repeat units before sulfonation (FIG. 17) and after sulfonation (FIG. 18).

The degree of sulfonation was calculated from the spectra of the sulfonated oligomers, and the ion exchange capacities were calculated using the degrees of sulfonation (Equation 3). In equation 3, DS is the degree of sulfonation, MWSRU is the molecular weight of the sulfonated repeat unit in the $Na^+$ form, MWNSRU is the molecular weight of the non-sulfonated repeat unit.

$$IEC_{oligomer} = \frac{1000*DS}{(DS*MW_{SRU}) + [(1-DS)*MW_{NSRU}]} \quad \text{(Equation 3)}$$

COSY NMR experiments were performed to confirm the structure of the post sulfonated oligomers (FIG. 19). The C' proton correlated only with itself and did not show a three-bond correlation with any other proton. There were no other uncorrelated protons. Thus there were no secondary sites of sulfonation and all the hydroquinone moieties were strategically sulfonated by post-sulfonation. FIG. 19 provides COSY-NMR of a sulfonated oligomer with a target molecular weight of ~5000 g/mol and 65% hydroquinone containing repeat units (65-SHQS-5k).

Membrane Properties.

The maximum absorption of water increases with IEC (FIG. 33, Table 8). FIG. 33 provides a plot showing fixed charge concentrations of the linear and the crosslinked (~5000 g/mole) membranes as a function of their ion exchange capacities. The IECs of the crosslinked membranes were calculated from the IECs of the oligomers measured by $^1$H NMR, by taking into account the addition of the non-ionic crosslinking agent (Equation 4). The water uptakes of crosslinked membranes have been reported to be constrained due to reduced swelling and free volume. This is evident for the systems discussed in this example in FIG. 32 where, for a given IEC, the water uptakes of the epoxy networks prepared from the 5000 g/mole oligomers are less than the linear counterparts.

$$IEC_{crosslinked \atop membrane} = IEC_{oligomer} * \text{weight fraction of oligomer in the membrane} \quad \text{(Eq. 4)}$$

The fixed charge concentration of the membranes, $C_A^m$, is defined as the concentration of fixed ions on the polymer per unit of sorbed water (Equation 5 where $\rho_w$ is assumed to be 1 g/cc).

$$C_A^m \approx \frac{IEC \times \rho_w}{\text{water uptake}} \quad \text{(Equation 5)}$$

Increasing the membrane fixed charge concentration increases the Donnan potential, which should lead to better co-ion and salt rejection. Thus, increasing the fixed charge groups in the polymer matrix can increase the fixed charge concentration. However, increasing the IEC also increases the water uptake of the membranes which acts to reduce the fixed charge concentration. FIG. 34 provides a plot showing water uptake of the linear and the crosslinked membranes (~5000 g/mole) as a function of their ion exchange capacities. FIG. 34 shows the fixed charge concentrations of the linear and crosslinked SHQS membranes with respect to IEC. It is clear that the crosslinked membranes have higher fixed charge concentrations than the linear counterparts. Thus, it is hypothesized that these crosslinked membranes will also show improved salt rejection. The effect of crosslinking on constraining the membranes made from the 10,000 g/mole oligomers was not as prominent, likely due to their lower crosslink densities. It should also be noted that all of the SHQS membranes had higher fixed charge concentrations than those of some commercial GE Electrodialysis membranes.

Hydrated Mechanical Properties of the Membranes.

One of the objectives of this example is to develop membranes with superior mechanical properties in fully hydrated conditions to withstand high applied pressure in reverse osmosis. The linear and the crosslinked SHQS membranes are in the glassy state under fully hydrated conditions. FIG. 35 provides plots showing yield stress and elastic modulus decreases with an increase in water uptake for the crosslinked and linear SHQS membranes. The tensile data (FIG. 35) showed that increasing water uptake decreased the elastic modulus and the yield stress in the crosslinked networks. This phenomenon occurred due to the plasticization effect of water independent of the degree of crosslinking. The high dielectric constant of the water reduces the van der Waals forces between the polymer chains, leading to an increase in the free volume and chain mobility. Interestingly, a similar trend was observed in the linear sample as shown in FIG. 35. Therefore, it can be concluded that the effect of water content supersedes the effect of block length and crosslinking with regard to hydrated mechanical properties. This could have happened because the crosslinked membranes were designed for controlled crosslinking only at the ends and the crosslink density was low. The 50SHQS-5k network showed the highest yield stress due to the lowest amount of water uptake (0.14).

STATEMENTS REGARDING INCORPORATION BY REFERENCE AND VARIATIONS

All references throughout this disclosure, for example patent documents including issued or granted patents or equivalents; patent application publications; and non-patent literature documents or other source material; are hereby incorporated by reference herein in their entireties, as though individually incorporated by reference. Specific documents hereby incorporated by reference include U.S. Pat. Nos. 8,028,842 and 4,273,903.

All patents and publications mentioned in this disclosure are indicative of the levels of skill of those skilled in the art to which the invention pertains. References cited herein are incorporated by reference herein in their entirety to indicate the state of the art, in some cases as of their filing date, and it is intended that this information can be employed herein, if needed, to exclude (for example, to disclaim) specific embodiments that are in the prior art. For example, when a compound is claimed, it should be understood that compounds known in the prior art, including certain compounds disclosed in the references disclosed herein (particularly in referenced patent documents), are not intended to be included in the claim.

When a group of substituents is disclosed herein, it is understood that all individual members of those groups and all subgroups and classes that can be formed using the substituents are disclosed separately. When a Markush group or other grouping is used herein, all individual members of the group and all combinations and subcombinations possible of the group are intended to be individually included in the disclosure. As used herein, "and/or" means that one, all, or any combination of items in a list separated by "and/or" are included in the list; for example "1, 2 and/or 3" is equivalent to "'1' or '2' or '3' or '1 and 2' or '1 and 3' or '2 and 3' or '1, 2 and 3'".

Every formulation or combination of components described can be used to practice the invention, unless otherwise stated. Specific names of materials are intended to be exemplary, as it is known that one of skill in the art can name the same material differently. It will be appreciated that methods, device elements, starting materials, and synthetic methods other than those specifically exemplified can be employed in the practice of the invention without resort to undue experimentation. All art-known functional equivalents, of any such methods, device elements, starting materials, and synthetic methods are intended to be included in this invention. Whenever a range is given in the specification, for example, a temperature range, a time range, or a composition range, all intermediate ranges and subranges, as well as all individual values included in the ranges given are intended to be included in the disclosure. It will be appreciated that the chemical structures shown herein depict specific exemplary representations for particular molecules and that other equivalent representations may exist for the same molecules.

As used herein, "comprising" is synonymous with "including," "containing," or "characterized by," and is inclusive or open-ended and does not exclude additional, unrecited elements or method steps. As used herein, "consisting of" excludes any element, step, or ingredient not specified in the claim element. As used herein, "consisting essentially of" does not exclude materials or steps that do not materially affect the basic and novel characteristics of the claim. Any recitation herein of the term "comprising", particularly in a description of components of a composition or in a description of elements of a device, is understood to encompass those compositions and methods consisting essentially of and consisting of the recited components or elements. The invention illustratively described herein suitably may be practiced in the absence of any element or elements, limitation or limitations which is not specifically disclosed herein.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims.

What is claimed is:
1. A copolymer comprising the structure:

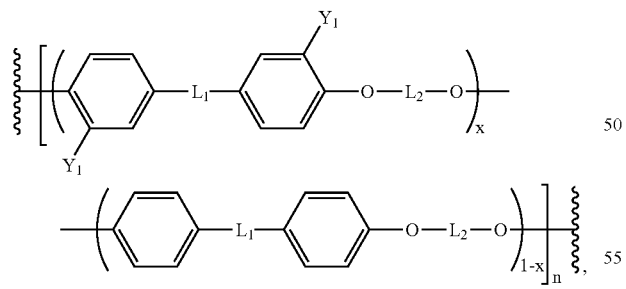

wherein each $L^1$ is independently

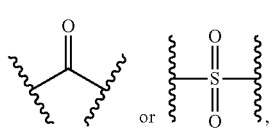

wherein each $L^2$ is independently

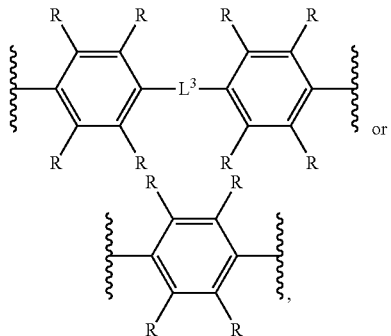

wherein each $L^3$ is independently a single bond,

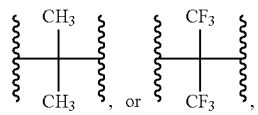

wherein one $Y^1$ is $SO_3Z$ and the other $Y^1$ is H, wherein Z is a counterion, wherein each R is independently H, F, or $CH_3$; the value of x is between 0 to 1, and the value for n is from 2 to 100,000; and optionally comprising a terminating group.

2. The copolymer of claim 1, further comprising one or more terminating groups A, each terminating group A independently selected from H,

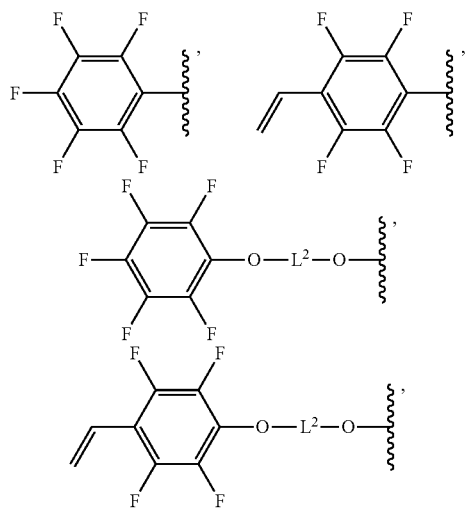

a phenol, an aromatic amine derived from an aminophenol as an endcapping agent in the copolymerization, or

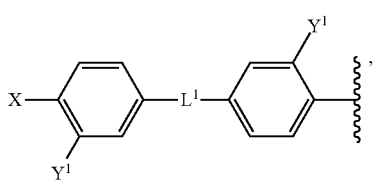

wherein X is a halogen, one $Y^1$ is $SO_3Z$ and the other $Y^1$ is H or both $Y^1$ are H.

3. The copolymer of claim 1, further comprising one or more terminating groups A, each terminating group A independently selected from

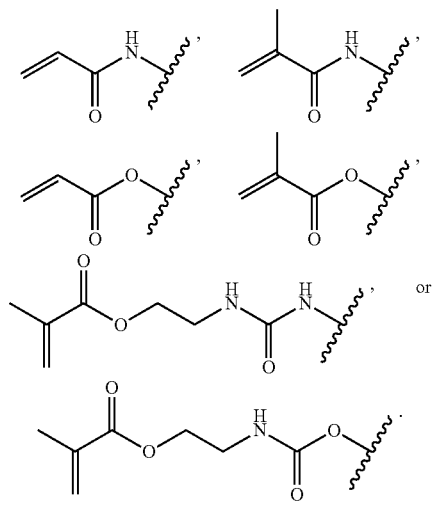

4. The copolymer of claim 1, wherein the terminal group is present and the copolymer is in crosslinked form; or wherein the terminal group is present and blends of different molecular weights of copolymers of claim 1 is in crosslinked form; or wherein the terminal group is present and blends of a single molecular weight or different molecular weights of copolymers of claim 1 and one or more small molecule polymerizable reagents, is in crosslinked form.

5. A copolymer comprising the structure:

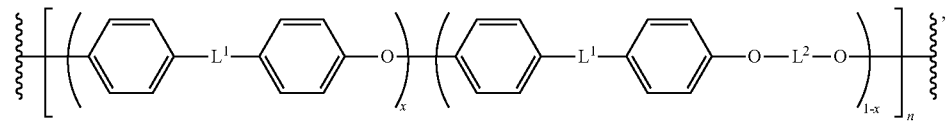

where each $L^1$ is independently

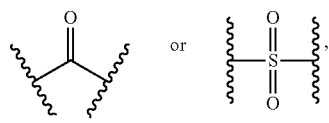

wherein each $L^2$ is

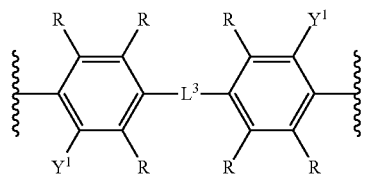

wherein each $L^3$ is independently a single bond,

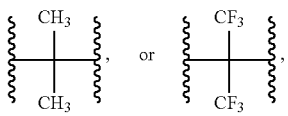

wherein at least one or both or all of $Y^1$ is $SO_3Z$, wherein Z is a counterion, and wherein each R is independently H, F, or $CH_3$.

6. The copolymer of claim 5, wherein each $L^2$ is

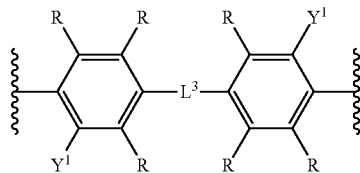

wherein $L^3$ is a single bond, wherein at least one or both $Y^1$ is $SO_3Z$, wherein Z is a counterion, and wherein each R is H or $CH_3$.

7. The copolymer of claim 5, further comprising one or more terminating groups A, each terminating group A independently selected from H,

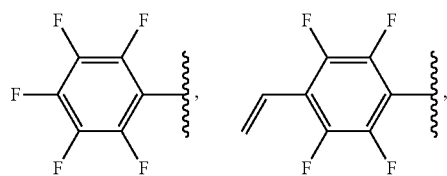

-continued

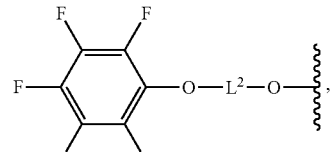

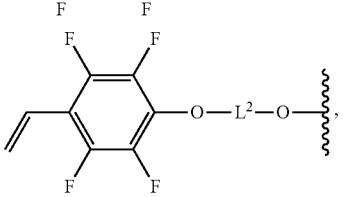

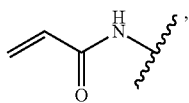

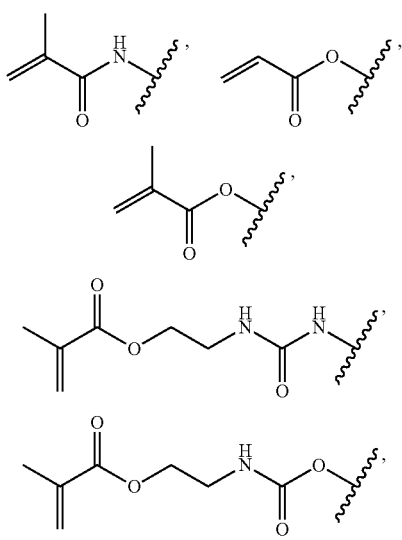

a phenol, or an aminophenol.

8. The copolymer of claim 7, wherein the copolymer is in crosslinked form; or blends of different molecular weights of copolymers of claim 7 in crosslinked form; or blends of a single molecular weight or different molecular weights of copolymers of claim 7 and one or more small molecule polymerizable reagents, is in crosslinked form.

9. A method comprising:

reacting HO-$L^2$-OH with

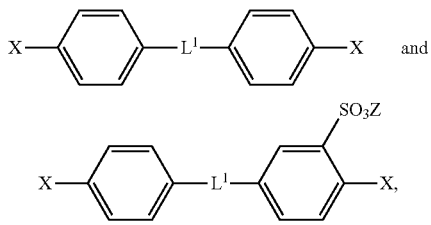

with or without an aminophenol, to generate a copolymer, wherein each $L^1$ is independently

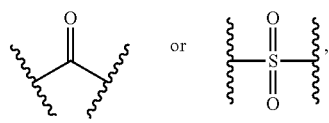

wherein $L^2$ is

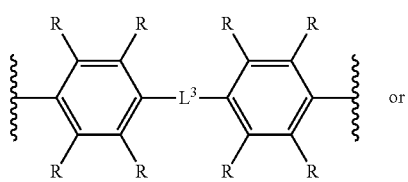

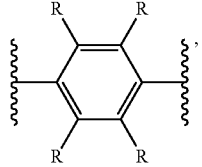

wherein $L^3$ is a single bond,

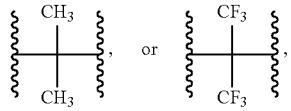

wherein each R is independently H, F, or $CH_3$, and wherein X is a halogen.

10. The method of claim 9, further comprising:
reacting a phenol or aminophenol terminated copolymer with

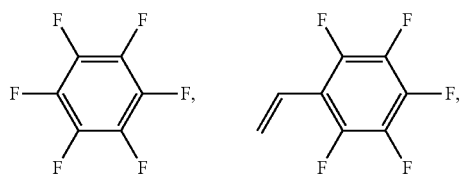

acryloyl halide, methacryloyl halide, isocyanatoethyl acrylate, or isocyanatoethyl methacrylate to generate an end-functionalized copolymer.

11. The method of claim 9, further comprising:
initiating a crosslinking reaction by exposing the end-functionalized copolymer to a crosslinking agent including one or more of heat, light, a free radical initiator, or an epoxy reagent.

12. The method of claim 11, wherein the crosslinking reaction includes: crosslinking a blend of different molecular weights of the end-functionalized copolymer; or crosslinking a single molecular weight or blends of different molecular weights of the end-functionalized copolymer and one or more polymerizable reagents.

13. A method comprising:
(i) a method comprising:
reacting

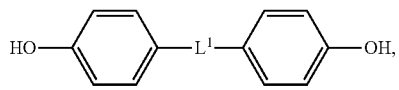

one or more HO-$L^2$-OH and

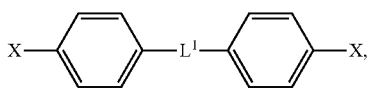

with or without an aminophenol, to generate a copolymer with phenol or aminophenol endgroups, wherein each $L^1$ is independently

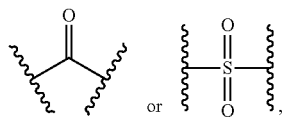

wherein L² is independently

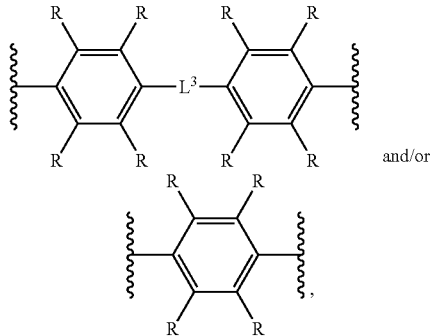

and/or wherein L³ is a single bond,

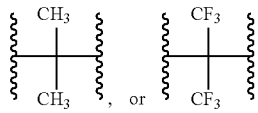

wherein X is a halogen; and
sulfonating the copolymer to generate a single SO₃Z substituent on one or every aromatic ring of L², wherein Z is a counterion; and
conducting an end-functionalization reaction with

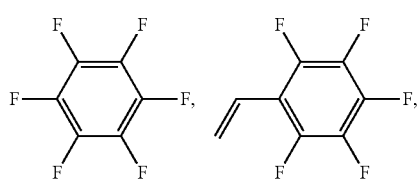

acryloyl halide, methacryloyl halide, isocyanatoethyl acrylate, or isocyanatoethyl methacrylate to generate a post-sulfonated, end-functionalized copolymer or alternatively,
  (i) a method comprising:
    reacting

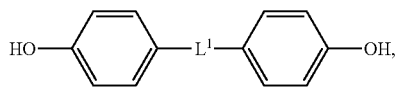

one or more HO-L²-OH and

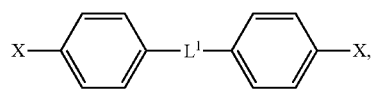

with or without an aminophenol, to generate a copolymer with phenol or aminophenol endgroups, wherein each L¹ is independently

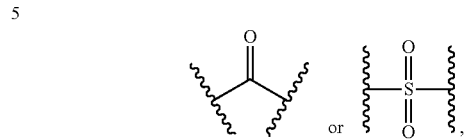

wherein L² is independently

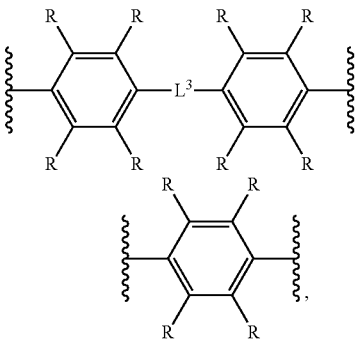

and/or wherein L³ is a single bond,

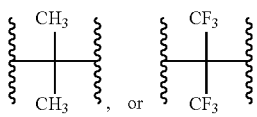

wherein X is a halogen; and
conducting an end-functionalization reaction with

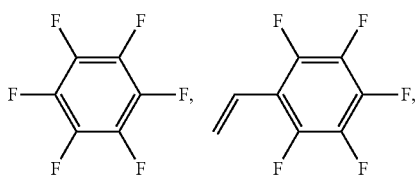

acryloyl halide, methacryloyl halide, isocyanatoethyl acrylate, or isocyanatoethyl methacrylate to generate a post-sulfonated, end-functionalized copolymer;
  initiating a crosslinking reaction by subjecting the end-functionalized copolymer to a crosslinking agent including one or more of heat, light, a free radical initiator, or an epoxy reagent, wherein the crosslinking reaction includes: crosslinking a blend of different molecular weights of the end-functionalized copolymer; or crosslinking a single molecular weight or blends of different molecular weights of the end-functionalized copolymer and one or more polymerizable reagents; and
  sulfonating the crosslinked copolymer to generate a single SO₃Z substituent on some, one, or every aromatic ring of L², wherein Z is a counterion.

14. The method of claim 13, wherein the end-functionalization reaction is with the copolymer or a post-sulfonated copolymer, or wherein the sulfonation reaction is with the copolymer or the end-functionalized copolymer.

15. The method of claim 13, further comprising:
initiating a crosslinking reaction by subjecting the end-functionalized copolymer to a crosslinking agent including one or more of heat, light, a free radical initiator, or an epoxy reagent.

16. The method of claim 15, wherein the crosslinking reaction includes: crosslinking a blend of different molecular weights of the end-functionalized copolymer; or crosslinking a single molecular weight or blends of different molecular weights of the end-functionalized copolymer and one or more polymerizable reagents.

17. A water desalination membrane comprising the copolymer of claim 1.

18. The water desalination membrane of claim 17 exhibiting a rejection of aqueous monovalent ions of over 95% in the presence of polyvalent cations.

19. The water desalination membrane of claim 17, wherein the water desalination membrane is exposed on a first side to an aqueous salt solution, the aqueous salt solution comprising a mixture of monovalent cations and polyvalent cations; and
pressurizing the aqueous salt solution to drive a reverse osmosis process wherein water from the aqueous salt solution passes from the first side of the water desalination membrane through to a second side of the water desalination membrane and wherein at least 95% of the monovalent ions are rejected from passing through the water desalination membrane in the presence of the polyvalent cations.

20. The water desalination of claim 19, wherein the aqueous salt solution includes a chlorine-based sterilization agent and wherein the water desalination membrane remains substantially unoxidized by the chlorine-based sterilization agent.

21. A water desalination membrane exhibiting a rejection of aqueous monovalent ions of over 95% in the presence of polyvalent cations, the membrane comprising: a copolymer comprising the structure:

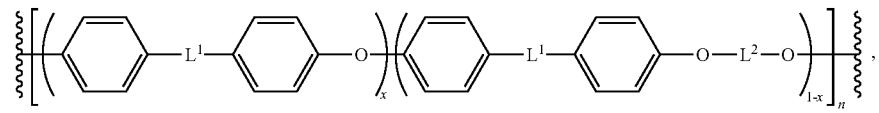

where each $L^1$ is independently

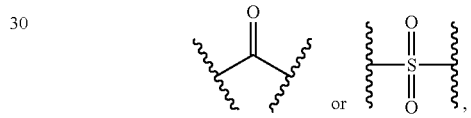

wherein each $L^2$ is

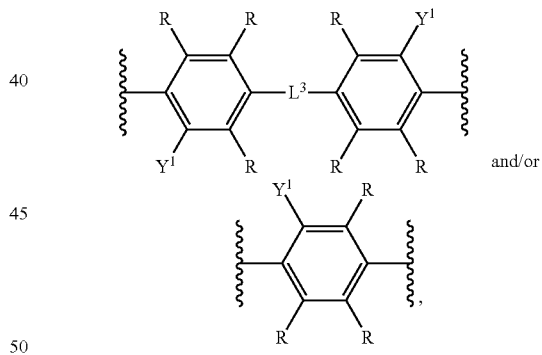

and/or wherein each $L^3$ is independently a single bond,

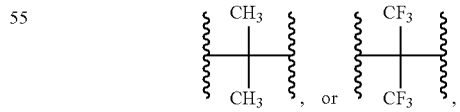

wherein at least one or both or all of $Y^1$ is $SO_3Z$, wherein Z is a counterion, and wherein each R is independently H, F, or $CH_3$, wherein the membrane exhibits a rejection of aqueous monovalent ions of over 95% in the presence of polyvalent cations.

* * * * *